United States Patent
Hu et al.

(10) Patent No.: US 12,317,285 B2
(45) Date of Patent: May 27, 2025

(54) METHOD FOR SENDING PHYSICAL UPLINK SHARED CHANNEL AND APPARATUS

(71) Applicant: HUAWEI TECHNOLOGIES CO., LTD., Guangdong (CN)

(72) Inventors: Dan Hu, Beijing (CN); Yongxia Lyu, Beijing (CN); Lei Guan, Beijing (CN); Xianda Liu, Beijing (CN); Ruixiang Ma, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 296 days.

(21) Appl. No.: 17/886,931

(22) Filed: Aug. 12, 2022

(65) Prior Publication Data
US 2022/0400471 A1  Dec. 15, 2022

Related U.S. Application Data

(63) Continuation of application No. PCT/CN2021/076516, filed on Feb. 10, 2021.

(30) Foreign Application Priority Data

Feb. 13, 2020 (CN) .......................... 202010091629.7

(51) Int. Cl.
H04W 72/23 (2023.01)
H04L 5/00 (2006.01)
H04W 72/0446 (2023.01)

(52) U.S. Cl.
CPC ........... *H04W 72/23* (2023.01); *H04L 5/0048* (2013.01); *H04W 72/0446* (2013.01)

(58) Field of Classification Search
None
See application file for complete search history.

(56) References Cited

U.S. PATENT DOCUMENTS 11,159,347 B2  10/2021  Ahn et al.
2014/0362941 A1  12/2014  Gomadam et al.
(Continued)

FOREIGN PATENT DOCUMENTS

CN  102083223 A  6/2011
CN  108880644 A  11/2018
(Continued)

OTHER PUBLICATIONS

Office Action in Indian Appln. No. 202237050260, dated Mar. 22, 2023, 7 pages (with English translation).
(Continued)

*Primary Examiner* — Phirin Sam
(74) *Attorney, Agent, or Firm* — Fish & Richardson P.C.

(57) ABSTRACT

This application discloses methods and apparatuses for sending a physical uplink shared channel (PUSCH) and relates to the communication field. A network device sends indication information to a terminal device, where the indication information is used to indicate first information and second information. The first information is used to indicate first precoding information corresponding to a first nominal PUSCH repetition. The second information is used to indicate second precoding information corresponding to a second nominal PUSCH repetition. The terminal device sends N PUSCHs based on precoding information indicated by the indication information. The precoding information corresponding to the N PUSCHs includes at least one of the first precoding information and the second precoding information.

20 Claims, 17 Drawing Sheets

(56) References Cited

U.S. PATENT DOCUMENTS

| | | | |
|---|---|---|---|
| 2016/0344458 A1* | 11/2016 | Zhao | H04L 1/16 |
| 2018/0234154 A1* | 8/2018 | Chen | H04L 1/0026 |
| 2018/0279297 A1 | 9/2018 | Nogami et al. | |
| 2019/0174466 A1 | 6/2019 | Zhang et al. | |
| 2019/0320469 A1* | 10/2019 | Huang | H04W 72/23 |
| 2020/0037260 A1* | 1/2020 | Fu | H04W 52/325 |
| 2021/0282169 A1* | 9/2021 | Zhang | H04W 72/56 |
| 2022/0060921 A1* | 2/2022 | Sadeghi | H04W 72/0446 |
| 2024/0080701 A1* | 3/2024 | Sadeghi | H04W 24/10 |
| 2024/0187196 A1* | 6/2024 | Kim | H04L 1/1819 |

FOREIGN PATENT DOCUMENTS

| | | |
|---|---|---|
| CN | 110350957 A | 10/2019 |
| CN | 110463066 A | 11/2019 |
| CN | 110535508 A | 12/2019 |
| CN | 110601733 A | 12/2019 |
| CN | 110611958 A | 12/2019 |
| WO | 2018111809 A1 | 6/2018 |
| WO | 2018202096 A1 | 11/2018 |
| WO | 2018203680 A1 | 11/2018 |
| WO | 2019214676 A1 | 11/2019 |

OTHER PUBLICATIONS

Huawei et al., "Reliability enhancement on PUCCH and PUSCH with multi-TRP/panel," 3GPP TSG RAN WG1 meeting #96b, R1-1905270, Xi'an, China, Apr. 8-12, 2019, 2 pages.

NTT DOCOMO, Inc., "Enhancements on multi-TRP/panel transmission," 3GPP TSG RAN WG1 #98bis, R1-1911184, Chongqing, China, Oct. 14-20, 2019, 32 pages.

Extended European Search Report in European Appln No. 21753415.5, dated May 26, 2023, 11 pages.

Huawei, HiSilicon, "Feature Summary of Enhancements on Multi-TRP/Panel Transmission," 3GPP TSG RAN WG1 Meeting #99, R1-1913299, Reno, USA, Nov. 18-22, 2019, 88 pages.

Office Action issued in Chinese Application No. 202010091629.7 on Dec. 17, 2021, 11 pages (with English translation).

Panasonic, "Power Control for In-Coverage Mode 1/2 in D2D," 3GPP TSG RAN WG1 Meeting #78, R1-143002, Dresden, Germany, Aug. 18-22, 2014, 5 pages.

PCT International Search Report and Written Opinion issued in International Application No. PCT/CN2021/076516 on May 10, 2021, 13 pages (with English translation).

* cited by examiner

METHOD FOR SENDING PHYSICAL UPLINK SHARED CHANNEL AND APPARATUS

CROSS-REFERENCE TO RELATED APPLICATIONS

This application is a continuation of International Application No. PCT/CN2021/076516, filed on Feb. 10, 2021, which claims priority to Chinese Patent Application No. 202010091629.7, filed on Feb. 13, 2020. The disclosures of the aforementioned applications are hereby incorporated by reference in their entireties.

TECHNICAL FIELD

Embodiments of this application relate to the communication field, and in particular, to a method for sending a physical uplink shared channel and an apparatus.

BACKGROUND

The International Telecommunication Union (International Telecommunication Union, ITU) defines three types of application scenarios for a 5th generation (5th generation, 5G) mobile communication system and a future mobile communication system: enhanced mobile broadband (enhanced mobile broadband, eMBB), ultra-reliable and low-latency communication (ultra-reliable and low-latency communication, URLLC), and massive machine-type communications (massive machine-type communications, mMTC).

Usually, before sending a physical uplink shared channel (physical uplink shared channel, PUSCH) to a network device, a terminal device precodes a user bit based on a precoding matrix indicated by the network device to obtain uplink data, and then sends the PUSCH that carries the uplink data. Generally, the network device indicates one precoding matrix by using downlink control information (downlink control information, DCI). If the DCI further indicates the terminal device to separately send PUSCHs to multiple transmission reception points (Multiple Transmit Receive Points, M-TRPs), two PUSCHs carry uplink data precoded by using a same precoding matrix, and transport blocks (transport blocks, TBs) of two pieces of uplink data are the same. Because channel quality of uplink channels between the terminal device and two TRPs may be different, uplink data reliability and uplink transmission efficiency may be reduced when the uplink data is transmitted to different TRPs by using a same precoding matrix. Therefore, how to transmit uplink data to different TRPs by using different precoding matrices is an urgent problem to be resolved.

SUMMARY

Embodiments of this application provide a method for sending a physical uplink shared channel and an apparatus, to resolve a problem of how to transmit uplink data to different TRPs by using different precoding matrices.

To achieve the foregoing objective, the following technical solutions are used in embodiments of this application.

According to a first aspect, an embodiment of this application provides a method for sending a physical uplink shared channel. The method may be applied to a terminal device, or the method may be applied to a communication apparatus that can support a terminal device in implementing the method. For example, the communication apparatus includes a chip system. The method includes: After receiving indication information, the terminal device sends N PUSCHs based on precoding information indicated by the indication information. The indication information is used to indicate first information and second information. The first information is used to indicate first precoding information corresponding to a first nominal (nominal) PUSCH repetition. The second information is used to indicate second precoding information corresponding to a second nominal PUSCH repetition. The precoding information corresponding to the N PUSCHs includes at least one of the first precoding information and the second precoding information. Time domain resources occupied by the N PUSCHs are all or a part of time domain resources occupied by the first nominal PUSCH repetition in at least one consecutive time unit, or time domain resources occupied by the N PUSCHs are all or a part of time domain resources occupied by the first nominal PUSCH repetition and the second nominal PUSCH repetition in at least one consecutive time unit, and N is an integer greater than or equal to 2. Alternatively, time domain resources occupied by the N PUSCHs are all or a part of occupied time domain resources for repeatedly sending the first nominal PUSCH repetition in at least one consecutive time unit, or time domain resources occupied by the N PUSCHs are all or a part of occupied time domain resources for repeatedly sending the first nominal PUSCH repetition and the second nominal PUSCH repetition in at least one consecutive time unit.

According to the method for sending a physical uplink shared channel provided in this embodiment of this application, the terminal device may determine, based on the received indication information, different precoding information corresponding to two nominal PUSCH repetitions, and for uplink channels with different channel quality, PUSCHs that carry uplink data may be transmitted by using different precoding matrices. This effectively improves uplink data reliability and uplink transmission efficiency.

According to a second aspect, an embodiment of this application provides a method for receiving a physical uplink shared channel. The method may be applied to a network device, or the method may be applied to a communication apparatus that can support a network device in implementing the method. For example, the communication apparatus includes a chip system. The method includes: The network device receives M PUSCHs after sending indication information. The indication information is used to indicate first information and second information. The first information is used to indicate first precoding information corresponding to a first nominal PUSCH repetition. The second information is used to indicate second precoding information corresponding to a second nominal PUSCH repetition. Precoding information corresponding to the M PUSCHs is the first precoding information. Time domain resources occupied by the M PUSCHs are all or a part of time domain resources occupied by the first nominal PUSCH repetition in at least one consecutive time unit, M is an integer less than or equal to N, and N PUSCHs are PUSCHs sent by a terminal device based on the first nominal PUSCH repetition and the second nominal PUSCH repetition.

According to the method for receiving a physical uplink shared channel provided in this embodiment of this application, the network device indicates, to the terminal device by using the indication information, precoding information corresponding to two nominal PUSCH repetitions, so that the terminal device may determine, based on the received indication information, different precoding information corresponding to the two nominal PUSCH repetitions, and for uplink channels with different channel quality, PUSCHs that carry uplink data may be transmitted by using different precoding matrices. This effectively improves uplink data reliability and uplink transmission efficiency.

In a possible design, the N PUSCHs include a first PUSCH and a second PUSCH, precoding information corresponding to the first PUSCH is the first precoding information, and precoding information corresponding to the second PUSCH is the first precoding information.

In some possible implementations, time domain resources occupied by the first PUSCH and the second PUSCH are all or a part of time domain resources occupied by the first nominal PUSCH repetition in a first time unit, a start symbol of the first PUSCH is the same as a start symbol of the first nominal PUSCH repetition, and at least one valid symbol and at least one invalid symbol are included between the start symbol of the first PUSCH and an end symbol of the first time unit. If an end symbol of the second PUSCH is the same as an end symbol of the first nominal PUSCH repetition, the time domain resources occupied by the first PUSCH and the second PUSCH are the part of time domain resources occupied by the first nominal PUSCH repetition in the first time unit; or if an end symbol of the second PUSCH follows an end symbol of the first nominal PUSCH repetition, the time domain resources occupied by the first PUSCH and the second PUSCH are all of the time domain resources occupied by the first nominal PUSCH repetition in the first time unit. The first nominal PUSCH repetition is divided into two PUSCHs by at least one invalid symbol, and the two PUSCHs that carry uplink data are transmitted by using the first precoding information corresponding to the first nominal PUSCH repetition. This effectively improves uplink data reliability and uplink transmission efficiency.

In some other possible implementations, time domain resources occupied by the first PUSCH and the second PUSCH are all or a part of time domain resources occupied by the first nominal PUSCH repetition in a first time unit and a second time unit, a start symbol of the first PUSCH is the same as a start symbol of the first nominal PUSCH repetition, an end symbol of the first time unit precedes an end symbol of the first nominal PUSCH repetition, and the first time unit is adjacent to the second time unit in time domain. The first nominal PUSCH repetition is divided into two PUSCHs by a boundary of a time unit, and the two PUSCHs that carry uplink data are transmitted by using the first precoding information corresponding to the first nominal PUSCH repetition. This effectively improves uplink data reliability and uplink transmission efficiency.

Optionally, the N PUSCHs further include a third PUSCH, precoding information corresponding to the third PUSCH is the second precoding information, and a start symbol of the third PUSCH is the same as a start symbol of the second nominal PUSCH repetition.

In another possible design, the N PUSCHs include a first PUSCH and a second PUSCH, precoding information corresponding to the first PUSCH is the first precoding information, and precoding information corresponding to the second PUSCH is the second precoding information.

In some possible implementations, time domain resources occupied by the first PUSCH and the second PUSCH are all or a part of time domain resources occupied by the first nominal PUSCH repetition in a first time unit and a second time unit, a start symbol of the first PUSCH is the same as a start symbol of the first nominal PUSCH repetition, an end symbol of the first time unit precedes an end symbol of the first nominal PUSCH repetition, and the first time unit is adjacent to the second time unit in time domain. The first nominal PUSCH repetition is divided into two PUSCHs by a boundary of a time unit, and the two PUSCHs that carry uplink data are transmitted by using the first precoding information corresponding to the first nominal PUSCH repetition and the second precoding information corresponding to the second nominal PUSCH repetition, so that the two PUSCHs are sent to different TRPs, and diversity gains are obtained. This effectively improves uplink data reliability and uplink transmission efficiency.

In some other possible implementations, a time domain resource occupied by the first PUSCH is all of time domain resources occupied by the first nominal PUSCH repetition in a first time unit, a time domain resource occupied by the second PUSCH is all of time domain resources occupied by the second nominal PUSCH repetition in a second time unit, and the first time unit is adjacent to the second time unit in time domain. Therefore, for uplink channels with different channel quality, PUSCHs that carry uplink data may be transmitted by using different precoding matrices. This effectively improves uplink data reliability and uplink transmission efficiency.

Further, the method further includes: obtaining the first information and the second information by using DCI.

The indication information is precoding information and a quantity of layers, or the indication information is sounding reference signal resource indicator (sounding reference signal resource indicator, SRI) information. If the indication information is the precoding information and the quantity of layers, the first information is further used to indicate a first quantity of layers, and the second information is further used to indicate a second quantity of layers. Optionally, the first quantity of layers is the same as the second quantity of layers. If the indication information is used to indicate index values of a plurality of SRS resources, the index values of the plurality of SRS resources include an index value of a first SRS resource and an index value of a second SRS resource, the index value of the first SRS resource is used to indicate the first precoding information corresponding to the first nominal PUSCH repetition, and the index value of the second SRS resource is used to indicate the second precoding information corresponding to the second nominal PUSCH repetition.

Optionally, transmission mode indication information is received, and interpretation of the SRI is determined based on the transmission mode indication information. When the transmission mode indication information indicates a non-repeated transmission mode, a quantity of index values of SRS resources indicated in the SRI is a quantity of transport layers of a PUSCH, and an index value of an SRS resource indicated in each SRI is used to indicate precoding information used at each layer of the PUSCH. When the transmission mode indication information indicates a repeated transmission mode, index values of different SRS resources indicated in the SRI are separately used to indicate precoding used for different repetitions of a PUSCH.

Optionally, the transmission mode indication information is indication information of a quantity of repetitions. When the quantity of repetitions is indicated as 1, the transmission mode is non-repeated transmission. When the quantity of repetitions is indicated to be greater than 1, the transmission mode is repeated transmission.

According to a third aspect, an embodiment of this application further provides a communication apparatus. For beneficial effects, refer to the descriptions of the first aspect. Details are not described herein again. The communication apparatus has a function of implementing a behavior in the method embodiment in the first aspect. The function may be implemented by using hardware, or may be implemented by hardware executing corresponding software. The hardware or the software includes one or more modules corresponding to the foregoing functions. In a possible design, the communication apparatus includes a transceiver unit and a processing unit. The transceiver unit is configured to: receive indication information from a network device, and send N PUSCHs, where the indication information is used to indicate first information and second information. The first information is used to indicate first precoding information corresponding to a first nominal PUSCH repetition. The second information is used to indicate second precoding information corresponding to a second nominal PUSCH repetition. Precoding information corresponding to the N PUSCHs includes at least one of the first precoding information and the second precoding information. Time domain resources occupied by the N PUSCHs are all or a part of time domain resources occupied by the first nominal PUSCH repetition in at least one consecutive time unit, or time domain resources occupied by the N PUSCHs are all or a part of time domain resources occupied by the first nominal PUSCH repetition and the second nominal PUSCH repetition in at least one consecutive time unit, and N is an integer greater than or equal to 2. The processing unit is configured to: determine, based on the indication information, precoding information corresponding to different nominal PUSCH repetitions, and precode user data based on to the precoding information. These modules may perform corresponding functions in the method example in the first aspect. For details, refer to the detailed descriptions in the method example. Details are not described herein again.

According to a fourth aspect, an embodiment of this application further provides a communication apparatus. For beneficial effects, refer to the descriptions of the second aspect. Details are not described herein again. The communication apparatus has a function of implementing a behavior in the method embodiment in the second aspect. The function may be implemented by using hardware, or may be implemented by hardware executing corresponding software. The hardware or the software includes one or more modules corresponding to the foregoing functions. In a possible design, the communication apparatus includes a transceiver unit and a processing unit. The transceiver unit is configured to: send indication information, and receive M PUSCHs, where the indication information is used to indicate first information and second information. The first information is used to indicate first precoding information corresponding to a first nominal PUSCH repetition. The second information is used to indicate second precoding information corresponding to a second nominal PUSCH repetition. Precoding information corresponding to the M PUSCHs is the first precoding information, time domain resources occupied by the M PUSCHs are all or a part of time domain resources occupied by the first nominal PUSCH repetition in at least one consecutive time unit, M is an integer less than or equal to N, and N PUSCHs are PUSCHs sent by a terminal device based on the first nominal PUSCH repetition and the second nominal PUSCH repetition. The processing unit is configured to: determine, based on the indication information, precoding information corresponding to different nominal PUSCH repetitions, and decode user data based on to the precoding information. These modules may perform corresponding functions in the method example in the second aspect. For details, refer to the detailed descriptions in the method example. Details are not described herein again.

According to a fifth aspect, an embodiment of this application provides a method for sending a physical uplink shared channel. The method may be applied to a terminal device, or the method may be applied to a communication apparatus that can support a terminal device in implementing the method. For example, the communication apparatus includes a chip system. The method includes: After receiving indication information, the terminal device sends N PUSCHs based on precoding information indicated by the indication information. The indication information is used to indicate first information and second information. The first information is used to indicate first precoding information corresponding to a first nominal PUSCH repetition. The second information is used to indicate second precoding information corresponding to a second nominal PUSCH repetition. The precoding information corresponding to the N PUSCHs includes at least one of the first precoding information and the second precoding information. Time domain resources occupied by the N PUSCHs are all or a part of time domain resources occupied by the first nominal PUSCH repetition in at least one time unit, or time domain resources occupied by the N PUSCHs are all or a part of time domain resources occupied by the first nominal PUSCH repetition and the second nominal PUSCH repetition in at least one time unit, and N is an integer greater than or equal to 2.

According to the method for sending a physical uplink shared channel provided in this embodiment of this application, the terminal device may determine, based on the received indication information, different precoding information corresponding to two nominal PUSCH repetitions, and for uplink channels with different channel quality, PUSCHs that carry uplink data may be transmitted by using different precoding matrices. This effectively improves uplink data reliability and uplink transmission efficiency.

According to a sixth aspect, an embodiment of this application provides a method for receiving a physical uplink shared channel. The method may be applied to a network device, or the method may be applied to a communication apparatus that can support a network device in implementing the method. For example, the communication apparatus includes a chip system. The method includes: The network device receives M PUSCHs after sending indication information. The indication information is used to indicate first information and second information. The first information is used to indicate first precoding information corresponding to a first nominal PUSCH repetition. The second information is used to indicate second precoding information corresponding to a second nominal PUSCH repetition. Precoding information corresponding to the M PUSCHs is the first precoding information. Time domain resources occupied by the M PUSCHs are all or a part of time domain resources occupied by the first nominal PUSCH repetition in at least one time unit, M is an integer less than or equal to N, and N PUSCHs are PUSCHs sent by a terminal device based on the first nominal PUSCH repetition and the second nominal PUSCH repetition.

According to the method for receiving a physical uplink shared channel provided in this embodiment of this application, the network device indicates, to the terminal device by using the indication information, precoding information corresponding to two nominal PUSCH repetitions, so that the terminal device may determine, based on the received indication information, different precoding information corresponding to the two nominal PUSCH repetitions, and for uplink channels with different channel quality, PUSCHs that carry uplink data may be transmitted by using different precoding matrices. This effectively improves uplink data reliability and uplink transmission efficiency.

In a possible design, the N PUSCHs include a first PUSCH and a second PUSCH, precoding information corresponding to the first PUSCH is the first precoding information, and precoding information corresponding to the second PUSCH is the first precoding information.

In some possible implementations, time domain resources occupied by the first PUSCH and the second PUSCH are all or a part of time domain resources occupied by the first nominal PUSCH repetition in a first time unit, a start symbol of the first PUSCH is the same as a start symbol of the first nominal PUSCH repetition, and at least one valid symbol and at least one invalid symbol are included between the start symbol of the first PUSCH and an end symbol of the first time unit. If an end symbol of the second PUSCH is the same as an end symbol of the first nominal PUSCH repetition, the time domain resources occupied by the first PUSCH and the second PUSCH are the part of time domain resources occupied by the first nominal PUSCH repetition in the first time unit; or if an end symbol of the second PUSCH follows an end symbol of the first nominal PUSCH repetition, the time domain resources occupied by the first PUSCH and the second PUSCH are all of the time domain resources occupied by the first nominal PUSCH repetition in the first time unit. The first nominal PUSCH repetition is divided into two PUSCHs by at least one invalid symbol, and the two PUSCHs that carry uplink data are transmitted by using the first precoding information corresponding to the first nominal PUSCH repetition. This effectively improves uplink data reliability and uplink transmission efficiency.

In some other possible implementations, time domain resources occupied by the first PUSCH and the second PUSCH are all or a part of time domain resources occupied by the first nominal PUSCH repetition in a first time unit and a second time unit, a start symbol of the first PUSCH is the same as a start symbol of the first nominal PUSCH repetition, an end symbol of the first time unit precedes an end symbol of the first nominal PUSCH repetition, and the first time unit is adjacent to the second time unit in time domain. The first nominal PUSCH repetition is divided into two PUSCHs by a boundary of a time unit, and the two PUSCHs that carry uplink data are transmitted by using the first precoding information corresponding to the first nominal PUSCH repetition. This effectively improves uplink data reliability and uplink transmission efficiency.

Optionally, the N PUSCHs further include a third PUSCH, precoding information corresponding to the third PUSCH is the second precoding information, and a start symbol of the third PUSCH is the same as a start symbol of the second nominal PUSCH repetition.

In another possible design, the N PUSCHs include a first PUSCH and a second PUSCH, precoding information corresponding to the first PUSCH is the first precoding information, and precoding information corresponding to the second PUSCH is the second precoding information.

In some possible implementations, time domain resources occupied by the first PUSCH and the second PUSCH are all or a part of time domain resources occupied by the first nominal PUSCH repetition in a first time unit and a second time unit, a start symbol of the first PUSCH is the same as a start symbol of the first nominal PUSCH repetition, an end symbol of the first time unit precedes an end symbol of the first nominal PUSCH repetition, and the first time unit is adjacent to the second time unit in time domain. The first nominal PUSCH repetition is divided into two PUSCHs by a boundary of a time unit, and the two PUSCHs that carry uplink data are transmitted by using the first precoding information corresponding to the first nominal PUSCH repetition and the second precoding information corresponding to the second nominal PUSCH repetition, so that the two PUSCHs are sent to different TRPs, and diversity gains are obtained. This effectively improves uplink data reliability and uplink transmission efficiency.

In some other possible implementations, a time domain resource occupied by the first PUSCH is all of time domain resources occupied by the first nominal PUSCH repetition in a first time unit, a time domain resource occupied by the second PUSCH is all of time domain resources occupied by the second nominal PUSCH repetition in a second time unit, and the first time unit is adjacent to the second time unit in time domain. Therefore, for uplink channels with different channel quality, PUSCHs that carry uplink data may be transmitted by using different precoding matrices. This effectively improves uplink data reliability and uplink transmission efficiency.

Further, the method further includes: obtaining the first information and the second information by using DCI.

The indication information is precoding information and a quantity of layers, or the indication information is sounding reference signal resource indicator (sounding reference signal resource indicator, SRI) information. If the indication information is the precoding information and the quantity of layers, the first information is further used to indicate a first quantity of layers, and the second information is further used to indicate a second quantity of layers. Optionally, the first quantity of layers is the same as the second quantity of layers. If the indication information is used to indicate index values of a plurality of SRS resources, the index values of the plurality of SRS resources include an index value of a first SRS resource and an index value of a second SRS resource, the index value of the first SRS resource is used to indicate the first precoding information corresponding to the first nominal PUSCH repetition, and the index value of the second SRS resource is used to indicate the second precoding information corresponding to the second nominal PUSCH repetition.

According to a seventh aspect, an embodiment of this application further provides a communication apparatus. For beneficial effects, refer to the descriptions of the fifth aspect. Details are not described herein again. The communication apparatus has a function of implementing a behavior in the method embodiment in the fifth aspect. The function may be implemented by using hardware, or may be implemented by hardware executing corresponding software. The hardware or the software includes one or more modules corresponding to the foregoing functions. In a possible design, the communication apparatus includes a transceiver unit and a processing unit. The transceiver unit is configured to: receive indication information from a network device, and send N PUSCHs, where the indication information is used to indicate first information and second information. The first information is used to indicate first precoding information corresponding to a first nominal PUSCH repetition. The second information is used to indicate second precoding information corresponding to a second nominal PUSCH repetition. Precoding information corresponding to the N PUSCHs includes at least one of the first precoding information and the second precoding information. Time domain resources occupied by the N PUSCHs are all or a part of time domain resources occupied by the first nominal PUSCH repetition in at least one time unit, or time domain resources occupied by the N PUSCHs are all or a part of time domain resources occupied by the first nominal PUSCH repetition and the second nominal PUSCH repetition in at least one time unit, and N is an integer greater than or equal to 2. The processing unit is configured to: determine, based on the indication information, precoding information corresponding to different nominal PUSCH repetitions, and precode user data based on to the precoding information. These modules may perform corresponding functions in the method example in the fifth aspect. For details, refer to the detailed descriptions in the method example. Details are not described herein again.

According to an eighth aspect, an embodiment of this application further provides a communication apparatus. For beneficial effects, refer to the descriptions of the sixth aspect. Details are not described herein again. The communication apparatus has a function of implementing a behavior in the method embodiment in the sixth aspect. The function may be implemented by using hardware, or may be implemented by hardware executing corresponding software. The hardware or the software includes one or more modules corresponding to the foregoing functions. In a possible design, the communication apparatus includes a transceiver unit and a processing unit. The transceiver unit is configured to: send indication information, and receive M PUSCHs, where the indication information is used to indicate first information and second information. The first information is used to indicate first precoding information corresponding to a first nominal PUSCH repetition. The second information is used to indicate second precoding information corresponding to a second nominal PUSCH repetition. Precoding information corresponding to the M PUSCHs is the first precoding information, time domain resources occupied by the M PUSCHs are all or a part of time domain resources occupied by the first nominal PUSCH repetition in at least one time unit, M is an integer less than or equal to N, and N PUSCHs are PUSCHs sent by a terminal device based on the first nominal PUSCH repetition and the second nominal PUSCH repetition. The processing unit is configured to: determine, based on the indication information, precoding information corresponding to different nominal PUSCH repetitions, and decode user data based on to the precoding information. These modules may perform corresponding functions in the method example in the sixth aspect. For details, refer to the detailed descriptions in the method example. Details are not described herein again.

According to a ninth aspect, a communication apparatus is provided. The communication apparatus may be the terminal device in the foregoing method embodiments, or may be a chip disposed in the terminal device. The communication apparatus includes a communication interface and a processor; and optionally, further includes a memory. The memory is configured to store a computer program or instructions. The processor is coupled to the memory and the communication interface. When the processor executes the computer program or the instructions, the communication apparatus is enabled to perform the methods performed by the terminal device in the foregoing method embodiments.

According to a tenth aspect, a communication apparatus is provided. The communication apparatus may be the network device in the foregoing method embodiments, or may be a chip disposed in the network device. The communication apparatus includes a communication interface and a processor; and optionally, further includes a memory. The memory is configured to store a computer program or instructions. The processor is coupled to the memory and the communication interface. When the processor executes the computer program or the instructions, the communication apparatus is enabled to perform the methods performed by the network device in the foregoing method embodiments.

According to an eleventh aspect, a computer program product is provided. The computer program product includes computer program code. When the computer program code is run, the methods performed by the terminal device in the foregoing aspects is performed.

According to a twelfth aspect, a computer program product is provided. The computer program product includes computer program code. When the computer program code is run, the methods performed by the network device in the foregoing aspects is performed.

According to a thirteenth aspect, this application provides a chip system. The chip system includes a processor, configured to implement functions of the terminal device in the methods in the foregoing aspects. In a possible design, the chip system further includes a memory, configured to store program instructions and/or data. The chip system may include a chip, or may include a chip and another discrete component.

According to a fourteenth aspect, this application provides a chip system. The chip system includes a processor, configured to implement functions of the network device in the methods in the foregoing aspects. In a possible design, the chip system further includes a memory, configured to store program instructions and/or data. The chip system may include a chip, or may include a chip and another discrete component.

According to a fifteenth aspect, this application provides a computer-readable storage medium. The computer-readable storage medium stores a computer program. When the computer program is run, the methods performed by the terminal device in the foregoing aspects is implemented.

According to a sixteenth aspect, this application provides a computer-readable storage medium. The computer-readable storage medium stores a computer program. When the computer program is run, the methods performed by the network device in the foregoing aspects is implemented.

According to a seventeenth aspect, this application further provides a communication system. The communication system includes the terminal device described in the third aspect or the communication apparatus that supports the terminal device in implementing the method described in the first aspect, and the network device described in the fourth aspect or the communication apparatus that supports the network device in implementing the method described in the second aspect.

Alternatively, the communication system includes the terminal device described in the seventh aspect or the communication apparatus that supports the terminal device in implementing the method described in the fifth aspect, and the network device described in the eighth aspect or the communication apparatus that supports the network device in implementing the method described in the sixth aspect.

Alternatively, the communication system includes the terminal device described in the ninth aspect or the communication apparatus that supports the terminal device in implementing the method described in the first aspect or the fifth aspect, and the network device described in the tenth aspect or the communication apparatus that supports the network device in implementing the method described in the second aspect or the sixth aspect.

In this application, names of the terminal device, the network device, and the communication apparatus constitute no limitation on the device. During actual implementation, the devices may have other names. Provided that functions of the devices are similar to those in this application, the devices fall within the scope of the claims of this application and equivalent technologies thereof.

DESCRIPTION OF EMBODIMENTS

Figure 1:
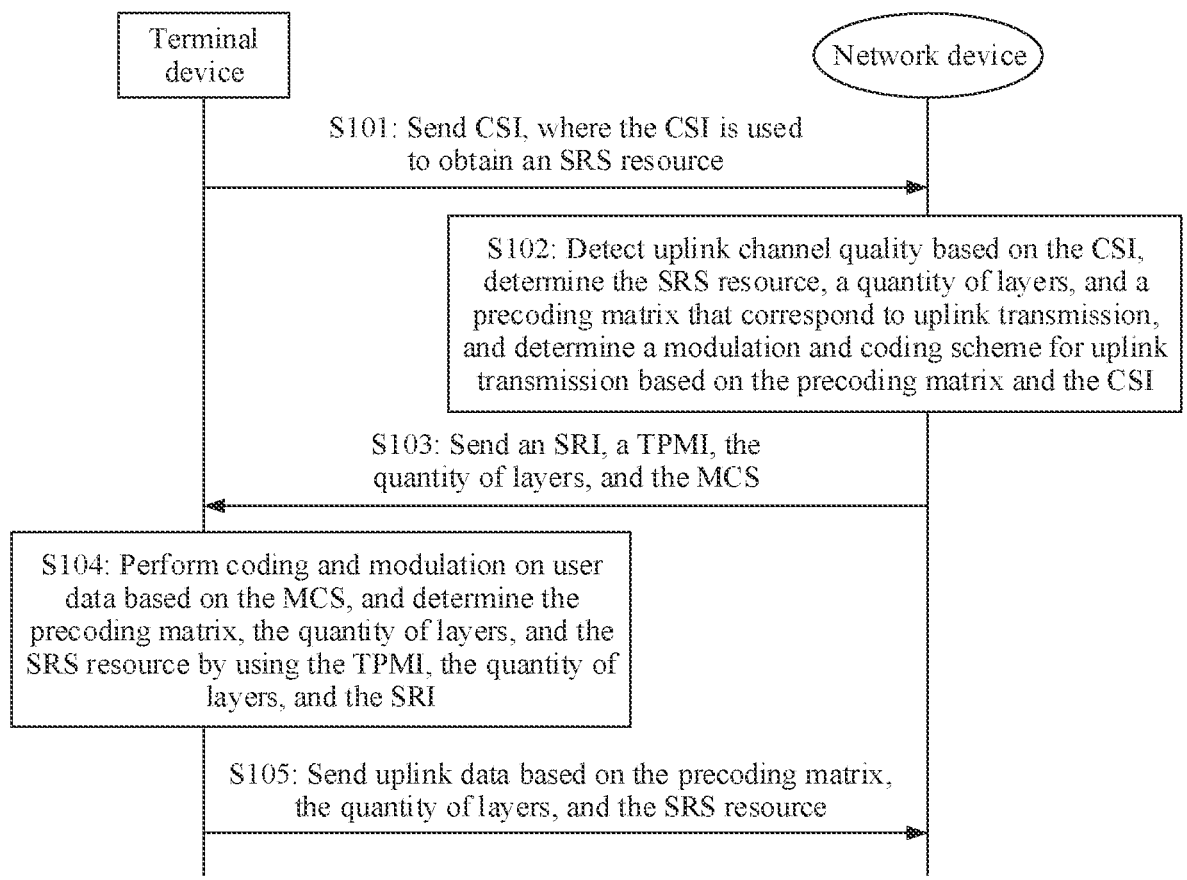
FIG. 1 is a flowchart of obtaining uplink transmission information according to an embodiment of this application.

In this specification, claims, and accompanying drawings of this application, the terms "first", "second", "third", and the like are intended to distinguish between different objects but do not limit a particular order.

In embodiments of this application, the word "example", "for example", or the like is used to represent giving an example, an illustration, or a description. Any embodiment or design scheme described as an "example" or "for example" in embodiments of this application should not be explained as being more preferred or having more advantages than another embodiment or design scheme. Exactly, use of the word "example", "for example", or the like is intended to present a related concept in a specific manner.

For clear and brief description of the following embodiments, a related technology is briefly described first.

A process in which a terminal device sends data to a network device may be referred to as uplink transmission. Usually, the terminal device performs channel coding, modulation, layer mapping, and precoding on an original bit to generate a baseband signal, and maps the baseband signal to an antenna for sending. Multi-antenna-based uplink transmission includes codebook-based uplink transmission and non-codebook-based uplink transmission.

The codebook-based uplink transmission refers to a multi-antenna transmission technology in which a precoding matrix for uplink transmission is determined based on a fixed codebook. The fixed codebook may be a codebook indicated by the network device. In a 5G new radio (new radio, NR) system, the network device may configure a sounding reference signal (sounding reference signal, SRS) resource set for the terminal device. The terminal device determines, by using an SRS resource in the SRS resource set, an antenna, analog beamforming, and the like that are used to transmit a physical uplink shared channel (physical uplink shared channel, PUSCH), to transmit the PUSCH. Different SRS resource sets may be configured for different terminal devices. For example, quantities of SRS resources included in different SRS resource sets may be the same or different. Optionally, the network device may indicate, to the terminal device by using an SRI, the SRS resource set corresponding to the PUSCH. A size of an SRI information field that is in the SRI and that is used to indicate an SRS resource corresponding to the PUSCH depends on a quantity of SRS resources, and the quantity of SRS resources is configured by the network device based on an uplink transmission mode of the PUSCH. If the network device configures one SRS resource for the terminal device, a PUSCH in a codebook-based uplink transmission scheme corresponds to the SRS resource, and there may be no SRI information field in the SRI.

Optionally, a transmit precoding matrix indicator (transmit precoding matrix indicator, TPMI) and an indicator of a quantity of transport layers may be indicated in a form of joint coding by using a same SRI information field. The TPMI is used to indicate a precoding matrix. The indicator of a quantity of transport layers is used to indicate a quantity of layers. A quantity of bits occupied by the SRI information field depends on a waveform type of uplink transmission, a quantity of SRS ports included in an SRS resource, maximum transport stream quantity restriction signaling, and codebook subset restriction signaling.

For example, FIG. 1 is a flowchart of obtaining uplink transmission information according to an embodiment of this application.

S101: A terminal device sends channel state information (channel state information, CSI) to a network device, where the CSI is used to obtain an SRS resource. Correspondingly, the network device receives the CSI from the terminal device.

S102: The network device detects uplink channel quality based on the CSI, determines the SRS resource, a quantity of layers, and a precoding matrix that correspond to uplink transmission, and determines a modulation and coding scheme (modulation and coding scheme, MCS) for uplink transmission based on the precoding matrix and the CSI.

S103: The network device sends an SRI, a TPMI, the quantity of layers, and the MCS to the terminal device.

Correspondingly, the terminal device receives the SRI, the TPMI, the quantity of layers, and the MCS from the network device.

S104: The terminal device performs coding and modulation on user data based on the MCS, and determines the precoding matrix, the quantity of layers, and the SRS resource by using the TPMI, the quantity of layers, and the SRI.

S105: The terminal device sends uplink data based on the precoding matrix, the quantity of layers, and the SRS resource. Correspondingly, the network device receives the uplink data from the terminal device.

It should be noted that a same precoding scheme is used for a demodulation reference signal (demodulation reference signal, DMRS) corresponding to a PUSCH and uplink data carried on the PUSCH. The network device estimates an uplink channel based on the DMRS, and detects the uplink data. The network device may configure, for the terminal device, a maximum of one SRS resource set used to send the CSI. A maximum of two SRS resources may be configured in the SRS resource set, and the two SRS resources include a same quantity of SRS antenna ports.

Non-codebook-based uplink transmission refers to a multi-antenna transmission technology in which a precoding matrix for uplink transmission is determined based on channel reciprocity. The precoding matrix is not limited to a limited candidate subset based on a fixed codebook. If the channel reciprocity is good enough, the terminal device can obtain a better precoding matrix. In comparison with a codebook-based transmission scheme, this scheme can reduce precoding indication overheads and obtain better performance. To determine the precoding matrix based on the channel reciprocity, the terminal device may configure a plurality of downlink reference signals, for example, a channel state information-reference signal (channel state information-reference signal, CSI-RS) or a DMRS. The CSI-RS may be used for beam management and downlink CSI measurement. The DMRS is used to demodulate a downlink channel.

Figure 2:
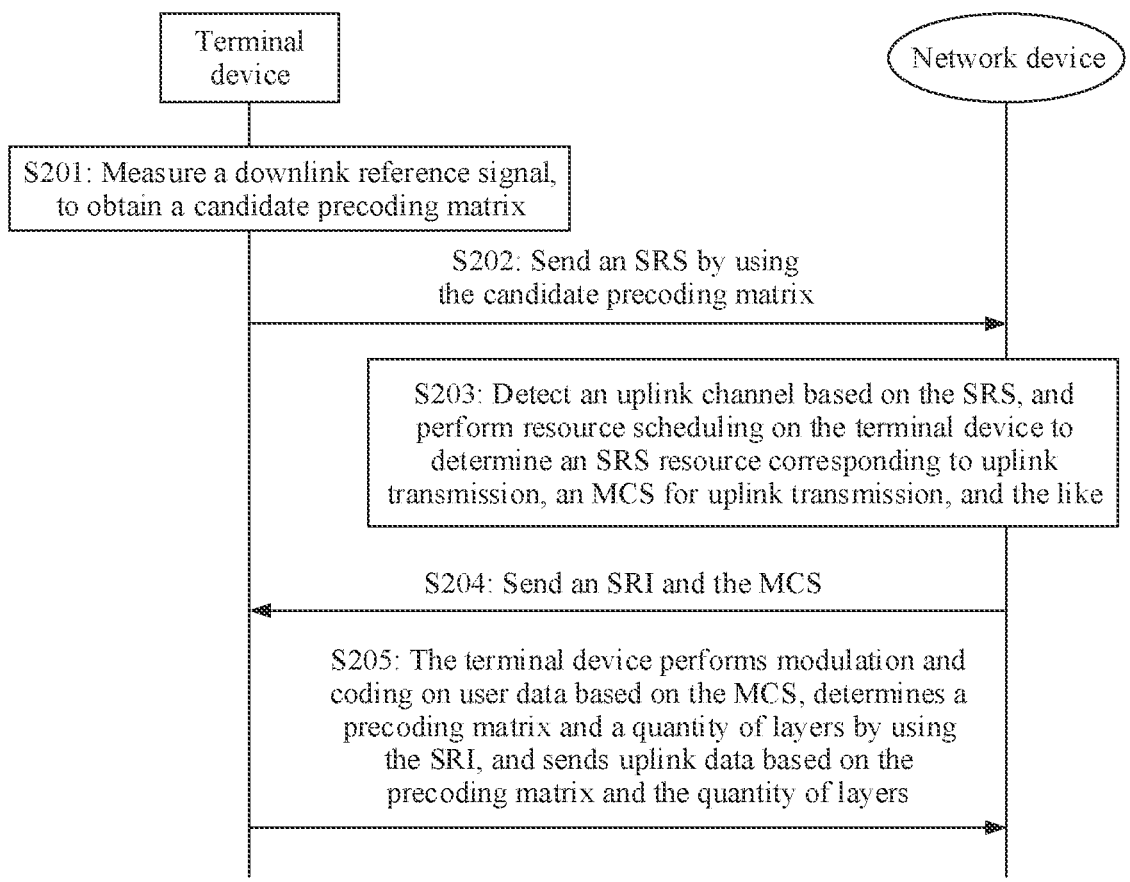
FIG. 2 is a flowchart of obtaining uplink transmission information according to an embodiment of this application.

For example, FIG. 2 is a flowchart of obtaining uplink transmission information according to an embodiment of this application.

S201: A terminal device measures a downlink reference signal, to obtain a candidate precoding matrix.

S202: The terminal device sends an SRS to a network device by using the candidate precoding matrix. Correspondingly, the network device receives the SRS from the terminal device.

S203: The network device detects an uplink channel based on the SRS, and performs resource scheduling on the terminal device, to determine an SRS resource corresponding to uplink transmission, an MCS for uplink transmission, and the like.

S204: The network device sends an SRI and the MCS to the terminal device. Correspondingly, the terminal device receives the SRI and the MCS from the network device.

S205: The terminal device performs modulation and coding on user data based on the MCS, determines a precoding matrix and a quantity of layers by using the SRI, and sends uplink data based on the precoding matrix and the quantity of layers. Correspondingly, the network device receives the uplink data from the terminal device.

It should be noted that, for non-codebook-based uplink transmission, a same precoding scheme is used for a DMRS corresponding to a PUSCH and uplink data carried on the PUSCH.

Therefore, after determining an uplink channel state, and performing preprocessing such as precoding, power control, and phase adjustment on the uplink data based on the uplink channel state, the terminal device sends the preprocessed uplink data, so that transmission efficiency of uplink data transmission can be improved, and signal processing complexity of the network device can be reduced.

Table 1 shows a precoding matrix used for single-layer transmission of two antenna ports.

TABLE 1

| TPMI index | Precoding matrix | | | | | |
|---|---|---|---|---|---|---|
| 0 to 5 | $\frac{1}{\sqrt{2}}\begin{bmatrix}1\\0\end{bmatrix}$ | $\frac{1}{\sqrt{2}}\begin{bmatrix}0\\1\end{bmatrix}$ | $\frac{1}{\sqrt{2}}\begin{bmatrix}1\\1\end{bmatrix}$ | $\frac{1}{\sqrt{2}}\begin{bmatrix}1\\-1\end{bmatrix}$ | $\frac{1}{\sqrt{2}}\begin{bmatrix}1\\j\end{bmatrix}$ | $\frac{1}{\sqrt{2}}\begin{bmatrix}1\\-j\end{bmatrix}$ |

It can be learned from Table 1 that TPMI indexes in ascending order respectively correspond to precoding matrices from left to right. For example, when the TPMI index is 0, the precoding matrix is $$\frac{1}{\sqrt{2}}\begin{bmatrix}1\\0\end{bmatrix};$$

when the TPMI index is 1, the precoding matrix is $$\frac{1}{\sqrt{2}}\begin{bmatrix}0\\1\end{bmatrix};$$

when the TPMI index is 2, the precoding matrix is $$\frac{1}{\sqrt{2}}\begin{bmatrix}1\\1\end{bmatrix};$$

when the TPMI index is 3, the precoding matrix is $$\frac{1}{\sqrt{2}}\begin{bmatrix}1\\-1\end{bmatrix};$$

when the TPMI index is 4, the precoding matrix is $$\frac{1}{\sqrt{2}}\begin{bmatrix}1\\j\end{bmatrix};$$

and when the TPMI index is 5, the precoding matrix is $$\frac{1}{\sqrt{2}}\begin{bmatrix}1\\-j\end{bmatrix}.$$

Table 2 shows a precoding matrix used for single-layer transmission of four antenna ports.

TABLE 2

| TPMI index | Precoding matrix | | | | | | | |
|---|---|---|---|---|---|---|---|---|
| 0 to 7 | $\frac{1}{2}\begin{bmatrix}1\\0\\0\\0\end{bmatrix}$ | $\frac{1}{2}\begin{bmatrix}0\\1\\0\\0\end{bmatrix}$ | $\frac{1}{2}\begin{bmatrix}0\\0\\1\\0\end{bmatrix}$ | $\frac{1}{2}\begin{bmatrix}0\\0\\0\\1\end{bmatrix}$ | $\frac{1}{2}\begin{bmatrix}1\\0\\1\\0\end{bmatrix}$ | $\frac{1}{2}\begin{bmatrix}1\\0\\-1\\0\end{bmatrix}$ | $\frac{1}{2}\begin{bmatrix}1\\0\\j\\0\end{bmatrix}$ | $\frac{1}{2}\begin{bmatrix}1\\0\\-j\\0\end{bmatrix}$ |
| 8 to 15 | $\frac{1}{2}\begin{bmatrix}0\\1\\0\\1\end{bmatrix}$ | $\frac{1}{2}\begin{bmatrix}0\\1\\0\\-1\end{bmatrix}$ | $\frac{1}{2}\begin{bmatrix}0\\1\\0\\j\end{bmatrix}$ | $\frac{1}{2}\begin{bmatrix}0\\1\\0\\-j\end{bmatrix}$ | $\frac{1}{2}\begin{bmatrix}1\\1\\1\\-1\end{bmatrix}$ | $\frac{1}{2}\begin{bmatrix}1\\1\\j\\j\end{bmatrix}$ | $\frac{1}{2}\begin{bmatrix}1\\1\\-1\\1\end{bmatrix}$ | $\frac{1}{2}\begin{bmatrix}1\\1\\-j\\-j\end{bmatrix}$ |
| 16 to 23 | $\frac{1}{2}\begin{bmatrix}1\\j\\1\\j\end{bmatrix}$ | $\frac{1}{2}\begin{bmatrix}1\\j\\j\\1\end{bmatrix}$ | $\frac{1}{2}\begin{bmatrix}1\\j\\-1\\-j\end{bmatrix}$ | $\frac{1}{2}\begin{bmatrix}1\\j\\-j\\-1\end{bmatrix}$ | $\frac{1}{2}\begin{bmatrix}1\\-1\\1\\1\end{bmatrix}$ | $\frac{1}{2}\begin{bmatrix}1\\-1\\j\\-j\end{bmatrix}$ | $\frac{1}{2}\begin{bmatrix}1\\-1\\-1\\-1\end{bmatrix}$ | $\frac{1}{2}\begin{bmatrix}1\\-1\\-j\\j\end{bmatrix}$ |
| 24 to 27 | $\frac{1}{2}\begin{bmatrix}1\\-j\\1\\-j\end{bmatrix}$ | $\frac{1}{2}\begin{bmatrix}1\\-j\\j\\-1\end{bmatrix}$ | $\frac{1}{2}\begin{bmatrix}1\\-j\\-1\\j\end{bmatrix}$ | $\frac{1}{2}\begin{bmatrix}1\\-j\\-j\\1\end{bmatrix}$ | — | — | — | — |

It can be learned from Table 2 that TPMI indexes in ascending order respectively correspond to precoding matrices from left to right. For example, when the TPMI index is 0, the precoding matrix is $$\frac{1}{2}\begin{bmatrix}1\\0\\0\\0\end{bmatrix};$$

when the TPMI index is 3, the precoding matrix is $$\frac{1}{2}\begin{bmatrix}0\\0\\0\\1\end{bmatrix};$$

when the TPMI index is 7, the precoding matrix $$\frac{1}{2}\begin{bmatrix}1\\0\\-j\\0\end{bmatrix};$$

when the TPMI index is 9, the precoding matrix is $$\frac{1}{2}\begin{bmatrix}0\\1\\0\\-1\end{bmatrix};$$

when the TPMI index is 22, the precoding matrix is $$\frac{1}{2}\begin{bmatrix}1\\-1\\-1\\-1\end{bmatrix};$$

and when the TPMI index is 25, the precoding matrix is $$\frac{1}{2}\begin{bmatrix}1\\-j\\j\\-1\end{bmatrix}.$$

The following describes implementations of embodiments of this application in detail with reference to the accompanying drawings.

Figure 3:
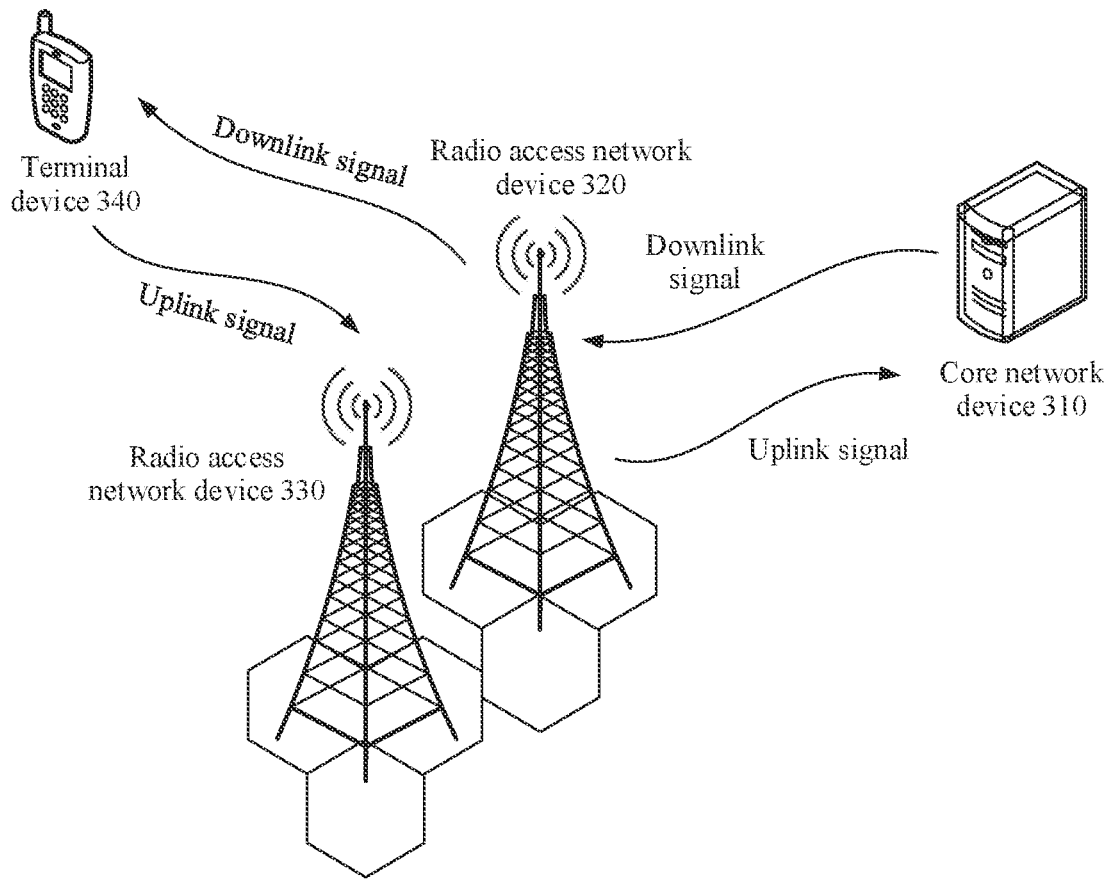
FIG. 3 is a schematic diagram of an architecture of a mobile communication system to which an embodiment of this application is applied.

FIG. 3 is a schematic diagram of an architecture of a mobile communication system to which an embodiment of this application is applied. As shown in FIG. 3, the mobile communication system includes a core network device 310, a radio access network device 320, a radio access network device 330, and a terminal device 340. The terminal device is connected to the radio access network device in a wireless manner, and the radio access network device is connected to the core network device in a wireless or wired manner. The core network device and the radio access network device may be independent and different physical devices, or a function of the core network device and a logical function of the radio access network device may be integrated into a same physical device, or a part of functions of the core network device and a part of functions of the radio access network device may be integrated into one physical device. The terminal device may be located at a fixed position, or may be mobile. FIG. 3 is merely a schematic diagram. The communication system may further include other network devices. For example, the communication system may further include a wireless relay device and a wireless backhaul device, which are not drawn in FIG. 3. Quantities of core network devices, radio access network devices, and terminal devices included in the mobile communication system are not limited in this embodiment of this application.

The radio access network device is an access device that is used by the terminal device to access the mobile communication system in a wireless manner. The radio access network device may be a base station (base station), an evolved NodeB (evolved NodeB, eNodeB), a transmission reception point (transmission reception point, TRP), a next generation NodeB (next generation NodeB, gNB) in a 5G mobile communication system, a base station in a future mobile communication system, an access node in a Wi-Fi system, and the like, or may be a module or a unit that completes a part of functions of a base station, for example, may be a central unit (central unit, CU) or a distributed unit (distributed unit, DU). A specific technology and a specific device form that are used by the radio access network device are not limited in embodiments of this application. In this application, the radio access network device is a network device for short. Unless otherwise specified, network devices are all radio access network devices. For example, the radio access network device 320 may be referred to as a network device 320. The radio access network device 330 may be referred to as a network device 330.

The terminal device may also be referred to as a terminal, user equipment (user equipment, UE), a mobile station, a mobile terminal, or the like. The terminal device may be a mobile phone, a tablet computer (Pad), a computer having a wireless transceiver function, a virtual reality terminal device, an augmented reality terminal device, a wireless terminal in industrial control, a wireless terminal in self-driving, a wireless terminal in remote surgery, a wireless terminal in a smart grid, a wireless terminal in transportation safety, a wireless terminal in a smart city, a wireless terminal in a smart home, or the like. A specific technology and a specific device form that are used by the terminal device are not limited in embodiments of this application.

This application may be applied to a 5G new radio (new radio, NR) system, or may be applied to another communication system, provided that an entity in the communication system needs to send transmission direction indication information, and another entity needs to receive the indication information and determine a transmission direction within a specific time period based on the indication information.

The network device and the terminal device may be deployed on the land, including an indoor device, an outdoor device, a handheld device, or a vehicle-mounted device; may be deployed on the water surface; or may be deployed on a plane, a balloon, and a satellite in the air. Application scenarios of the network device and the terminal device are not limited in embodiments of this application.

Communication between the network device and the terminal device may be performed by using a licensed spectrum (licensed spectrum), may be performed by using an unlicensed spectrum (unlicensed spectrum), or may be performed by using both a licensed spectrum and an unlicensed spectrum. The network device and the terminal device may communicate with each other by using a spectrum below 6 gigahertz (gigahertz, GHz), may communicate with each other by using a spectrum above 6 GHz, or may communicate with each other by using both the spectrum below 6 GHz and the spectrum above 6 GHz. A spectrum resource used between the network device and the terminal device is not limited in embodiments of this application.

In embodiments of this application, a time domain symbol may be an orthogonal frequency division multiplexing (orthogonal frequency division multiplexing, OFDM) symbol, or may be a single carrier-frequency division multiplexing (single carrier-frequency division multiplexing, SC-FDM) symbol. Unless otherwise specified, symbols in embodiments of this application are all of time domain symbols.

It may be understood that, in embodiments of this application, a PUSCH is merely used as an example of an uplink data channel, and a data channel may have different names in different systems and different scenarios. This is not limited in embodiments of this application.

If the terminal device 340 is located at a boundary of coverage of the network device 320 and the network device 330, channel quality of uplink channels between the terminal device 340 and the two network devices may be poor. Either of the two network devices may indicate the terminal device 340 to separately send PUSCHs to the two network devices. To be specific, the terminal device 340 may send a PUSCH 1 to the network device 320, and the terminal device 340 sends a PUSCH 2 to the network device 330.

Generally, the network device indicates one precoding matrix by using DCI. Therefore, two PUSCHs carry uplink data precoded by using a same precoding matrix, and the two PUSCHs carry a same transport block. Because channel quality of uplink channels between the terminal device 340 and the two network devices may be different, uplink data reliability and uplink transmission efficiency may be reduced for transmitting the uplink data to different network devices by using a same precoding matrix.

To resolve a problem of how to transmit uplink data to different network devices by using different precoding matrices, embodiments of this application provide a method for sending a physical uplink shared channel. The method includes: A network device sends indication information to a terminal device, where the indication information is used to indicate first information and second information. The first information is used to indicate first precoding information corresponding to a first nominal (nominal) PUSCH repetition (repetition). The second information is used to indicate second precoding information corresponding to a second nominal PUSCH repetition. After receiving the indication information, the terminal device sends N PUSCHs based on precoding information indicated by the indication information. The precoding information corresponding to the N PUSCHs includes at least one of the first precoding information and the second precoding information. Time domain resources occupied by the N PUSCHs are all or a part of time domain resources occupied by the first nominal PUSCH repetition in at least one consecutive time unit, or time domain resources occupied by the N PUSCHs are all or a part of time domain resources occupied by the first nominal PUSCH repetition and the second nominal PUSCH repetition in at least one consecutive time unit, and N is an integer greater than or equal to 2. Therefore, the terminal device may determine, based on the received indication information, that two nominal PUSCH repetitions correspond to different precoding information, and for uplink channels with different channel quality, PUSCHs that carry uplink data may be transmitted by using different precoding matrices. This effectively improves uplink data reliability and uplink transmission efficiency.

A time domain granularity for resource scheduling in a 5G mobile communication system needs to be more flexible.

Specifically, in 5G, both a time domain scheduling granularity of a time unit level and a time domain scheduling granularity of a mini-time unit are supported. For example, scheduling at a time unit granularity is mainly used for an eMBB service, and scheduling at a mini-time unit granularity is mainly used for a URLLC service. It should be noted that the foregoing time unit and mini-time unit are general descriptions. A specific example may be that the time unit may be a slot, and the mini-time unit may be a mini-slot, a sub-slot (sub-slot), a non-slot (non-slot-based), or a mini-slot (mini-slot); or the time unit may be a subframe, and the mini-time unit may be a mini-subframe. Another similar time domain resource division manner is not limited. In this application, an example in which the time unit is a slot is used below for description. For example, one slot may include 14 time domain symbols, and a quantity of time domain symbols included in one mini-slot is less than 14, for example, 2, 3, 4, 5, 6, or 7. A specific value is not limited either. A slot with a subcarrier spacing of 15 kilohertz (kilohertz, kHz) includes 12 or 14 time domain symbols, and a corresponding time length is 1 millisecond (millisecond, ms). For a slot with a subcarrier spacing of 60 kHz, a corresponding time length is shortened to 0.25 ms.

Figure 4A:
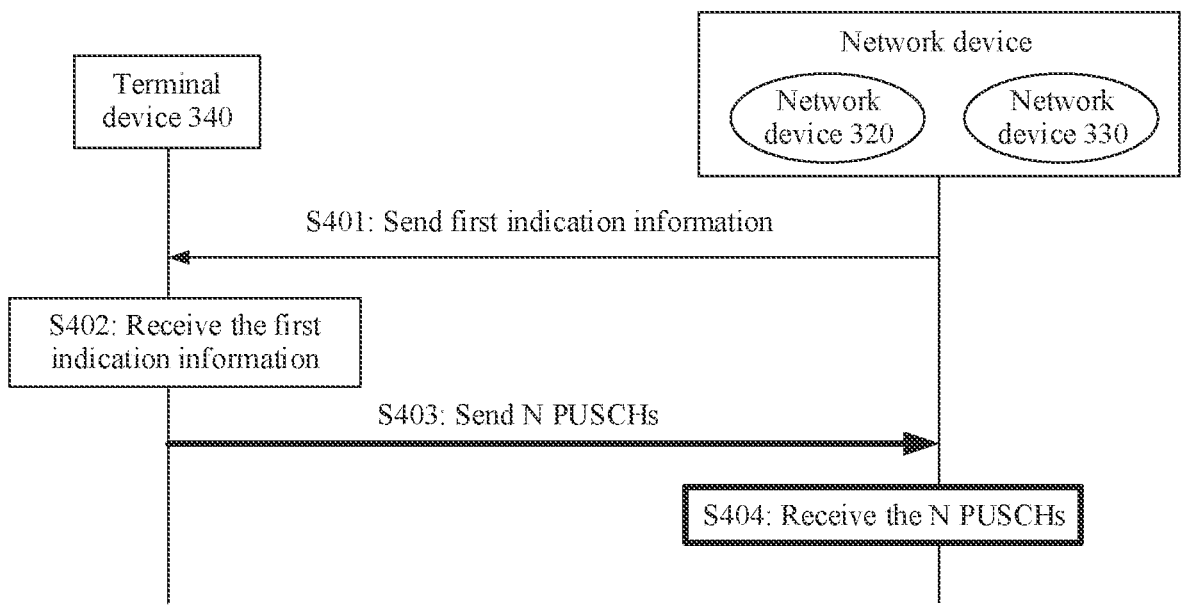
FIG. 4A is a flowchart of a method for sending a physical uplink shared channel according to an embodiment of this application.

FIG. 4A is a flowchart of a method for sending a physical uplink shared channel according to an embodiment of this application. Herein, a network device 320, a network device 330, and a terminal device 340 are used as an example for description. As shown in FIG. 4A, the method may include the following steps.

S401: The network device 320 sends first indication information to the terminal device 340.

The first indication information is used to indicate first information and second information. The first information is used to indicate first precoding information corresponding to a first nominal PUSCH repetition. The second information is used to indicate second precoding information corresponding to a second nominal PUSCH repetition.

In a possible design, the first indication information may be precoding information and indication information of a quantity of layers. The precoding information and the quantity of layers may also be described as transmission precoding information and a quantity of layers. For example, the first indication information may be values of the precoding information and an information field of the quantity of layers in DCI. The values of the precoding information and the information field of the quantity of layers may indicate the first information and the second information. When the values of the precoding information and the information field of the quantity of layers vary, the first precoding information indicated by the first information also varies, and the second precoding information indicated by the second information also varies. The first information is further used to indicate a first quantity of layers, and the second information is further used to indicate a second quantity of layers. It may be understood that the first information includes the first precoding information and the first quantity of layers, and the second information includes the second precoding information and the second quantity of layers. Optionally, the values of the precoding information and the information field of the quantity of layers may be indexes of the precoding information and the quantity of layers. The indexes of the precoding information and the quantity of layers are used to indicate the first information and the second information. Optionally, the first quantity of layers is the same as the second quantity of layers.

In this specification, the quantity of layers may alternatively be described as a "quantity of transport layers". The first quantity of layers may alternatively be described as a "first quantity of transport layers". The second quantity of layers may alternatively be described as a "second quantity of transport layers".

In some embodiments, a correspondence between the values of the precoding information and the information field of the quantity of layers and the precoding information may be presented in a form of a table. For example, Table 3 shows the correspondence between the values of the precoding information and the information field of the quantity of layers and the precoding information. A maximum quantity of layers is 1, that is, a maximum rank is 1, and a quantity of antenna ports is 4.

TABLE 3

| Bit field mapping index | Codebook subset = fully coherent & partially coherent & non-coherent | | Bit field mapping index | Codebook subset = partially coherent & non-coherent | | Bit field mapping index | Codebook subset = non-coherent | |
|---|---|---|---|---|---|---|---|---|
| | First information | Second information | | First information | Second information | | First information | Second information |
| 0 | 1 layer: TPMI = 0 | 1 layer: TPMI = 2 | 0 | 1 layer: TPMI = 0 | 1 layer: TPMI = 2 | 0 | 1 layer: TPMI = 0 | 1 layer: TPMI = 2 |
| 1 | 1 layer: TPMI = 1 | 1 layer: TPMI = 3 | 1 | 1 layer: TPMI = 1 | 1 layer: TPMI = 3 | 1 | 1 layer: TPMI = 1 | 1 layer: TPMI = 3 |
| 2 | 1 layer: TPMI = 2 | 1 layer: TPMI = 0 | 2 | 1 layer: TPMI = 2 | 1 layer: TPMI = 0 | 2 | 1 layer: TPMI = 2 | 1 layer: TPMI = 0 |
| 3 | 1 layer: TPMI = 3 | 1 layer: TPMI = 1 | 3 | 1 layer: TPMI = 3 | 1 layer: TPMI = 1 | 3 | 1 layer: TPMI = 3 | 1 layer: TPMI = 1 |
| 4 | 1 layer: TPMI = 4 | ... | 4 | 1 layer: TPMI = 4 | ... | | | |
| ... | ... | ... | ... | ... | ... | | | |
| 11 | 1 layer: TPMI = 11 | ... | 11 | 1 layer: TPMI = 11 | ... | | | |
| 12 | 1 layers: TPMI = 12 | ... | 12 to 15 | Reserved | Reserved | | | |
| ... | ... | ... | | | | | | |
| 27 | 1 layers: TPMI = 27 | ... | | | | | | |
| 28 to 31 | Reserved | Reserved | | | | | | |

It can be learned from Table 3 that the values of the precoding information and the information field of the quantity of layers may be bit field mapping indexes (Bit field mapped to index). The bit field mapping index indicates the first information and the second information.

For example, when the codebook subset=fully coherent & partially coherent & non-coherent (codebookSubset=fullyAndPartialAndNonCoherent), the precoding information and the information field of the quantity of layers includes five bits, and the five bits may have 32 values. In other words, the bit field mapping index may be any value from 0 to 31. When the values of the precoding information and the information field of the quantity of layers are 00000, the bit field mapping index is 0, the first information includes TPMI=0 and LI=1, and the second information includes TPMI=2 and LI=1.

It may be understood that, because the first information indicates the first precoding information corresponding to the first nominal PUSCH repetition, the first precoding information is TPMI=0; and because the second information indicates the second precoding information corresponding to the second nominal PUSCH repetition, the second precoding information is TPMI=2. In this specification, the precoding information may be a TPMI index. For example, the first precoding information may be a first TPMI index, and the second precoding information may indicate a second TPMI index. Further, with reference to Table 1, when TPMI=0, a first precoding matrix is $$\frac{1}{\sqrt{2}}\begin{bmatrix}1\\0\end{bmatrix};$$

and when TPMI=2, a second precoding matrix is $$\frac{1}{\sqrt{2}}\begin{bmatrix}1\\1\end{bmatrix}.$$

With reference to Table 2, when TPMI=0, a first precoding matrix is $$\frac{1}{2}\begin{bmatrix}1\\0\\0\\0\end{bmatrix};$$

and when TPMI=2, a second precoding matrix is $$\frac{1}{2}\begin{bmatrix}0\\0\\1\\0\end{bmatrix}.$$

For another example, when the codebook subset=partially coherent & non-coherent (codebookSubset=partialAndNonCoherent), the precoding information and the information field of the quantity of layers includes four bits, and the four bits may have 16 values. In other words, the bit field mapping index may be any value from 0 to 15. When the values of the precoding information and the information field of the quantity of layers are 0001, the bit field mapping index is 1, the first information includes TPMI=1 and LI=1, and the second information includes TPMI=3 and LI=1. It may be understood that the first precoding information is TPMI=1, and the second precoding information is TPMI=3. Further, with reference to Table 1, when TPMI=1, a first precoding matrix is $$\frac{1}{\sqrt{2}}\begin{bmatrix}0\\1\end{bmatrix};$$

and when TPMI=3, a second precoding matrix is $$\frac{1}{\sqrt{2}}\begin{bmatrix}1\\-1\end{bmatrix}.$$

With reference to Table 2, when TPMI=1, a first precoding matrix is $$\frac{1}{2}\begin{bmatrix}0\\1\\0\\0\end{bmatrix};$$

and when TPMI=3, a second precoding matrix is $$\frac{1}{2}\begin{bmatrix}0\\0\\0\\1\end{bmatrix}.$$

For still another example, when the codebook subset=non-coherent (codebookSubset=nonCoherent), the precoding information and the information field of the quantity of layers includes two bits, and the two bits may have four values. In other words, the bit field mapping index may be any value from 0 to 3. When the values of the precoding information and the information field of the quantity of layers is 11, the bit field mapping index is 3, the first information includes TPMI=3 and LI=1, and the second information includes TPMI=1 and LI=1. It may be understood that the first precoding information is TPMI=3, and the second precoding information is TPMI=1.

For example, Table 4 shows the correspondence between the values of the precoding information and the information field of the quantity of layers and the precoding information. A maximum quantity of layers is 2, 3, or 4, that is, a maximum rank is 2, 3, or 4, and a quantity of antenna ports is 4.

TABLE 4

| Bit field mapping index | Codebook subset = fully coherent & partially coherent & non-coherent | | Bit field mapping index | Codebook subset = partially coherent & non-coherent | | Bit field mapping index | Codebook subset = non-coherent | |
|---|---|---|---|---|---|---|---|---|
| | First information | Second information | | First information | Second information | | First information | Second information |
| 0 | 1 layer: TPMI = 0 | 1 layer: TPMI = 2 | 0 | 1 layer: TPMI = 0 | 1 layer: TPMI = 2 | 0 | 1 layer: TPMI = 0 | 1 layer: TPMI = 2 |
| 1 | 1 layer: TPMI = 1 | 1 layer: TPMI = 3 | 1 | 1 layer: TPMI = 1 | 1 layer: TPMI = 3 | 1 | 1 layer: TPMI = 1 | 1 layer: TPMI = 3 |
| 2 | 1 layer: TPMI = 2 | 1 layer: TPMI = 0 | 2 | 1 layer: TPMI = 2 | 1 layer: TPMI = 0 | 2 | 1 layer: TPMI = 2 | 1 layer: TPMI = 0 |
| 3 | 1 layer: TPMI = 3 | 1 layer: TPMI = 1 | 3 | 1 layer: TPMI = 3 | 1 layer: TPMI = 1 | 3 | 1 layer: TPMI = 3 | 1 layer: TPMI = 1 |
| 4 | 2 layers: TPMI = 0 | ... | 4 | 2 layers: TPMI = 0 | ... | 4 | 2 layers: TPMI = 0 | ... |
| ... | ... | ... | | | | | | |
| 61 | 4 layers: TPMI = 4 | ... | | | | | | |
| 62 and 63 | Reserved | Reserved | | | | | | |

For example, Table 5 shows the correspondence between the values of the precoding information and the information field of the quantity of layers and the precoding information. A maximum quantity of layers is 2, 3, or 4, that is, a maximum rank is 2, 3, or 4, and a quantity of antenna ports is 4.

TABLE 5

| Bit field mapping index | Codebook subset = fully coherent & partially coherent & non-coherent | | Bit field mapping index | Codebook subset = partially coherent & non-coherent | | Bit field mapping index | Codebook subset = non-coherent | |
|---|---|---|---|---|---|---|---|---|
| | First information | Second information | | First information | Second information | | First information | Second information |
| 0 | 1 layer: TPMI = 0 | 2 layer: TPMI = 2 | 0 | 1 layer: TPMI = 0 | 2 layer: TPMI = 2 | 0 | 1 layer: TPMI = 0 | 2 layer: TPMI = 2 |
| 1 | 1 layer: TPMI = 1 | 2 layer: TPMI = 3 | 1 | 1 layer: TPMI = 1 | 2 layer: TPMI = 3 | 1 | 1 layer: TPMI = 1 | 2 layer: TPMI = 3 |
| 2 | 1 layer: TPMI = 2 | 2 layer: TPMI = 0 | 2 | 1 layer: TPMI = 2 | 2 layer: TPMI = 0 | 2 | 1 layer: TPMI = 2 | 2 layer: TPMI = 0 |
| 3 | 1 layer: TPMI = 3 | 2 layer: TPMI = 1 | 3 | 1 layer: TPMI = 3 | 2 layer: TPMI = 1 | 3 | 1 layer: TPMI1 = 3 | 2 layer: TPMI = 1 |
| 4 | 2 layers: TPMI = 0 | ... | 4 | 2 layers: TPMI = 0 | ... | 4 | 2 layers: TPMI = 0 | ... |
| ... | ... | ... | | | | | | |
| 61 | 4 layers: TPMI = 4 | ... | | | | | | |
| 62 and 63 | Reserved | Reserved | | | | | | |

It should be noted that Table 3, Table 4, and Table 5 merely show a storage form of the foregoing correspondence in a storage device in a form of tables, and do not limit the storage form of the foregoing correspondence in the storage device. Certainly, the foregoing correspondence may alternatively be stored in the storage device in another form. This is not limited in this embodiment of this application.

In another possible design, the first indication information may be an SRI. For example, the first indication information may be a value of an SRI information field in the DCI. The value of the SRI may indicate the first information and the second information. When the value of SRI varies, the first precoding information indicated by the first information also varies, and the second precoding information indicated by the second information also varies. In some embodiments, the value of the SRI may be an index value of an SRS resource. The index value of the SRS resource indicates the first information and the second information. For specific explanations, refer to the descriptions in Table 3, Table 4, and Table 5. Details are not described again. Table 6 shows a non-codebook transmission-based SRI when a maximum quantity of layers is 1.

namely, the first precoding information and the second precoding information. A DCI format may be a DCI format 0_0, a DCI format 0_1, or a DCI format 0_2.

The DCI format 0_1 is non-fallback DCI, and the non-fallback DCI is different from fallback DCI (the DCI format 0_0). RNTIs that may be used to scramble the DCI format 0_0 include a paging-radio network temporary identifier (paging-radio network temporary identifier, P-RNTI), a random access-radio network temporary identifier (random access-radio network temporary identifier, RA-RNTI), a system information-radio network temporary identifier (system information-radio network temporary identifier, SI-RNTI), a temporary cell-radio network temporary identifier (Temporary Cell-Radio Network Temporary Identifier, TC-RNTI), a C-RNTI, a CS-RNTI, and an MCS-RNTI. The DCI format 0_0 may be used to schedule a physical downlink shared channel (physical downlink shared channel, PDSCH) that carries paging information, initial access response information, or the system information. The DCI format 0_1 is used to schedule a PDSCH when the terminal device is in a connected mode. RNTIs that may be used to scramble the DCI format 0_0 are a C-RNTI, a CS-RNTI, and an MCS-

TABLE 6

| Index value of the SRS resource | SRI(s), and $N_{SRS} = 2$ | | Index value of the SRS resource | SRI(s), and $N_{SRS} = 3$ | | Index value of the SRS resource | SRI(s), and $N_{SRS} = 4$ | |
|---|---|---|---|---|---|---|---|---|
| | First information | Second information | | First information | Second information | | First information | Second information |
| 0 | 0 | 1 | 0 | 0 | 1 | 0 | 0 | 1 |
| 1 | 1 | 0 | 1 | 1 | 2 | 1 | 1 | 2 |
| | | | 2 | 2 | 0 | 2 | 2 | 3 |
| | | | 3 | Reserved | Reserved | 3 | 3 | 0 |

Optionally, the first indication information is used to indicate a TPMI and a quantity of transport layers (transmit rank, TRI), or the first indication information is used to indicate an index value of one or more SRS resources.

Optionally, a phase difference between precoding information indicated by different bit field mapping indexes is large.

S402: The terminal device 340 receives the first indication information from the network device 320.

The first indication information is used to indicate the first information and the second information. The first information is used to indicate the first precoding information corresponding to the first nominal PUSCH repetition. The second information is used to indicate the second precoding information corresponding to the second nominal PUSCH repetition. For specific explanations, refer to the descriptions of S401. Details are not described again.

In addition, the network device 320 may configure, for the terminal device 340, the first information and the second information that are indicated by the first indication information. Alternatively, the network device 320 may configure at least one of Table 3, Table 4, Table 5, and Table 6 for the terminal device 340.

In some embodiments, the network device 320 may configure the first information and the second information for the terminal device 340 by using the DCI. It may be understood that the terminal device 340 obtains the bit field mapping index by using the first indication information, and obtains, by using the DCI, the first information and second information that are indicated by the bit field mapping index. Therefore, the terminal device 340 can determine the first information and the second information, RNTI. The DCI format 0_1 carries more control information than the DCI format 0_0. The DCI format 0_1 includes at least one of a carrier indicator, a BWP indicator, a downlink allocation indicator, an SRS resource indicator, precoding information and a quantity of layers, an SRS request, a CSI request, a coding block transmission indicator, an antenna port, a rate matching indicator, a DMRS sequence initialization indicator, or a UL-SCH indicator.

The DCI format 0_2 is compact DCI (compact DCI). Different from the other two DCI formats, most DCI fields of the compact DCI may be configured to 0 bits, to reduce DCI overheads and improve DCI transmission reliability.

In some other embodiments, the network device 320 may configure the first information and the second information for the terminal device 340 by using higher layer signaling. The higher layer signaling may be signaling sent by a higher-layer protocol layer. The higher-layer protocol layer is at least one protocol layer above a physical layer. The higher-layer protocol layer may specifically include at least one of the following protocol layers: a medium access control (medium access control, MAC) layer, a radio link control (radio link control, RLC) layer, a packet data convergence protocol (packet data convergence protocol, PDCP) layer, a radio resource control (radio resource control, RRC) layer, or a non-access stratum (non-access stratum, NAS).

In some other embodiments, the first information may be configured by the network device 320 for the terminal device 340 by using the DCI, and the second information may be configured by the network device 320 for the terminal device 340 by using higher layer signaling.

In some other embodiments, the first information and the second information may be predefined. "Predefined" may be understood as "pre-stipulated in a standard or a protocol". The terminal device 340, the network device 320, and the network device 330 all prestore the first information and the second information. It may be understood that at least one of Table 3, Table 4, Table 5, and Table 6 may be predefined. The terminal device 340 obtains the bit field mapping index by using the first indication information, and queries Table 3, Table 4, or Table 5 based on the bit field mapping index, to determine the first information and the second information that correspond to the bit field mapping index. Alternatively, the terminal device 340 obtains the index value of the SRS resource by using the first indication information, and queries Table 6 based on the index value of the SRS resource, to determine the first information and the second information that correspond to the index value of the SRS resource. Therefore, the terminal device 340 can determine the first information and the second information, namely, the first precoding information and the second precoding information.

Figure 5:
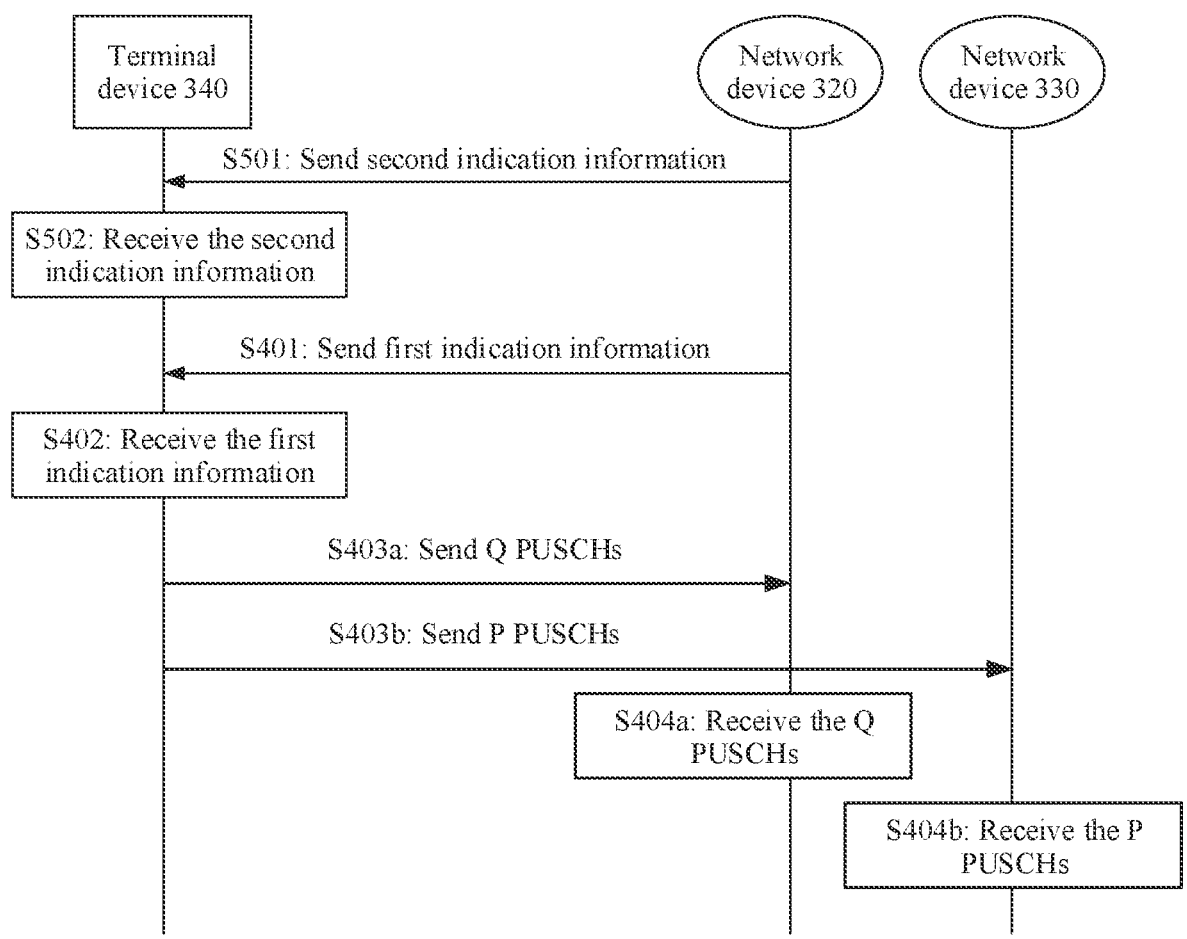
FIG. 5 is a flowchart of a method for sending a physical uplink shared channel according to an embodiment of this application.

Further, the terminal device 340 may further receive second indication information, to determine a nominal PUSCH. For example, as shown in FIG. 5, before S401, the method for sending a physical uplink shared channel further includes the following steps.

S501: The network device 320 sends the second indication information to the terminal device 340.

The second indication information is used to indicate the nominal PUSCH. The second indication information may include a start symbol S of the nominal PUSCH, a length L of the nominal PUSCH, and a quantity of repetitions and a time unit of the nominal PUSCH.

The start symbol of the nominal PUSCH indicated by the second indication information may be any symbol in the time unit.

The length of the nominal PUSCH is a quantity of symbols occupied in time domain for sending the nominal PUSCH. For example, the length of the nominal PUSCH may be greater than or equal to two symbols. For example, the length of the nominal PUSCH may be two symbols, the length of the nominal PUSCH may be four symbols, the length of the nominal PUSCH may be seven symbols, or the length of the nominal PUSCH may be 16 symbols.

The quantity of repetitions of the nominal PUSCH is a quantity of times that a data packet on the nominal PUSCH is repeatedly sent from the start symbol of the nominal PUSCH. A value of the quantity of repetitions may be 1, 2, 4, or 8.

It may be understood that the nominal PUSCH is dynamically granted (dynamic grant) by the network device, is a PUSCH determined by the terminal device based on uplink grant scheduling information sent by the network device, and is not necessarily a PUSCH actually transmitted by the terminal device. The uplink grant scheduling information herein may be carried on a physical downlink control channel (physical downlink control channel, PDCCH) by using the DCI. Optionally, the second indication information may be the DCI. The first indication information and the second indication information may be same DCI or different DCI. This is not limited in this embodiment of this application.

Optionally, the nominal PUSCH is indicated by a time domain resource allocation field in a parameter of the higher layer signaling. In some embodiments, the uplink grant scheduling information may indicate time domain resource allocation information in a time domain resource allocation information list, and the time domain resource allocation information indicates an offset, a number of the start symbol of the nominal PUSCH, and the length of the nominal PUSCH. For example, the uplink grant scheduling information includes an index of the time domain resource allocation information, and the terminal device 340 queries the time domain resource allocation information list based on the index of the time domain resource allocation information, to determine the time domain resource allocation information.

Optionally, a quantity of pieces of information indicated by the first indication information is related to the quantity of repetitions of the nominal PUSCH. For example, a quantity of pieces of precoding information corresponding to values of each piece of precoding information and each information field of the quantity of layers is equal to the quantity of repetitions of the nominal PUSCH. Alternatively, a quantity of pieces of precoding information corresponding to values of each piece of precoding information and each information field of the quantity of layers is less than the quantity of repetitions of the nominal PUSCH. Alternatively, a quantity of pieces of precoding information corresponding to values of each piece of precoding information and each information field of the quantity of layers is greater than the quantity of repetitions of the nominal PUSCH.

Optionally, uplink repeated transmission in time domain is single-layer transmission. Therefore, the values of the precoding information and the information field of the quantity of layers may indicate the precoding information, and a default quantity of layers is 1.

S502: The terminal device 340 receives the second indication information from the network device 320.

The terminal device 340 may perform blind detection on the PDCCH, and receive the second indication information, to obtain the nominal PUSCH based on the second indication information.

After obtaining the nominal PUSCH, the quantity of repetitions, and the precoding matrix, the terminal device 340 may apply corresponding precoding information to the nominal PUSCH. A possible implementation in which the terminal device 340 sends nominal PUSCHs to the network device 320 and the network device 330 by using precoding matrices corresponding to the nominal PUSCHs is described below in S403. In the following descriptions, it is assumed that the network device 320 indicates the terminal device 340 to send the first nominal PUSCH repetition to the network device 320 by using the first precoding matrix corresponding to the first nominal PUSCH repetition, and indicates the terminal device 340 to send the second nominal PUSCH repetition to the network device 330 by using the second precoding matrix corresponding to the second nominal PUSCH repetition. Alternatively, after determining the first precoding information, the first quantity of layers, the second precoding information, and the second quantity of layers, the terminal device 340 may determine that the terminal device 340 transmits the first nominal PUSCH repetition by using the first precoding information and the first quantity of layers, and transmits the second nominal PUSCH repetition by using the second precoding information and the second quantity of layers.

When the quantity of repeated transmissions of the nominal PUSCH is 2, the $1^{st}$ nominal PUSCH repetition corresponds to the first precoding information, and the $2^{nd}$ nominal PUSCH repetition corresponds to the second precoding information. Two nominal PUSCHs correspond to a same transport block.

When the quantity of repeated transmissions of the nominal PUSCH is greater than 2, a precoding repeated mapping scheme is configured for the terminal device 340, and a nominal PUSCH is allocated to at least one network device based on the precoding repeated mapping scheme for transmission.

In a possible design, the precoding repeated mapping scheme may be cyclic mapping. For example, two nominal PUSCH repetitions are one cycle. To be specific, the first precoding information is applied to the $1^{st}$ nominal PUSCH repetition, and the second precoding information is applied to the $2^{nd}$ nominal PUSCH repetition. This process is cyclically performed, and a same mapping pattern continues to be applied to remaining nominal PUSCH repetitions. For example, when the quantity of repeated transmissions of the nominal PUSCH is 4, the first precoding information is applied to the $1^{st}$ nominal PUSCH repetition, the second precoding information is applied to the $2^{nd}$ nominal PUSCH repetition, the first precoding information is applied to the $3^{rd}$ nominal PUSCH repetition, and the second precoding information is applied to the $4^{th}$ nominal PUSCH repetition. It may be understood that the terminal device 340 sends the $1^{st}$ nominal PUSCH repetition to the network device 320 by using the first precoding information, the terminal device 340 sends the $2^{nd}$ nominal PUSCH repetition to the network device 330 by using the second precoding information, the terminal device 340 sends the $3^{rd}$ nominal PUSCH repetition to the network device 320 by using the first precoding information, and the terminal device 340 sends the $4^{th}$ nominal PUSCH repetition to the network device 330 by using the second precoding information.

In another possible design, the precoding repeated mapping scheme may be sequence mapping. For example, four nominal PUSCH repetitions are one cycle. To be specific, the first precoding information is applied to the $1^{st}$ nominal PUSCH repetition and the $2^{nd}$ nominal PUSCH repetition, and the second precoding information is applied to the $3^{rd}$ nominal PUSCH repetition and the $4^{th}$ nominal PUSCH repetition. This process is cyclically performed, and a same mapping pattern continues to be applied to remaining nominal PUSCH repetitions. It may be understood that the terminal device 340 sends the $1^{st}$ nominal PUSCH repetition to the network device 320 by using the first precoding information, the terminal device 340 sends the $2^{nd}$ nominal PUSCH repetition to the network device 320 by using the first precoding information, the terminal device 340 sends the $3^{rd}$ nominal PUSCH repetition to the network device 330 by using the second precoding information, and the terminal device 340 sends the $4^{th}$ nominal PUSCH repetition to the network device 330 by using the second precoding information.

For another example, eight nominal PUSCH repetitions are one cycle. To be specific, the first precoding information is applied to the $1^{st}$ nominal PUSCH repetition, the $2^{nd}$ nominal PUSCH repetition, the $3^{rd}$ nominal PUSCH repetition, and the $4^{th}$ nominal PUSCH repetition, and the second precoding information is applied to the $5^{th}$ nominal PUSCH repetition, the $6^{th}$ nominal PUSCH repetition, the $7^{th}$ nominal PUSCH repetition, and the $8^{th}$ nominal PUSCH repetition. This process is cyclically performed, and a same mapping pattern continues to be applied to remaining nominal PUSCH repetitions. The quantity of repeated transmissions of the PUSCH is determined by using a higher layer parameter, or is dynamically indicated by using the DCI.

Optionally, two TPMIs corresponding to the value of the first indication information may be cyclically mapped to subbands. Therefore, when a granularity of a frequency domain subband is small and a scheduling bandwidth is large, or when a quantity of repetitions in time domain is large, DCI signaling overheads are reduced. When the CSI is not obtained in time, a performance loss may be compensated for.

For example, the TPMIs are cyclically mapped in frequency domain at a granularity of a configured or indicated physical resource block group (physical resource block group, PRG). The PRG refers to several bundled physical resource blocks (physical resource blocks, PRBs), and different precoding matrices may be used for different PRBs. If there are eight subbands currently, the eight subbands respectively correspond to different PRGs. If a TPMI index in the indication table of the precoding information and the information field of the quantity of layers in the DCI is 0, and TPMI index=0 corresponds to two TPMIs, that is, TPMI=0 and TPMI=2, the two TPMIs are cyclically mapped to the eight subbands in sequence. This may mean that repeated repetitions of a same transport block are sent on different subbands, or this may mean that one transport block occupies all subbands to send one transport block.

For another example, the TPMI is cyclically mapped to the repeatedly transmitted PUSCH in time domain, a plurality of PUSCH transmission occasions corresponding to one transport block are repeatedly transmitted in time domain, and different precoding matrices may be used for different repeatedly transmitted repetitions. If there are four repeated transmissions in time domain currently, a TPMI index in the indication table of the precoding information and the information field of the quantity of layers in the DCI is 0, and TPMI index=0 corresponds to two TPMIs, that is, TPMI=0 and TPMI=2, the two TPMIs are cyclically mapped to the four repeated transmissions in sequence.

It should be noted that the PUSCHs actually transmitted by the terminal device 340 to the network device 320 and the network device 330 are not necessarily nominal PUSCH repetitions. In this embodiment of this application, it is assumed that the terminal device 340 sends the N PUSCHs to the network devices. The network devices may include the network device 320 and the network device 330.

S403: The terminal device 340 sends the N PUSCHs to the network devices.

S404: The network devices receive the N PUSCHs sent by the terminal device 340.

Figure 4B:
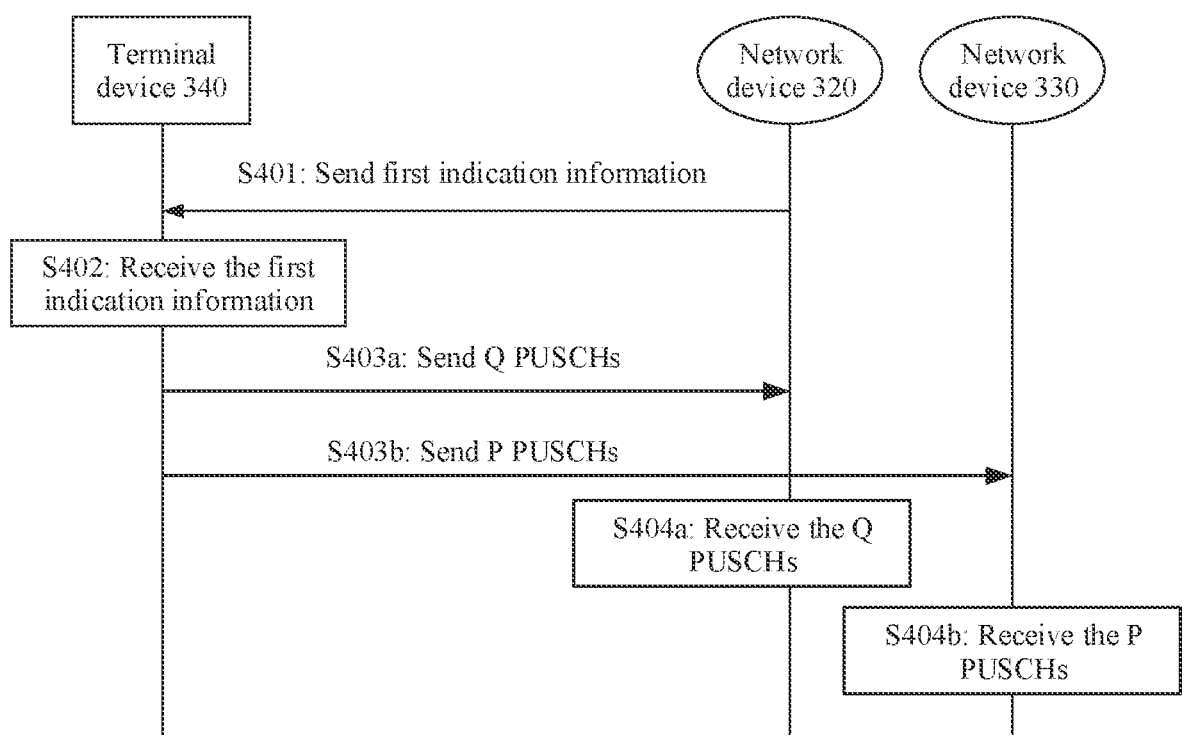
FIG. 4B is a flowchart of a method for sending a physical uplink shared channel according to an embodiment of this application.

Specifically, as shown in FIG. 4B, a specific implementation in which the terminal device 340 separately sends the N PUSCHs to the network device 320 and the network device 330 is described.

S403a: The terminal device 340 sends Q PUSCHs to the network device 320.

S403b: The terminal device 340 sends P PUSCHs to the network device 330.

Optionally, the terminal device 340 may send nominal PUSCH repetitions to the network device 320 and the network device 330 by using a PUSCH repeated transmission type A and the precoding repeated mapping scheme.

Optionally, the terminal device 340 may send nominal PUSCH repetitions to the network device 320 and the network device 330 by using a PUSCH repeated transmission type B and the precoding repeated mapping scheme.

In this embodiment of this application, it is assumed that the terminal device 340 sends the N PUSCHs to the network device 320 and the network device 330. Q is an integer, P is an integer, and N=Q+P. Optionally, Q may be equal to P, or Q may not be equal to P. A precoding matrix corresponding to the Q PUSCHs is the first precoding matrix, and a precoding matrix corresponding to the P PUSCHs is the second precoding matrix.

It should be noted that a sequence of the steps of the method for sending a physical uplink shared channel provided in this embodiment of this application may be appropriately adjusted. For example, S403a and S403b may not be sequential. To be specific, the terminal device 340 may first send the P PUSCHs to the network device 330, and then the terminal device 340 sends the Q PUSCHs to the network device 320. Any variation method readily figured out by a person skilled in the art within the technical scope disclosed in this application shall fall within the protection scope of this application. Therefore, details are not described herein.

In a possible implementation, the terminal device 430 may send the N PUSCHs to the network device 320 and the network device 330 by using the PUSCH repeated transmission type A, and all of the N PUSCHs carry a same transport block.

The PUSCH repeated transmission type A may mean that N nominal PUSCHs in N consecutive slots are repeatedly sent, one nominal PUSCH is sent in one slot, and a nominal PUSCH in each slot is sent by using a same time domain symbol, where N is an integer greater than or equal to 1.

Optionally, in this specification, the term "consecutive" may be described as "consecutive available".

For a dynamic grant-based nominal PUSCH, if a quantity N of repetitions (number of repetitions) of the PUSCH is configured by using higher layer signaling, the terminal device repeatedly sends a same transport block in N consecutive available slots, and each of the consecutive available slots is allocated by using a same symbol. For example, the time domain resource allocation information may further include the quantity of repetitions, and the quantity of repetitions indicates a quantity N of repetitions of the PUSCH for slot aggregation (pusch-AggregationFactor). For example, a value of N may be 2, 4, 6, 8, 10, or 16.

Optionally, the quantity N of repetitions of the PUSCH repeated transmission type A may alternatively be dynamically indicated in a manner the same as that of the PUSCH repeated transmission type B. To be specific, a column is added to a TDRA table to indicate the quantity of repetitions, the quantity of repetitions indicates a quantity of repetitions of a slot, and the quantity N of repetitions may be indicated by using uplink scheduling signaling (a DCI format (format) 0_1/DCI format).

The terminal device 430 may determine the nominal PUSCH based on the start symbol of the nominal PUSCH and the length of the nominal PUSCH, and determine, based on the offset value, a slot for sending the nominal PUSCH, that is, determine a value of a sum of a number of a slot of the PDCCH and the offset value as a number of the slot for transmitting the nominal PUSCH. The offset value is a difference between the number of the slot for transmitting the PDCCH and the number of the slot for transmitting the nominal PUSCH.

It may be understood that a time domain resource occupied by each of the N PUSCHs is a time domain resource occupied by a nominal PUSCH. In this specification, the time domain resource may alternatively be described as a "symbol". For example, the time domain resource occupied by the nominal PUSCH may alternatively be described as a "symbol occupied by the nominal PUSCH", and the time domain resource occupied by the PUSCH may alternatively be described as "a symbol occupied by the PUSCH".

Because the terminal device 430 sends a nominal PUSCH to each of the network device 320 and the network device 330, N is equal to 2, to be specific, the N PUSCHs include a first PUSCH and a second PUSCH. The first PUSCH sent by the terminal device 430 to the network device 320 may be referred to as the first nominal PUSCH repetition, and the second PUSCH sent by the terminal device 430 to the network device 330 may be referred to as the second nominal PUSCH repetition.

The terminal device 430 may further determine the first precoding matrix based on the first precoding information, and determine the second precoding matrix based on the second precoding information. Then, user data is precoded by using the first precoding matrix and the second precoding matrix, to obtain uplink data. The precoding information corresponding to the N PUSCHs includes the first precoding information and the second precoding information. To be specific, precoding information corresponding to the first PUSCH is the first precoding information, and the precoding information corresponding to the second PUSCH is the second precoding information.

Figure 6:
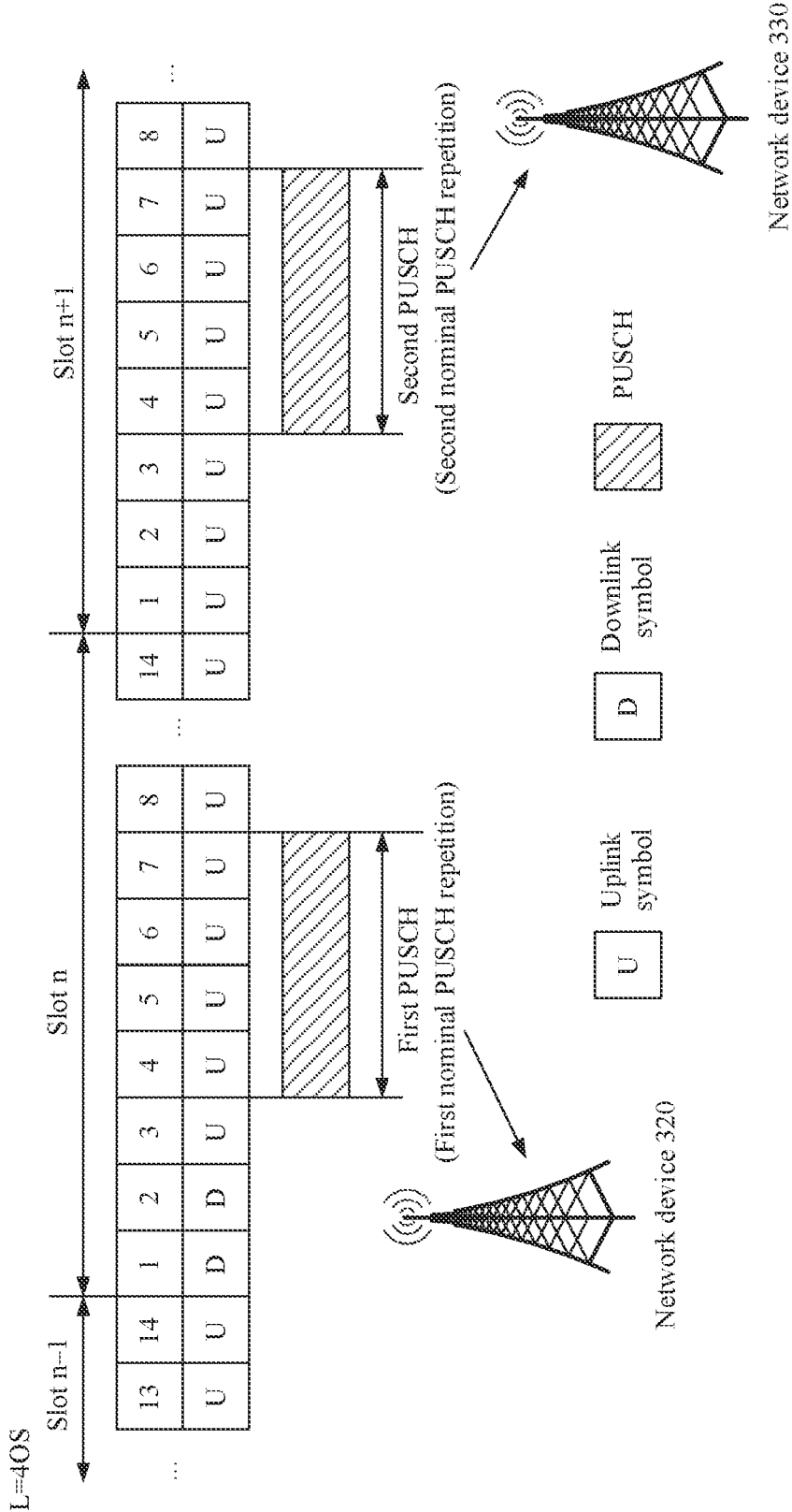
FIG. 6 is a schematic diagram of sending PUSCHs to two network devices by using a PUSCH repeated transmission type A according to an embodiment of this application.

For example, FIG. 6 is a schematic diagram of sending PUSCHs to two network devices by using a PUSCH repeated transmission type A. The length of the nominal PUSCH is four symbols, and the start symbol of the nominal PUSCH is a symbol 4. In this case, the terminal device 340 maps the first nominal PUSCH repetition to the $4^{th}$ symbol to the $7^{th}$ symbol in a slot n, that is, the terminal device 340 sends the first PUSCH to the network device 320; and maps the second nominal PUSCH repetition to the $4^{th}$ symbol to the $7^{th}$ symbol in a slot n+1, that is, the terminal device 340 sends the second PUSCH to the network device 330. A time domain resource occupied by the first PUSCH is all of time domain resources occupied by the first nominal PUSCH repetition in the slot n, and a time domain resource occupied by the second PUSCH is all of time domain resources occupied by the second nominal PUSCH repetition in the slot n+1. It may be understood that all of the time domain resources may alternatively be described as a quantity of symbols. A quantity of symbols occupied by the first PUSCH is equal to a quantity of symbols occupied by the first nominal PUSCH repetition in the slot n, and a quantity of symbols occupied by the second PUSCH is equal to a quantity of symbols occupied by the second nominal PUSCH repetition in the slot n+1.

In another possible implementation, the terminal device 340 may send the N PUSCHs to the network device 320 and the network device 330 by using the PUSCH repeated transmission type B, and all of the N PUSCHs carry a same transport block.

The PUSCH repeated transmission type B means that M nominal PUSCHs are transmitted on a time domain resource in one slot or M nominal PUSCHs are transmitted on time domain resources in a plurality of consecutive available slots, where M is an integer greater than or equal to 1.

It should be noted that the time domain resources for the M nominal PUSCHs are allocated in a back-to-back (back-to-back) manner. For example, a start symbol of an $m^{th}$ nominal PUSCH is a next symbol of an end symbol of an $(m-1)^{th}$ nominal PUSCH.

A start slot of the $m^{th}$ nominal PUSCH is expressed as $$K_s + \left\lfloor \frac{S + m \cdot L}{N_{symb}^{slot}} \right\rfloor,$$

and a start symbol in the slot is expressed as mod (S+m·L, $N_{symb}^{slot}$); and an end slot of the $m^{th}$ nominal PUSCH is expressed as $$K_s + \left\lfloor \frac{S + (m+1) \cdot L - 1}{N_{symb}^{slot}} \right\rfloor,$$

and an end symbol in the slot is expressed as mod(S+(m+1)·L−1, $N_{symb}^{slot}$), where $K_s$ is a PUSCH transmission start slot, $N_{symb}^{slot}$ represents a quantity of symbols in one slot, and is usually 14, S represents the start symbol of the first nominal PUSCH repetition, and L represents the length of the first nominal PUSCH repetition.

Optionally, M is dynamically indicated by the network device 320.

Optionally, the terminal device 340 may obtain the quantity of repetitions by using a higher layer parameter numberofrepetitions.

It should be understood that, if the terminal device is configured to support the PUSCH repeated transmission type B by using higher layer signaling, there is a column, in the TDRA table, used to indicate the quantity of repetitions, the quantity of repetitions indicates a quantity of times of repeatedly transmitting the nominal PUSCH, and the quantity M of repetitions may be indicated by using uplink scheduling signaling (a DCI format 0_1/DCI format).

For a PUSCH mapping type A, a value range of a sum of the start symbol S of the nominal PUSCH and the length of the nominal PUSCH is {4, 14}; and for a PUSCH mapping type B, a value range of a sum of the start symbol S of the nominal PUSCH and the length of the nominal PUSCH is {1, 14}.

For the PUSCH repeated transmission type B, a value range of a sum of the start symbol S of the nominal PUSCH and the length of the nominal PUSCH is {1, 27}.

In some embodiments, the time unit includes at least one valid symbol and at least one invalid symbol.

The valid symbol is a symbol to which a PUSCH or uplink information is mapped. The valid symbol may further include an uplink flexible symbol indicated by a slot format indicator (slot format indicator, SFI). The uplink information includes uplink control information and uplink data information. Alternatively, the uplink information includes uplink control information. Alternatively, the uplink information includes uplink data information.

The invalid symbol includes a downlink symbol. The invalid symbol may further include a downlink flexible symbol indicated by the SFI and a symbol in a short time interval. The downlink symbol is used to map a PDSCH or a symbol of downlink information. The downlink information includes downlink control information and downlink data information. Alternatively, the downlink information includes downlink control information. Alternatively, the downlink information includes downlink data information.

The short time interval may refer to a first time interval, or the short time interval is less than or not greater than the first time interval. A length of the first time interval may be a length of a single symbol (Orphan symbol).

For the PUSCH repeated transmission type B, the terminal device 340 determines the invalid symbol by using the following method.

Optionally, the terminal device 340 may determine that a symbol indicated by higher layer signaling tdd-UL-DL-ConfigurationCommon or tdd-UL-DL-ConfigurationDedicated is the invalid symbol for the PUSCH repeated transmission type B transmission.

If a higher layer parameter (SlotFormatInficator) is configured for the terminal device 340, a higher layer parameter (InvalidSymbolPattern) is also configured for the terminal device 340, and the higher layer parameter (InvalidSymbolPattern) provides a symbol-level bitmap lasting for one to two slots. When a value of a bit is 1, it indicates that a corresponding symbol is the invalid symbol for the PUSCH repeated transmission type B transmission.

If the parameter InvalidSymbolPattern is configured for the terminal device 340, the terminal device 340 applies an invalid symbol pattern in the following manner.

When the PUSCH is scheduled in the DCI format 0_1, InvalidSymbolPatternIndicator-ForDCIFormat0_1 is configured for the terminal device 340; or when the PUSCH is scheduled in the DCI format 0_2, InvalidSymbolPatternIndicator-ForDCIFormat0_2 is configured for the terminal device 340.

If a DCI field invalid symbol pattern indicator is set to 1, the terminal device 340 applies the invalid symbol pattern; otherwise, the terminal device 340 does not apply the invalid symbol pattern.

If no InvalidSymbolPatternIndicator-ForDCIFormat0_1 or InvalidSymbolPatternIndicator-ForDCIFormat0_2 is configured for the terminal device 340, the terminal device 340 directly applies the pattern.

For the PUSCH repeated transmission type B, after an invalid symbol is determined for each of K nominal repetitions for the PUSCH repeated transmission type B transmission, remaining symbols are potential valid symbols for the PUSCH repeated transmission type B transmission. If a quantity of potential valid symbols of a nominal repetition is greater than 0, the nominal repetition includes one or more actual repetitions, where each actual repetition includes a set of consecutive potential valid symbols available for the PUSCH repeated transmission type B transmission in one slot.

If the terminal device 340 maps (or virtually maps) the nominal PUSCH to a valid symbol of the time unit based on the length of the nominal PUSCH from the start symbol of the nominal PUSCH, and at least one valid symbol and at least one invalid symbol are included between the start symbol of the nominal PUSCH and an end symbol of the time unit, the nominal PUSCH is mapped to the at least one valid symbol, the nominal PUSCH skips the at least one invalid symbol during mapping, and the nominal PUSCH is divided into at least two PUSCH segments by the invalid symbol. The start symbol of the nominal PUSCH may be in the time unit.

It may be understood that a time domain resource used to map the nominal PUSCH includes at least two uplink regions. The at least two uplink regions each include at least one valid symbol. Any one of the at least two uplink regions includes P valid symbols that are consecutive in time. A sum of time domain lengths of at least one uplink region corresponds to the length of the nominal PUSCH indicated by the network device 320, and P is a positive integer.

Any two adjacent uplink regions of the at least two uplink regions include an invalid symbol, that is, do not include a valid symbol.

In this specification, the first nominal PUSCH repetition sent by the terminal device 340 to the network device 320 may be divided into at least two PUSCH segments by using the invalid symbol; or the second nominal PUSCH repetition sent by the terminal device 340 to the network device 330 may be divided into at least two PUSCH segments by using the invalid symbol; or both the first nominal PUSCH repetition and the second nominal PUSCH repetition are divided into at least two PUSCH segments by using the invalid symbol. This is not limited in this application. Precoding information corresponding to the at least two PUSCH segments obtained through division is precoding information corresponding to the nominal PUSCH repetition divided by the invalid symbol.

The precoding information corresponding to the N PUSCHs includes the first precoding information and the second precoding information. Time domain resources occupied by the N PUSCHs are all or a part of time domain resources occupied by the first nominal PUSCH repetition and the second nominal PUSCH repetition in at least one consecutive time unit, and N is an integer greater than or equal to 3.

Figure 7A:
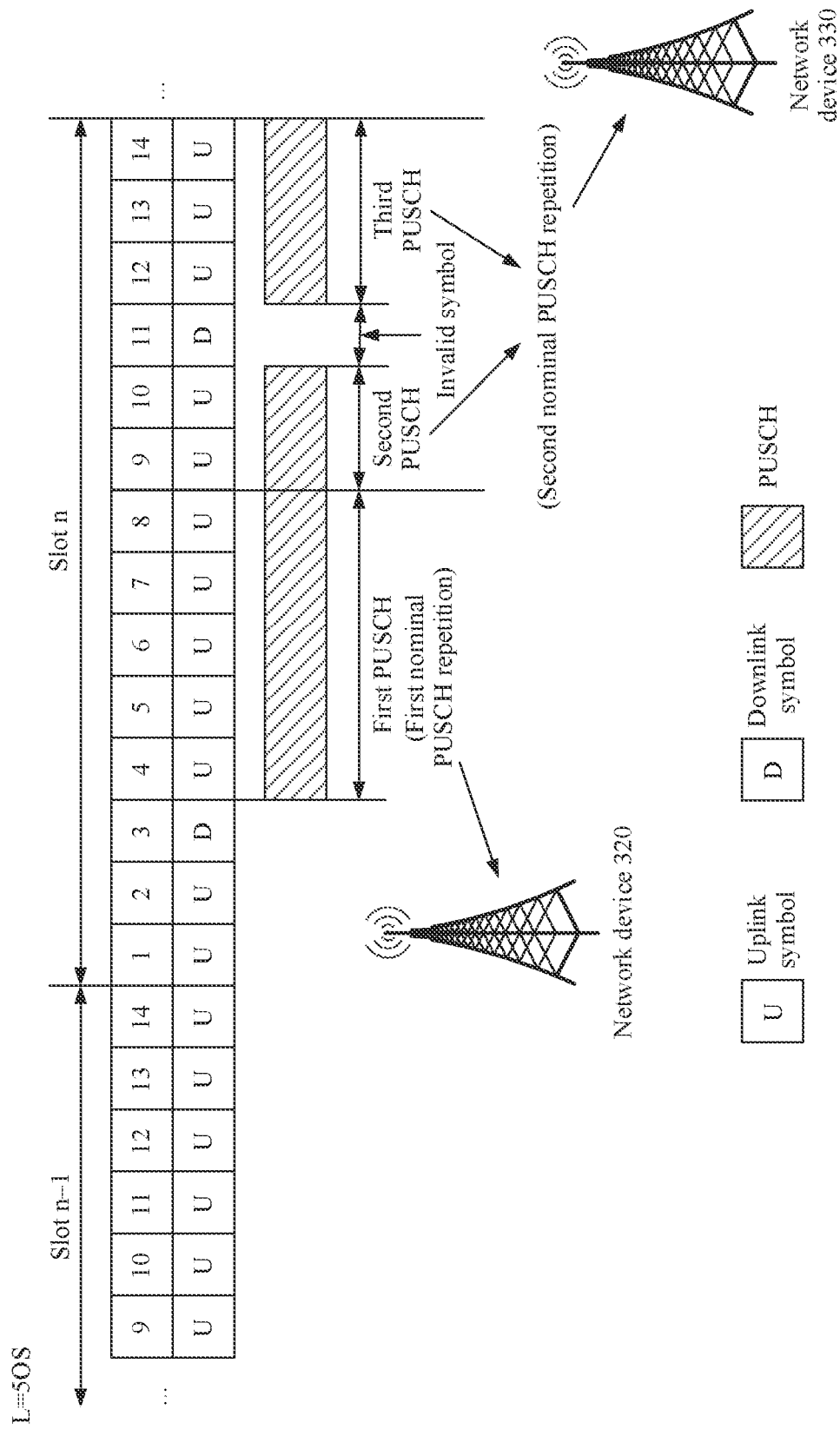
FIG. 7(a) and FIG. 7(b) are a schematic diagram of sending PUSCHs to two network devices by using a PUSCH repeated transmission type B according to an embodiment of this application.
Figure 7B:
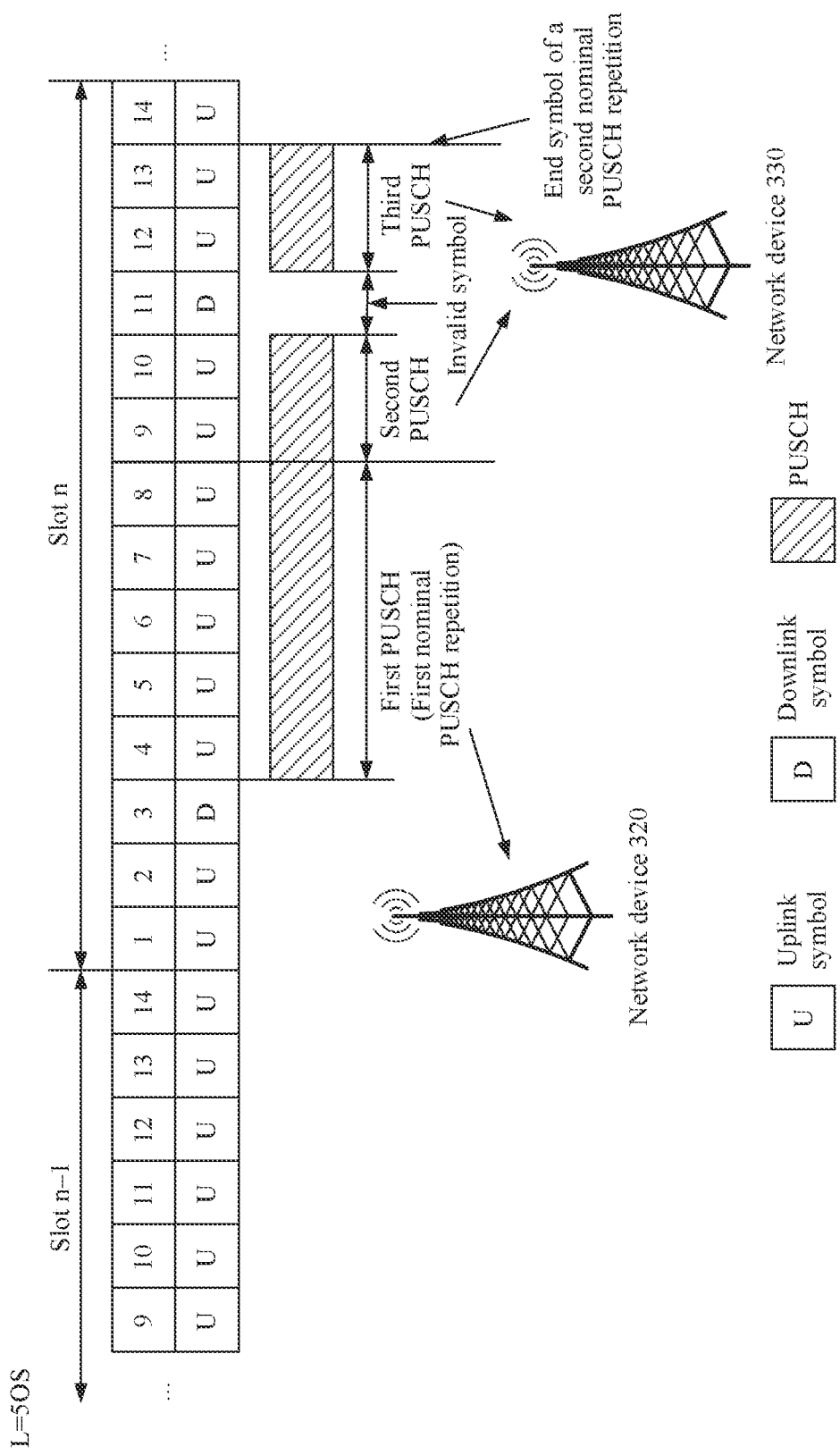

For example, FIG. 7(a) and FIG. 7(b) are a schematic diagram of sending PUSCHs to two network devices by using a PUSCH repeated transmission type B. It is assumed that the length of the nominal PUSCH is five symbols, and the start symbol of the nominal PUSCH is a symbol 4.

As shown in FIG. 7(a), the terminal device 340 maps the first nominal PUSCH repetition to the $4^{th}$ symbol to the $8^{th}$ symbol in a slot n, that is, the terminal device 340 sends the first PUSCH to the network device 320. A time domain resource occupied by the first PUSCH is all of time domain resources occupied by the first nominal PUSCH repetition in the slot n, that is, a quantity of symbols occupied by the first PUSCH is equal to a quantity of symbols occupied by the first nominal PUSCH repetition in the slot n. Precoding information corresponding to the first PUSCH is the first precoding information corresponding to the first nominal PUSCH repetition. A start symbol of the first PUSCH is the same as a start symbol of the first nominal PUSCH repetition, and an end symbol of the first PUSCH is the same as an end symbol of the first nominal PUSCH repetition. The network device 320 receives the first PUSCH on the $4^{th}$ symbol to the $8^{th}$ symbol in the slot n.

The second nominal PUSCH repetition is mapped to the $9^{th}$ symbol and the $10^{th}$ symbol in the slot n and the $12^{th}$ symbol to the $14^{th}$ symbol in the slot n. Because the $11^{th}$ symbol in the slot n is an invalid symbol, the $11^{th}$ symbol is skipped, mapping of the second nominal PUSCH repetition is delayed, and the second nominal PUSCH repetition continues to be mapped starting from the $1^{st}$ uplink symbol (the $12^{th}$ symbol in the slot n) after the invalid symbol, to be specific, the second nominal PUSCH repetition continues to be mapped to the $12^{th}$ symbol to the $14^{th}$ symbol in the slot n. Therefore, the second nominal PUSCH repetition is divided into two PUSCH segments by the invalid symbol, namely, the second PUSCH and a third PUSCH. The terminal device 340 sends the second PUSCH and the third PUSCH to the network device 330. Precoding information corresponding to the second PUSCH is the second precoding information corresponding to the second nominal PUSCH repetition, and precoding information corresponding to the third PUSCH is the second precoding information corresponding to the second nominal PUSCH repetition. The network device 330 receives the second PUSCH on the $9^{th}$ symbol and the $10^{th}$ symbol in the slot n, and receives the third PUSCH on the $12^{th}$ symbol to the $14^{th}$ symbol in the slot n.

It may be understood that the N PUSCHs include the first PUSCH, the second PUSCH, and the third PUSCH. A start symbol of the second PUSCH is the same as a start symbol of the second nominal PUSCH repetition, and an end symbol of the third PUSCH follows an end symbol of the second nominal PUSCH repetition. Time domain resources occupied by the second PUSCH and the third PUSCH are all of time domain resources occupied by the second nominal PUSCH repetition in the slot n, that is, quantities of symbols occupied by the second PUSCH and the third PUSCH are equal to a quantity of symbols occupied by the second nominal PUSCH repetition in the slot n.

As shown in FIG. 7(b), a difference from FIG. 7(a) lies in that the second nominal PUSCH repetition is mapped to the $9^{th}$ symbol and the $10^{th}$ symbol in the slot n and the $12^{th}$ symbol and the $13^{th}$ symbol in the slot n. Because the $11^{th}$ symbol in the slot n is an invalid symbol, the $11^{th}$ symbol is skipped, mapping of the second nominal PUSCH repetition is delayed, and the second nominal PUSCH repetition continues to be mapped starting from the $1^{st}$ uplink symbol (the $12^{th}$ symbol in the slot n) after the invalid symbol, to be specific, the second nominal PUSCH repetition continues to be mapped to the $12^{th}$ symbol and the $13^{th}$ symbol in the slot n. Therefore, the second nominal PUSCH repetition is divided into two PUSCH segments by the invalid symbol, namely, the second PUSCH and a third PUSCH. The terminal device 340 sends the second PUSCH and the third PUSCH to the network device 330. Precoding information corresponding to the second PUSCH is the second precoding information corresponding to the second nominal PUSCH repetition, and precoding information corresponding to the third PUSCH is the second precoding information corresponding to the second nominal PUSCH repetition. The network device 330 receives the second PUSCH on the $9^{th}$ symbol and the $10^{th}$ symbol in the slot n, and receives the third PUSCH on the $12^{th}$ symbol and the $13^{th}$ symbol in the slot n.

It may be understood that the N PUSCHs include the first PUSCH, the second PUSCH, and the third PUSCH. A start symbol of the second PUSCH is the same as a start symbol of the second nominal PUSCH repetition, and an end symbol of the third PUSCH is the same as an end symbol of the second nominal PUSCH repetition. Time domain resources occupied by the second PUSCH and the third PUSCH are a part of time domain resources occupied by the second nominal PUSCH repetition in the slot n, that is, quantities of symbols occupied by the second PUSCH and the third PUSCH are less than a quantity of symbols occupied by the second nominal PUSCH repetition in the slot n.

In some other embodiments, if the terminal device 340 maps (or virtually maps) the nominal PUSCH from the start symbol of the nominal PUSCH to a valid symbol of the time unit based on the length of the nominal PUSCH, and an end symbol of the time unit precedes an end symbol of the nominal PUSCH, the nominal PUSCH is divided into at least two PUSCH segments by a boundary of the time unit. The start symbol of the nominal PUSCH may be in the time unit.

In this specification, the first nominal PUSCH repetition sent by the terminal device 340 to the network device 320 may be divided into at least two PUSCHs by the boundary of the time unit; the second nominal PUSCH repetition sent by the terminal device 340 to the network device 330 may be divided into at least two PUSCHs by the boundary of the time unit; or both the first nominal PUSCH repetition and the second nominal PUSCH repetition are divided into at least two PUSCH segments by the boundary of the time unit. This is not limited in this application. Precoding information corresponding to the at least two PUSCH segments obtained through division is precoding information corresponding to the nominal PUSCH repetition divided by the boundary of the time unit.

The precoding information corresponding to the N PUSCHs includes the first precoding information and the second precoding information. Time domain resources occupied by the N PUSCHs are all or a part of time domain resources occupied by the first nominal PUSCH repetition and the second nominal PUSCH repetition in at least one consecutive time unit, and N is an integer greater than or equal to 3.

Figure 8A:
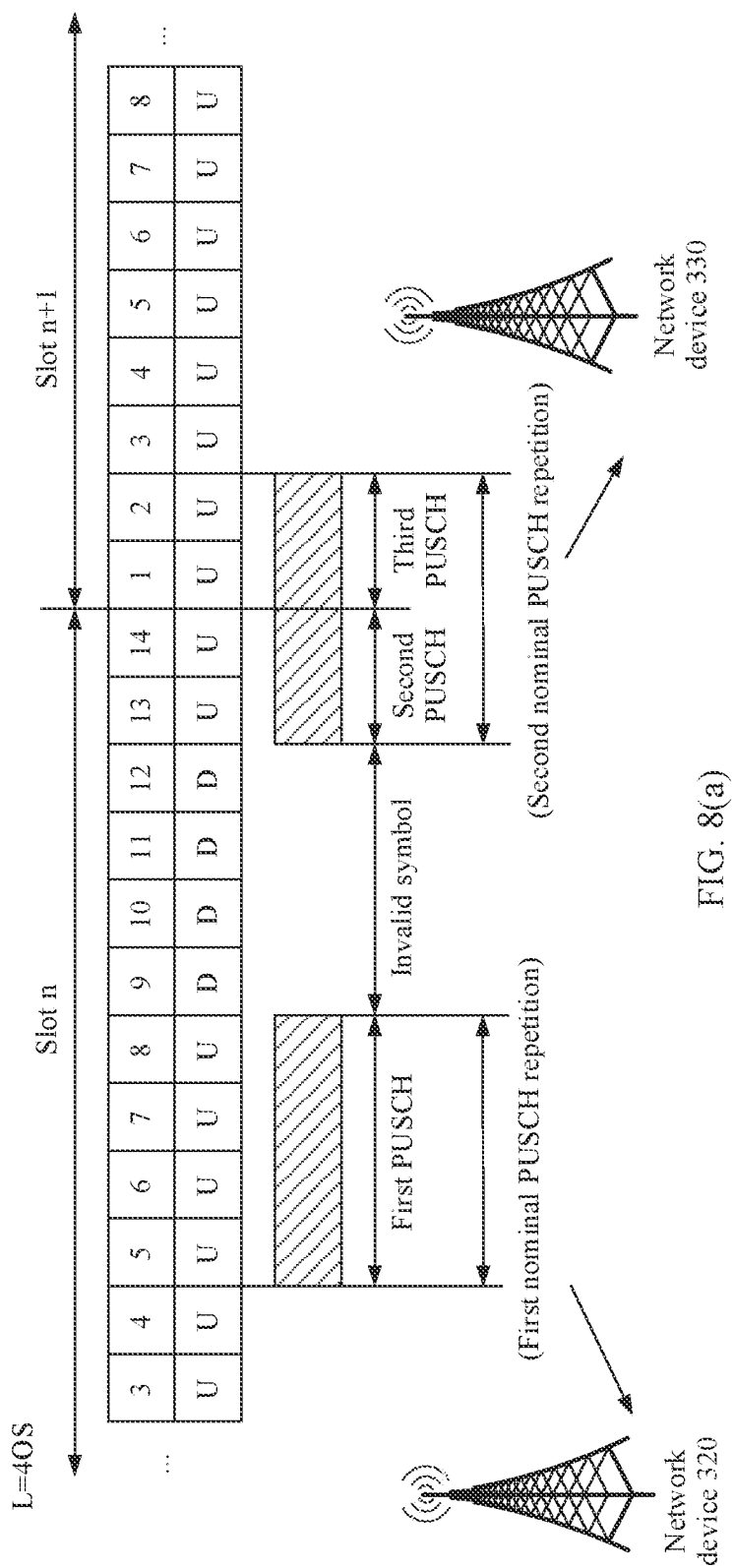
FIG. 8(a), FIG. 8(b), and FIG. 8(c) are a schematic diagram of sending PUSCHs to two network devices by using a PUSCH repeated transmission type B according to an embodiment of this application.
Figure 8B:
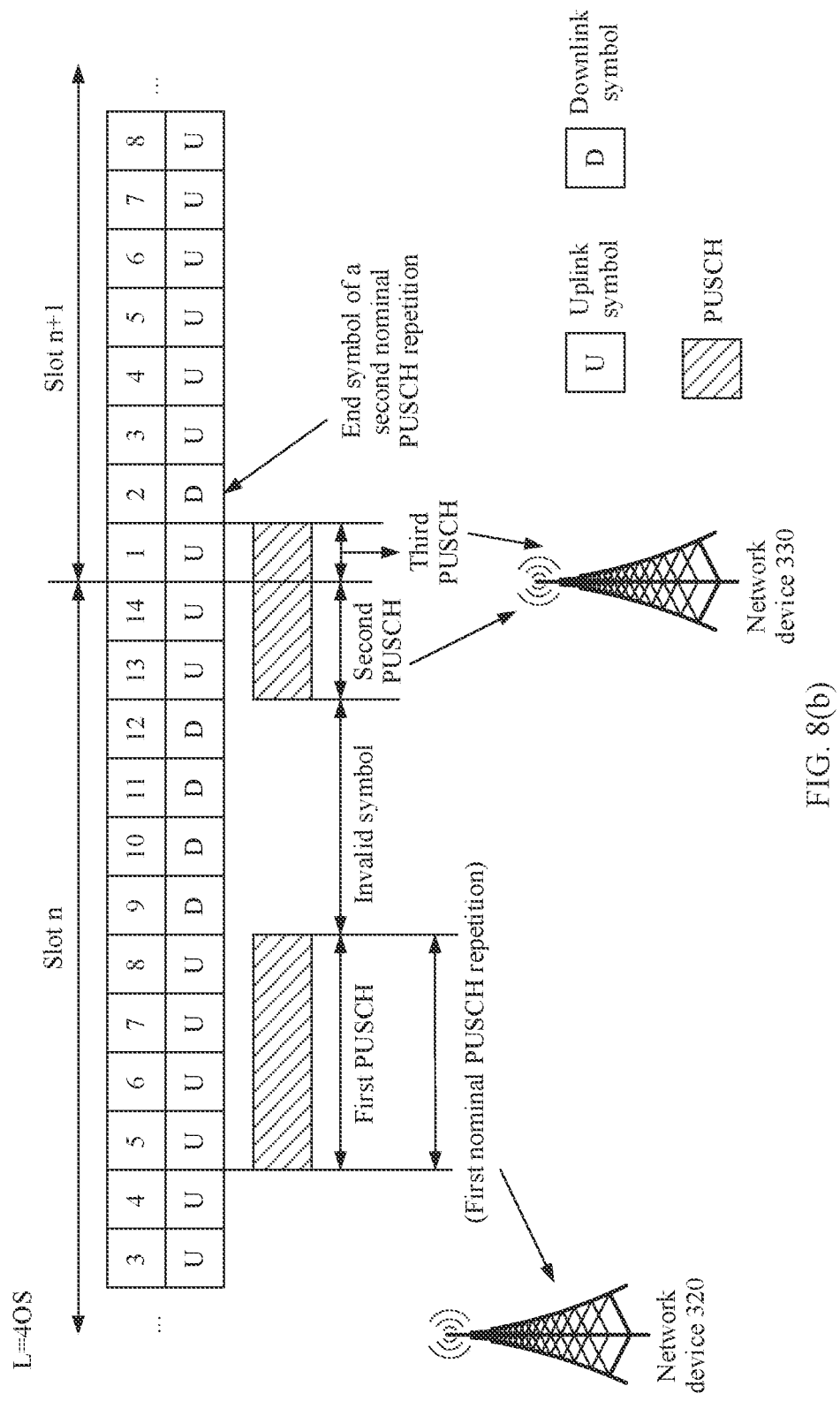
Figure 8C:
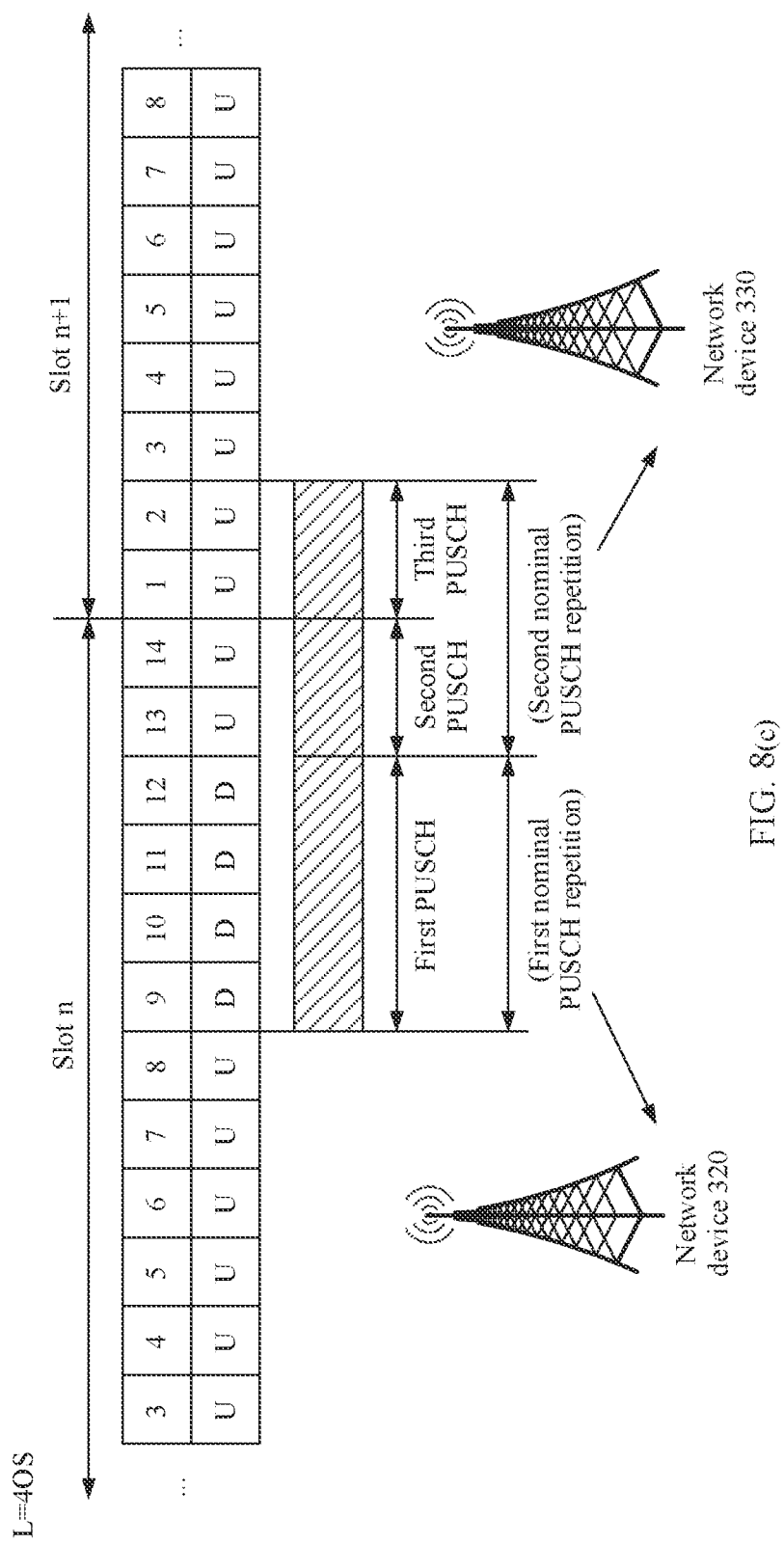

For example, FIG. 8(a), FIG. 8(b), and FIG. 8(c) are a schematic diagram of sending PUSCHs to two network devices by using a PUSCH repeated transmission type B. It is assumed that the length of the nominal PUSCH is four symbols, and the start symbol of the nominal PUSCH is a symbol 5.

As shown in FIG. 8(a), the terminal device 340 maps the first nominal PUSCH repetition to the $5^{th}$ symbol to the $8^{th}$ symbol in a slot n, that is, the terminal device 340 sends the first PUSCH to the network device 320. A time domain resource occupied by the first PUSCH is all of time domain resources occupied by the first nominal PUSCH repetition in the slot n. Precoding information corresponding to the first PUSCH is the first precoding information corresponding to the first nominal PUSCH repetition. A start symbol of the first PUSCH is the same as a start symbol of the first nominal PUSCH repetition, and an end symbol of the first PUSCH is the same as an end symbol of the first nominal PUSCH repetition. The network device 320 receives the first PUSCH on the $5^{th}$ symbol to the $8^{th}$ symbol in the slot n.

The second nominal PUSCH repetition is mapped to the $13^{th}$ symbol and the $14^{th}$ symbol in the slot n and the $1^{st}$ symbol and the $2^{nd}$ symbol in a slot n+1. Because the second nominal PUSCH repetition crosses a boundary of the slot n and the slot n+1, the second nominal PUSCH repetition is divided into two PUSCH segments by the slot boundary, namely, the second PUSCH and a third PUSCH. The terminal device 340 sends the second PUSCH and the third PUSCH to the network device 330. Precoding information corresponding to the second PUSCH is the second precoding information corresponding to the second nominal PUSCH repetition, and precoding information corresponding to the third PUSCH is the second precoding information corresponding to the second nominal PUSCH repetition. The network device 330 receives the second PUSCH on the $13^{th}$ symbol and the $14^{th}$ symbol in the slot n, and receives the third PUSCH on the $1^{st}$ symbol and the $2^{nd}$ symbol in the slot n+1.

It may be understood that the N PUSCHs include the first PUSCH, the second PUSCH, and the third PUSCH. A start symbol of the second PUSCH is the same as a start symbol of the second nominal PUSCH repetition, and an end symbol of the third PUSCH is the same as an end symbol of the second nominal PUSCH repetition. Time domain resources occupied by the second PUSCH and the third PUSCH are all of time domain resources occupied by the second nominal PUSCH repetition in the slot n and the slot n+1, that is, quantities of symbols occupied by the second PUSCH and the third PUSCH are equal to a quantity of symbols occupied by the second nominal PUSCH repetition in the slot n and the slot n+1.

As shown in FIG. 8(b), a difference from FIG. 8(a) lies in that the second nominal PUSCH repetition is mapped to the $13^{th}$ symbol and the $14^{th}$ symbol in the slot n and the $1^{st}$ symbol in the slot n+1. Because the second nominal PUSCH repetition crosses a boundary of the slot n and the slot n+1, the second nominal PUSCH repetition is divided into two PUSCH segments by the slot boundary, namely, the second PUSCH and a third PUSCH. In addition, because the $2^{nd}$ symbol in the slot n+1 is an invalid symbol, the $2^{nd}$ symbol in the slot n+1 is skipped, and mapping of the second nominal PUSCH repetition is delayed. In this case, a quantity of remaining unmapped symbols of the second nominal PUSCH repetition is 1. Therefore, mapping of the remaining symbol may be discarded, and the second nominal PUSCH repetition is divided into the two PUSCH segments by the slot boundary, namely, the second PUSCH and the third PUSCH. The terminal device 340 sends the second PUSCH and the third PUSCH to the network device 330. Precoding information corresponding to the second PUSCH is the second precoding information corresponding to the second nominal PUSCH repetition, and precoding information corresponding to the third PUSCH is the second precoding information corresponding to the second nominal PUSCH repetition. The network device 330 receives the second PUSCH on the $13^{th}$ symbol and the $14^{th}$ symbol in the slot n, and receives the third PUSCH on the $1^{st}$ symbol in the slot n+1.

It may be understood that the N PUSCHs include the first PUSCH, the second PUSCH, and the third PUSCH. A start symbol of the second PUSCH is the same as a start symbol of the second nominal PUSCH repetition, and an end symbol of the third PUSCH precedes an end symbol of the second nominal PUSCH repetition. Time domain resources occupied by the second PUSCH and the third PUSCH are a part of time domain resources occupied by the second nominal PUSCH repetition in the slot n and the slot n+1, that is, quantities of symbols occupied by the second PUSCH and the third PUSCH are less than a quantity of symbols occupied by the second nominal PUSCH repetition in the slot n and the slot n+1.

As shown in FIG. 8(c), a difference from FIG. 8(a) lies in that the terminal device 340 maps the first nominal PUSCH repetition to the $9^{th}$ symbol to the $12^{th}$ symbol in the slot n, that is, the terminal device 340 sends the first PUSCH to the network device 320. A time domain resource occupied by the first PUSCH is all of time domain resources occupied by the first nominal PUSCH repetition in the slot n. Precoding information corresponding to the first PUSCH is the first precoding information corresponding to the first nominal PUSCH repetition. A start symbol of the first PUSCH is the same as a start symbol of the first nominal PUSCH repetition, and an end symbol of the first PUSCH is the same as an end symbol of the first nominal PUSCH repetition. The network device 320 receives the first PUSCH to the $9^{th}$ symbol to the $12^{th}$ symbol in the slot n.

In some other embodiments, the nominal PUSCH repetition may be divided by both the invalid symbol and the slot boundary.

Figure 9:
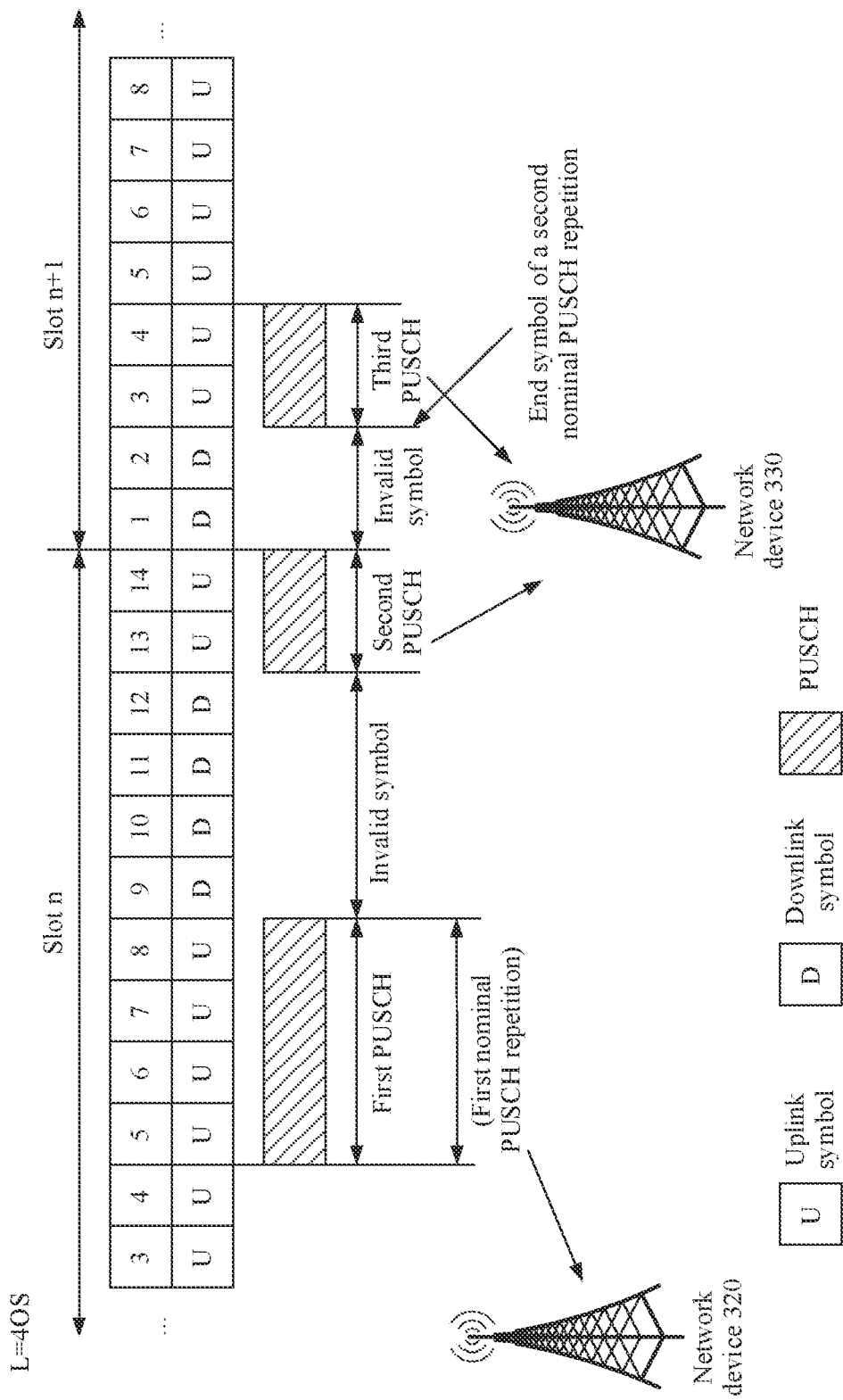
FIG. 9 is a schematic diagram of sending PUSCHs to two network devices by using a PUSCH repeated transmission type B according to an embodiment of this application.

As shown in FIG. 9, the terminal device 340 maps the first nominal PUSCH repetition to the $5^{th}$ symbol to the $8^{th}$ symbol in a slot n, that is, the terminal device 340 sends the first PUSCH to the network device 320. A time domain resource occupied by the first PUSCH is all of time domain resources occupied by the first nominal PUSCH repetition in the slot n. Precoding information corresponding to the first PUSCH is the first precoding information corresponding to the first nominal PUSCH repetition. A start symbol of the first PUSCH is the same as a start symbol of the first nominal PUSCH repetition, and an end symbol of the first PUSCH is the same as an end symbol of the first nominal PUSCH repetition. The network device 320 receives the first PUSCH on the $5^{th}$ symbol to the $8^{th}$ symbol in the slot n.

The second nominal PUSCH repetition is mapped to the $13^{th}$ symbol and the $14^{th}$ symbol in the slot n and the $3^{rd}$ symbol and the $4^{th}$ symbol in a slot n+1. Because the second nominal PUSCH repetition crosses a boundary of the slot n and the slot n+1, the second nominal PUSCH repetition is divided into two PUSCH segments by the slot boundary, namely, the second PUSCH and a third PUSCH. In addition, the $1^{st}$ symbol and the $2^{th}$ symbol in the slot n+1 are invalid symbols. Therefore, the $1^{st}$ symbol and the $2^{th}$ symbol in the slot n+1 are skipped, mapping of the second nominal PUSCH repetition is delayed, and the second nominal PUSCH repetition continues to be mapped starting from the $1^{st}$ uplink symbol (the $3^{rd}$ symbol in the slot n+1) after the invalid symbols, to be specific, the second nominal PUSCH repetition continues to be mapped to the $3^{rd}$ symbol and the $4^{th}$ symbol in the slot n+1. The terminal device 340 sends the second PUSCH and the third PUSCH to the network device 330. Precoding information corresponding to the second PUSCH is the second precoding information corresponding to the second nominal PUSCH repetition, and precoding information corresponding to the third PUSCH is the second precoding information corresponding to the second nominal PUSCH repetition. The network device 330 receives the second PUSCH on the $13^{th}$ symbol and the $14^{th}$ symbol in the slot n, and receives the third PUSCH on the $3^{rd}$ symbol and the $4^{th}$ symbol in the slot n+1.

It may be understood that the N PUSCHs include the first PUSCH, the second PUSCH, and the third PUSCH. A start symbol of the second PUSCH is the same as a start symbol of the second nominal PUSCH repetition, and an end symbol of the third PUSCH follows an end symbol of the second nominal PUSCH repetition. Time domain resources occupied by the second PUSCH and the third PUSCH are all of time domain resources occupied by the second nominal PUSCH repetition in the slot n and the slot n+1, that is, quantities of symbols occupied by the second PUSCH and the third PUSCH are equal to a quantity of symbols occupied by the second nominal PUSCH repetition in the slot n and the slot n+1.

In some other embodiments, because the time unit includes an invalid symbol, the first nominal PUSCH repetition may have no sending opportunity, and the second nominal PUSCH repetition is mapped.

Figure 10A:
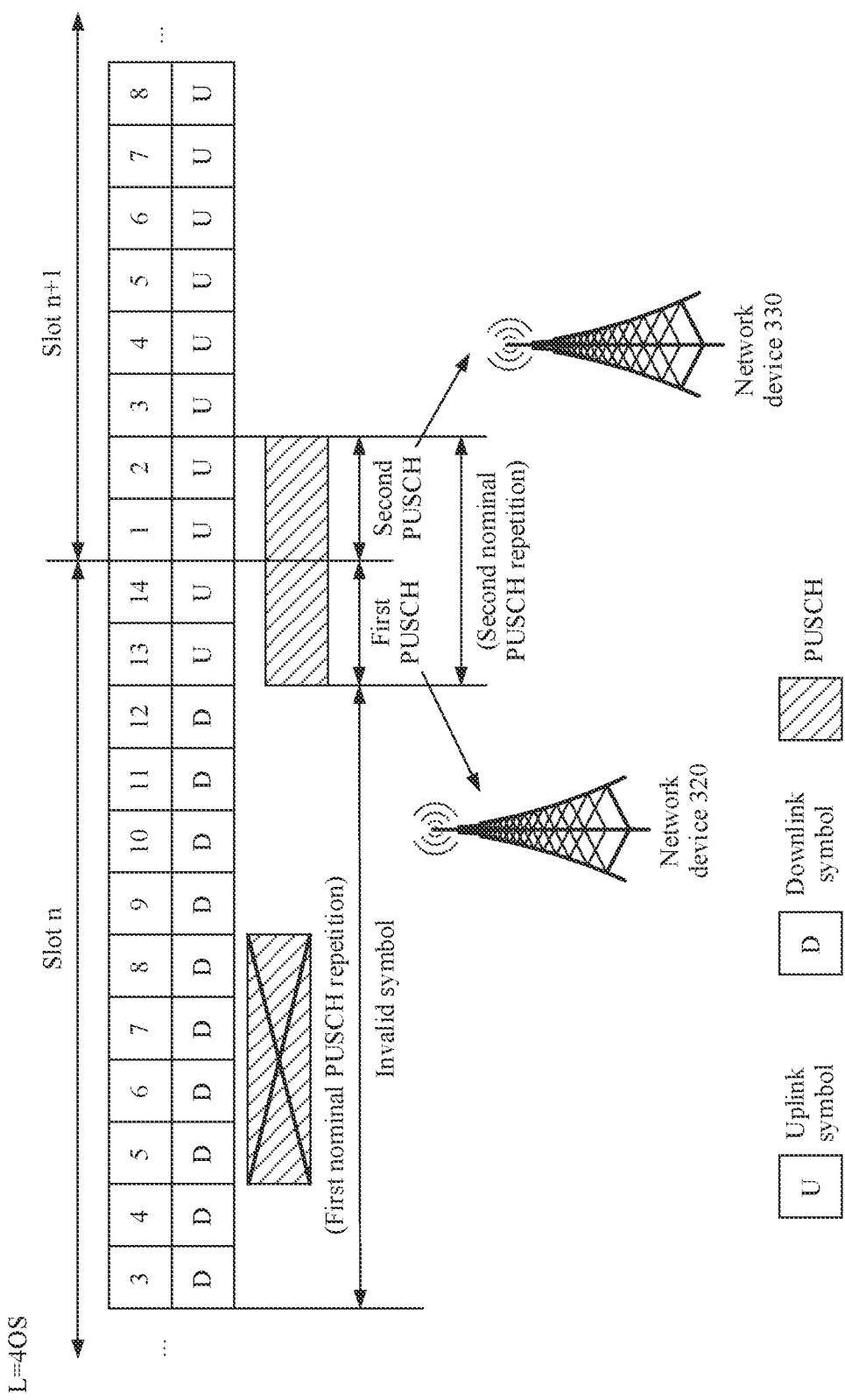
FIG. 10(a) and FIG. 10(b) are a schematic diagram of sending PUSCHs to two network devices by using a PUSCH repeated transmission type B according to an embodiment of this application.
Figure 10B:
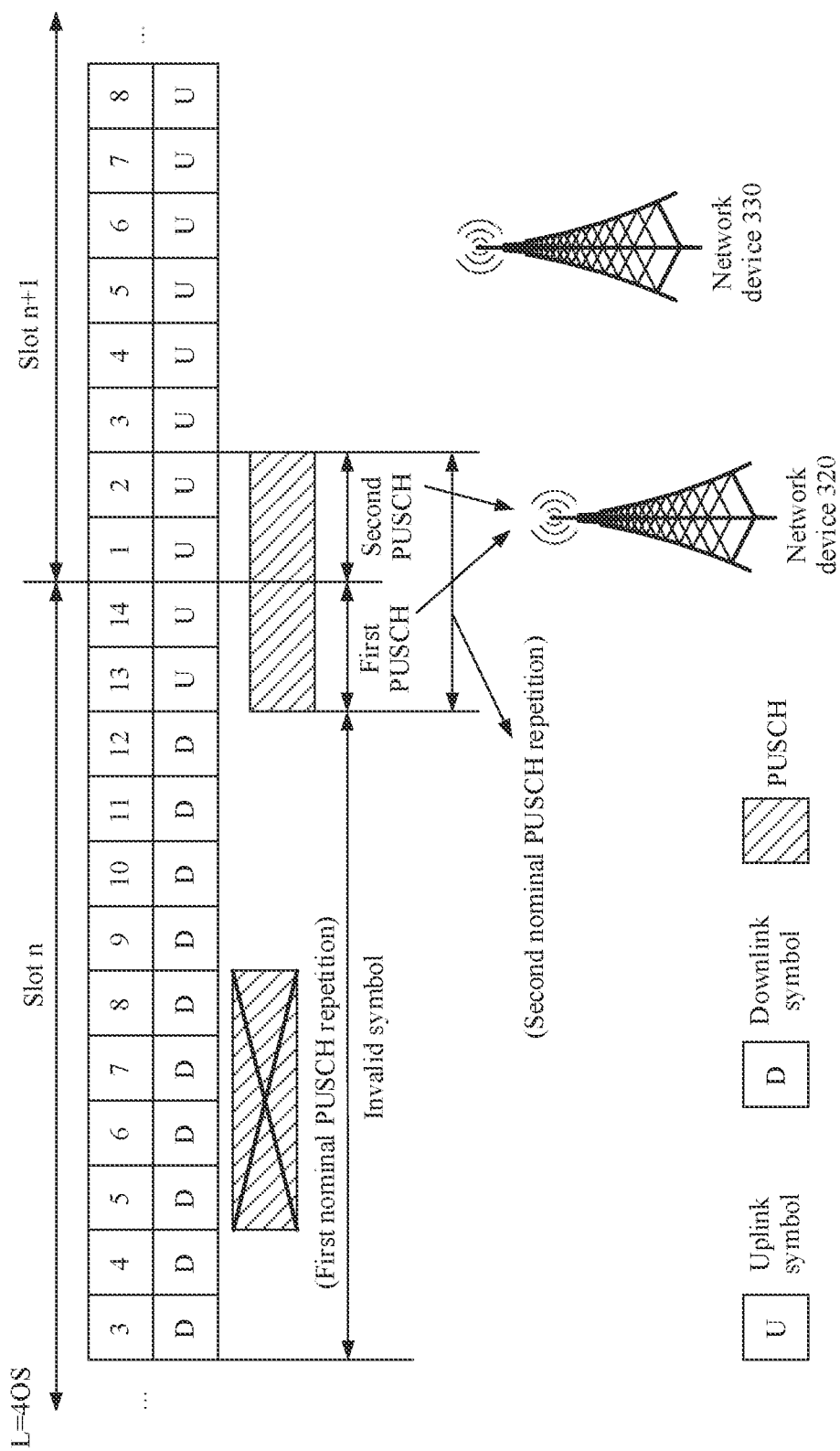

For example, FIG. 10(a) and FIG. 10(b) are a schematic diagram of sending PUSCHs to two network devices by using a PUSCH repeated transmission type B. It is assumed that the length of the nominal PUSCH is four symbols, and the start symbol of the nominal PUSCH is a symbol 5.

As shown in FIG. 10(a), a symbol 5 to a symbol 12 in a slot n are invalid symbols. Therefore, the first nominal PUSCH repetition may have no sending opportunity, and the terminal device 340 does not transmit the first nominal PUSCH repetition. The terminal device 340 maps the second nominal PUSCH repetition to the $13^{th}$ symbol and the $14^{th}$ symbol in the slot n and the $1^{st}$ symbol and the $2^{th}$ symbol in a slot n+1. Because the second nominal PUSCH repetition crosses a boundary of the slot n and the slot n+1, the second nominal PUSCH repetition is divided into two PUSCH segments by the slot boundary, namely, the first PUSCH and the second PUSCH. The terminal device 340 sends the first PUSCH to the network device 320, and the terminal device 340 sends the second PUSCH to the network device 330. Precoding information corresponding to the first PUSCH is the first precoding information corresponding to the first nominal PUSCH repetition, and precoding information corresponding to the second PUSCH is the second precoding information corresponding to the second nominal PUSCH repetition. The network device 320 receives the first PUSCH on the $13^{th}$ symbol and the $14^{th}$ symbol in the slot n, and the network device 330 receives the second PUSCH on the $1^{st}$ symbol and the $2^{nd}$ symbol in the slot n+1.

It may be understood that the N PUSCHs include the first PUSCH and the second PUSCH. A start symbol of the first PUSCH is the same as a start symbol of the second nominal PUSCH repetition, an end symbol of the first PUSCH precedes an end symbol of the second nominal PUSCH repetition, and an end symbol of the second PUSCH is the same as the end symbol of the second nominal PUSCH repetition. Time domain resources occupied by the first PUSCH and the second PUSCH are all of time domain resources occupied by the second nominal PUSCH repetition in the slot n and the slot n+1, that is, quantities of symbols occupied by the first PUSCH and the second PUSCH are less than a quantity of symbols occupied by the second nominal PUSCH repetition in the slot n and the slot n+1.

Optionally, as shown in FIG. 10(b), a difference from FIG. 10(a) lies in that the terminal device 340 sends the first PUSCH and the second PUSCH to the network device 320. Precoding information corresponding to the first PUSCH is the first precoding information corresponding to the first nominal PUSCH repetition, and precoding information corresponding to the second PUSCH is the first precoding information corresponding to the first nominal PUSCH repetition. The network device 320 receives the first PUSCH and the second PUSCH on the $13^{th}$ symbol and the $14^{th}$ symbol in the slot n and the $1^{st}$ symbol and the $2^{nd}$ symbol in the slot n+1.

Optionally, the N PUSCHs include the first PUSCH and the second PUSCH. A start symbol of the first PUSCH is the same as a start symbol of the second nominal PUSCH repetition, an end symbol of the first PUSCH precedes an end symbol of the second nominal PUSCH repetition, and an end symbol of the second PUSCH precedes the end symbol of the second nominal PUSCH repetition. Time domain resources occupied by the first PUSCH and the second PUSCH are a part of time domain resources occupied by the second nominal PUSCH repetition in the slot n and the slot n+1, that is, quantities of symbols occupied by the first PUSCH and the second PUSCH are less than a quantity of symbols occupied by the second nominal PUSCH repetition in the slot n and the slot n+1, for example, as shown in FIG. 8(b).

It should be noted that the terminal device 340 may receive a plurality of pieces of precoding information. A quantity of pieces of precoding information may be equal to a quantity of nominal PUSCH repetition transmissions, or a quantity of pieces of precoding information may be greater than a quantity of nominal PUSCH repetition transmissions, or a quantity of pieces of precoding information may be less than a quantity of nominal PUSCH repetition transmissions. The nominal PUSCH repetition transmissions include the first nominal PUSCH repetition and the second nominal PUSCH repetition.

Optionally, the quantity of pieces of precoding information may be equal to a quantity of PUSCHs actually transmitted by the terminal device 340, the quantity of pieces of precoding information may be greater than a quantity of PUSCHs actually transmitted by the terminal device 340, or the quantity of pieces of precoding information may be less than a quantity of PUSCHs actually transmitted by the terminal device 340.

When an SRI is used to indicate precoding information of different nominal PUSCH repetitions, a value of each SRI information field indicates a quantity of repetitions of the nominal PUSCH. In other words, the value of each SRI information field indicates a different quantity of SRS resources, and corresponds to the quantity of repetitions of the nominal PUSCH. For example, Table 7 shows a correspondence between a non-codebook transmission-based SRI indicator and the precoding information, where a maximum quantity of layers is 2.

TABLE 7

| Index value of an SRI bit field | SRI(s), and $N_{SRS} = 2$ | Index value of the SRI bit field | SRI(s), and $N_{SRS} = 3$ | Index value of the SRI bit field | SRI(s), and $N_{SRS} = 4$ |
| --- | --- | --- | --- | --- | --- |
| 0 | 0 | 0 | 0 | 0 | 0 |
| 1 | 1 | 1 | 1 | 1 | 1 |
| 2 | 0 and 1 | 2 | 2 | 2 | 2 |
| 3 | Reserved | 3 | 0 and 1 | 3 | 3 |
|   |   | 4 | 0 and 2 | 4 | 0 and 1 |
|   |   | 5 | 1 and 2 | 5 | 0 and 2 |
|   |   | 6 and 7 | Reserved | 6 | 0 and 3 |
|   |   |   |   | 7 | 1 and 2 |
|   |   |   |   | 8 | 1 and 3 |
|   |   |   |   | 9 | 2 and 3 |
|   |   |   |   | 10 to 15 | Reserved |

It can be learned from Table 7 that $N_{SRS}$ represents the quantity of SRS resources. When the quantity of SRS resources is 3, and an index of the SRI bit field is 4, indexes of corresponding SRS resources are 0 and 2, and this indicates that the quantity of repetitions of the PUSCH is 2. Further, the index 0 of the SRS resource indicates precoding information corresponding to a first nominal PUSCH, and the index 2 of the SRS resource indicates precoding information corresponding to a second nominal PUSCH. The index value of the SRI bit field may also be referred to as the index of the SRI bit field.

For example, Table 8 shows a correspondence between a non-codebook transmission-based SRI indicator and the precoding information, where a maximum quantity of layers is 3.

TABLE 8

| Bit field mapping index value | SRI(s), and $N_{SRS} = 2$ | Bit field mapping index value | SRI(s), and $N_{SRS} = 3$ | Bit field mapping index value | SRI(s), and $N_{SRS} = 4$ |
| --- | --- | --- | --- | --- | --- |
| 0 | 0 | 0 | 0 | 0 | 0 |
| 1 | 1 | 1 | 1 | 1 | 1 |
| 2 | 0 and 1 | 2 | 2 | 2 | 2 |
| 3 | Reserved | 3 | 0 and 1 | 3 | 3 |
|   |   | 4 | 0 and 2 | 4 | 0 and 1 |
|   |   | 5 | 1 and 2 | 5 | 0 and 2 |
|   |   | 6 | 0, 1, and 2 | 6 | 0 and 3 |
|   |   | 7 | Reserved | 7 | 1 and 2 |
|   |   |   |   | 8 | 1 and 3 |
|   |   |   |   | 9 | 2 and 3 |
|   |   |   |   | 10 | 0, 1, and 2 |
|   |   |   |   | 11 | 0, 1, and 3 |
|   |   |   |   | 12 | 0, 2, and 3 |
|   |   |   |   | 13 | 1, 2, and 3 |
|   |   |   |   | 14 and 15 | Reserved |

For example, Table 9 shows a correspondence between a non-codebook transmission-based SRI indicator and the precoding information, where a maximum quantity of layers is 4.

TABLE 9

| Bit field mapping index value | SRI(s), and $N_{SRS} = 2$ | Bit field mapping index value | SRI(s), and $N_{SRS} = 3$ | Bit field mapping index value | SRI(s), and $N_{SRS} = 4$ |
| --- | --- | --- | --- | --- | --- |
| 0 | 0 | 0 | 0 | 0 | 0 |
| 1 | 1 | 1 | 1 | 1 | 1 |
| 2 | 0 and 1 | 2 | 2 | 2 | 2 |
| 3 | Reserved | 3 | 0 and 1 | 3 | 3 |
|   |   | 4 | 0 and 2 | 4 | 0 and 1 |
|   |   | 5 | 1 and 2 | 5 | 0 and 2 |
|   |   | 6 | 0, 1, and 2 | 6 | 0 and 3 |
|   |   | 7 | Reserved | 7 | 1 and 2 |
|   |   |   |   | 8 | 1 and 3 |
|   |   |   |   | 9 | 2 and 3 |
|   |   |   |   | 10 | 0, 1, and 2 |
|   |   |   |   | 11 | 0, 1, and 3 |
|   |   |   |   | 12 | 0, 2, and 3 |
|   |   |   |   | 13 | 1, 2, and 3 |
|   |   |   |   | 14 | 0, 1, 2, and 3 |
|   |   |   |   | 15 | Reserved |

S404a: The network device 320 receives the Q PUSCHs from the terminal device 340.

S404b: The network device 330 receives the P PUSCHs from the terminal device 340.

The network device 320 receives the Q PUSCHs on a time domain resource to which the Q PUSCHs are mapped, and the network device 330 receives the P PUSCHs on a time domain resource to which the P PUSCHs are mapped. A precoding matrix corresponding to the Q PUSCHs is the first precoding matrix, and a precoding matrix corresponding to the P PUSCHs is the second precoding matrix. For specific explanations, refer to the descriptions of the example of transmitting the N PUSCHs. Details are not described again.

It should be noted that a sequence of the steps of the method for sending a physical uplink shared channel provided in this embodiment of this application may be appropriately adjusted. For example, a sequence of S404a and S404b may not be sequential. To be specific, the network device 330 first receives the P PUSCHs from the terminal device 340, and then receives the Q PUSCHs from the terminal device 340. Any variation method readily figured out by a person skilled in the art within the technical scope disclosed in this application shall fall within the protection scope of this application. Therefore, details are not described herein.

Therefore, the terminal device 340 may determine, based on the received first indication information, the first precoding information corresponding to the first nominal PUSCH repetition and the second precoding information corresponding to the second nominal PUSCH repetition; and may transmit, to the network device 320 by using the first precoding matrix, the Q PUSCHs that carry the uplink data, and transmit, to the network device 330 by using the second precoding matrix, the P PUSCHs that carry the uplink data. This effectively improves uplink data reliability and uplink transmission efficiency.

Figure 11:
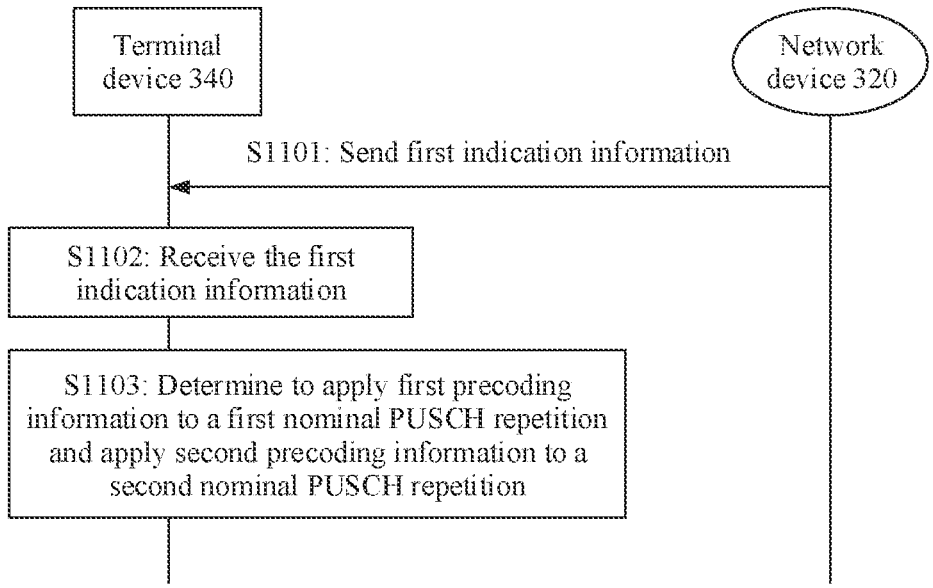
FIG. 11 is a flowchart of a method for sending a physical uplink shared channel according to an embodiment of this application.

FIG. 11 is a flowchart of a method for sending a physical uplink shared channel according to an embodiment of this application. Herein, a network device 320 and a terminal device 340 are used as an example for description. As shown in FIG. 11, the method may include the following steps.

S1101: The network device 320 sends first indication information to the terminal device 340.

The first indication information is used to indicate first information and second information. The first information is used to indicate first precoding information corresponding to a first nominal PUSCH repetition. The second information is used to indicate second precoding information corresponding to a second nominal PUSCH repetition.

S1102: The terminal device 340 receives the first indication information from the network device 320.

S1103: The terminal device 340 determines to apply the first precoding information to the first nominal PUSCH repetition and apply the second precoding information to the second nominal PUSCH repetition.

In a possible design, the first indication information may be precoding information and indication information of a quantity of layers. For example, the first indication information may be values of the precoding information and an information field of the quantity of layers in DCI. The values of the precoding information and the information field of the quantity of layers may indicate the first information and the second information. When the values of the precoding information and the information field of the quantity of layers vary, the first precoding information indicated by the first information also varies, and the second precoding information indicated by the second information also varies. The first information is further used to indicate a first quantity of layers, and the second information is further used to indicate a second quantity of layers. It may be understood that the first information includes the first precoding information and the first quantity of layers, and the second information includes the second precoding information and the second quantity of layers. Optionally, the values of the precoding information and the information field of the quantity of layers may be indexes of the precoding information and the quantity of layers. The indexes of the precoding information and the quantity of layers are used to indicate the first information and the second information. Optionally, the first quantity of layers is the same as the second quantity of layers.

In another possible design, the first indication information may be an SRI. For example, the first indication information may be a value of an SRI information field in the DCI. The value of the SRI may indicate the first information and the second information. When the value of SRI varies, the first precoding information indicated by the first information also varies, and the second precoding information indicated by the second information also varies. In some embodiments, the value of the SRI may be an index value of an SRS resource. The index value of the SRS resource indicates the first information and the second information.

For specific explanations, refer to the descriptions of S401 and S402. Details are not described again.

Therefore, the terminal device 340 may determine, based on the received first indication information, the first precoding information corresponding to the first nominal PUSCH repetition and the second precoding information corresponding to the second nominal PUSCH repetition, so that the terminal device 340 may transmit, to the network device 320 by using a first precoding matrix, Q PUSCHs that carry uplink data, and transmit, to a network device 330 by using a second precoding matrix, P PUSCHs that carry uplink data. This effectively improves uplink data reliability and uplink transmission efficiency.

In another possible design, the terminal device receives transmission mode indication information, where the transmission mode indication information is used to indicate whether a repeated transmission mechanism is used in current PUSCH transmission, and the transmission mode indication information may be configured by using RRC signaling, or may be indicated by using DCI signaling. The terminal device determines interpretation of the SRI based on the transmission mode indication information. Specifically, when the transmission mode indication information indicates a non-repeated transmission mode, a quantity of index values of SRS resources indicated in the SRI is a quantity of transport layers of a PUSCH, and an index value of an SRS resource indicated in each SRI is used to indicate precoding information used at each layer of the PUSCH. For example, in Table 9, when the SRI indicates an index value 14, it indicates that a quantity of transport layers used by the current PUSCH is 4, and precoding used at each layer separately complies with precoding sent by using index values 0 to 3 of SRS resources. When the transmission mode indication information indicates a repeated transmission mode, index values of different SRS resources indicated in the SRI are separately used to indicate precoding used for different repetitions of a PUSCH. For example, in Table 9, when the SRI indicates an index value 14, it may indicate that precoding used for repetitions 1 to 4 of the current PUSCH separately complies with precoding sent by using index values 0 to 3 of SRS resources, and in this case, each quantity of transport layers of the PUSCH is 1; or it may alternatively indicate that precoding used for a repetition 1 of the current PUSCH complies with precoding sent by using index values 0 and 1 of SRS resources, and precoding used for a repetition 2 of the current PUSCH complies with precoding sent by using index values 2 and 3 of SRS resources, and in this case, each quantity of transport layers of the PUSCH is 2. Further, the terminal device may receive indication information of a quantity of repetitions, where the information is used to indicate the quantity of transmitted repetitions of the PUSCH. Specifically, when the quantity of repetitions indicated by the indication information of the quantity of repetitions is equal to a quantity of index values of SRS resources indicated in the SRI, and a value of N is a positive integer, the quantity of transport layers of the PUSCH is N. For example, when the quantity of repetitions is indicated as 2, and the SRI indicates an index value 14, precoding used for a repetition 1 of the PUSCH complies with precoding sent by using index values 0 and 1 of SRS resources, and precoding used for a repetition 2 of the PUSCH complies with precoding sent by using index values 2 and 3 of SRS resources, and in this case, each quantity of transport layers of the PUSCH is 2. For another example, when the quantity of repetitions is indicated as 2, and the SRI indicates an index value 4, precoding used for a repetition 1 of the PUSCH complies with precoding sent by using an index value 0 of an SRS resource, and precoding used by a repetition 2 of the PUSCH complies with precoding sent by using an index value 1 of an SRS resource. When the quantity of repetitions indicated by the indication information of the quantity of repetitions is greater than the quantity of index values of SRS resources indicated in the SRI, repetitions of the PUSCH cyclically use index values of SRS resources in ascending order of time sequence, and the quantity of transport layers of the PUSCH is 1 set by default. For example, when the quantity of repetitions is indicated as 4, and the SRI indicates an index value 4, a repetition 1 of the PUSCH uses precoding corresponding to an index value 0 of the SRI, a repetition 2 of the PUSCH uses precoding corresponding to an index value 1 of the SRI, a repetition 3 of the PUSCH uses precoding corresponding to an index value 0 of the SRI, and a repetition 4 of the PUSCH uses precoding corresponding to an index value 1 of the SRI.

In another possible design, the transmission mode indication information is the indication information of the quantity of repetitions. Specifically, when the quantity of repetitions is indicated as 1, the transmission mode of the current PUSCH is non-repeated transmission; or when the quantity of repetitions is indicated to be greater than 1, the transmission mode of the current PUSCH is repeated transmission.

Figure 12:
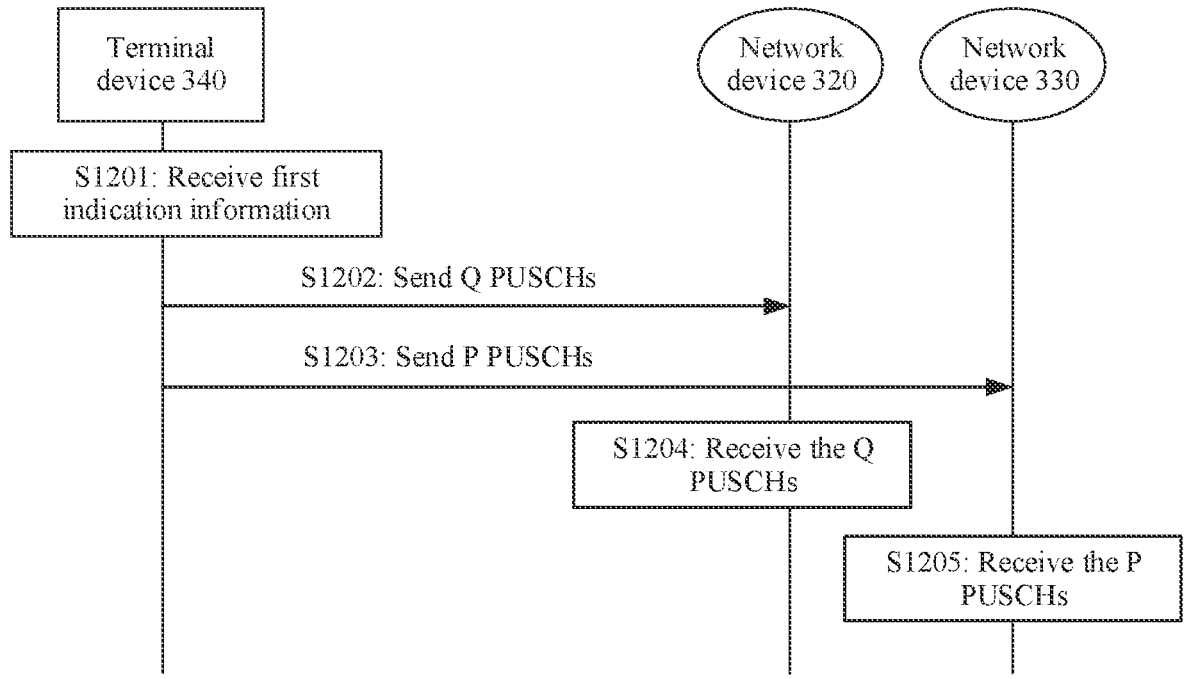
FIG. 12 is a flowchart of a method for sending a physical uplink shared channel according to an embodiment of this application.

FIG. 12 is a flowchart of a method for sending a physical uplink shared channel according to an embodiment of this application. Herein, a network device 320, a network device 330, and a terminal device 340 are used as an example for description. As shown in FIG. 12, the method may include the following steps.

S1201: The terminal device 340 receives first indication information from the network device 320.

The first indication information is used to indicate first information and second information. The first information is used to indicate first precoding information corresponding to a first nominal PUSCH repetition. The second information is used to indicate second precoding information corresponding to a second nominal PUSCH repetition. For specific explanations, refer to the descriptions of S401 and S402. Details are not described again.

The terminal device 340 may perform blind detection on a PDCCH, and receive second indication information, to obtain a nominal PUSCH based on the second indication information.

After obtaining the nominal PUSCH, a quantity of repetitions, and a precoding matrix, the terminal device 340 may apply corresponding precoding information to the nominal PUSCH. A possible implementation in which the terminal device 340 sends nominal PUSCHs to the network device 320 and the network device 330 by using precoding matrices corresponding to the nominal PUSCHs is described below in S403. In the following descriptions, it is assumed that the network device 320 indicates the terminal device 340 to send the first nominal PUSCH repetition to the network device 320 by using a first precoding matrix corresponding to the first nominal PUSCH repetition, and the terminal device 340 sends the second nominal PUSCH repetition to the network device 330 by using a second precoding matrix corresponding to the second nominal PUSCH repetition. Alternatively, after determining the first precoding information, a first quantity of layers, the second precoding information, and a second quantity of layers, the terminal device 340 may determine that the terminal device 340 transmits the first nominal PUSCH repetition by using the first precoding information and the first quantity of layers, and transmits the second nominal PUSCH repetition by using the second precoding information and the second quantity of layers.

When the quantity of repeated transmissions of the nominal PUSCH is 2, that is, two nominal PUSCHs correspond to a same transport block, the $1^{st}$ nominal PUSCH repetition corresponds to the first precoding information, and the $2^{nd}$ nominal PUSCH repetition corresponds to the second precoding information.

When the quantity of repeated transmissions of the nominal PUSCH is greater than 2, a precoding repeated mapping scheme is configured for the terminal device 340, and a nominal PUSCH is allocated to at least one network device based on the precoding repeated mapping scheme for transmission.

The precoding repeated mapping scheme may be cyclic mapping. For example, two nominal PUSCH repetitions are one cycle. To be specific, the first precoding information is applied to the $1^{st}$ nominal PUSCH repetition, and the second precoding information is applied to the $2^{nd}$ nominal PUSCH repetition. This process is cyclically performed, and a same mapping pattern continues to be applied to remaining nominal PUSCH repetitions. For example, when the quantity of repeated transmissions of the nominal PUSCH is 4, the first precoding information is applied to the $1^{st}$ nominal PUSCH repetition, the second precoding information is applied to the $2^{th}$ nominal PUSCH repetition, the first precoding information is applied to the $3^{rd}$ nominal PUSCH repetition, and the second precoding information is applied to the $4^{th}$ nominal PUSCH repetition. It may be understood that the terminal device 340 sends the $1^{st}$ nominal PUSCH repetition to the network device 320 by using the first precoding information, the terminal device 340 sends the $2^{nd}$ nominal PUSCH repetition to the network device 330 by using the second precoding information, the terminal device 340 sends the $3^{rd}$ nominal PUSCH repetition to the network device 320 by using the first precoding information, and the terminal device 340 sends the $4^{th}$ nominal PUSCH repetition to the network device 330 by using the second precoding information.

The precoding repeated mapping scheme may be sequence mapping. For example, four nominal PUSCH repetitions are one cycle. To be specific, the first precoding information is applied to the $1^{st}$ nominal PUSCH repetition and the $2^{nd}$ nominal PUSCH repetition, and the second precoding information is applied to the $3^{rd}$ nominal PUSCH repetition and the $4^{th}$ nominal PUSCH repetition. This process is cyclically performed, and a same mapping pattern continues to be applied to remaining nominal PUSCH repetitions. It may be understood that the terminal device 340 sends the $1^{st}$ nominal PUSCH repetition to the network device 320 by using the first precoding information, the terminal device 340 sends the $2^{nd}$ nominal PUSCH repetition to the network device 320 by using the first precoding information, the terminal device 340 sends the $3^{rd}$ nominal PUSCH repetition to the network device 330 by using the second precoding information, and the terminal device 340 sends the $4^{th}$ nominal PUSCH repetition to the network device 330 by using the second precoding information.

Alternatively, eight nominal PUSCH repetitions are one cycle. To be specific, the first precoding information is applied to the $1^{st}$ nominal PUSCH repetition, the $2^{nd}$ nominal PUSCH repetition, the $3^{rd}$ nominal PUSCH repetition, and the $4^{th}$ nominal PUSCH repetition, and the second precoding information is applied to the $5^{th}$ nominal PUSCH repetition, the $6^{th}$ nominal PUSCH repetition, the $7^{th}$ nominal PUSCH repetition, and the $8^{th}$ nominal PUSCH repetition. This process is cyclically performed, and a same mapping pattern continues to be applied to remaining nominal PUSCH repetitions. The quantity of repeated transmissions of the PUSCH is determined by using a higher layer parameter, or is dynamically indicated by using DCI.

It should be noted that the PUSCHs actually transmitted by the terminal device 340 to the network device 320 and the network device 330 are not necessarily nominal PUSCH repetitions. For specific explanations, refer to the descriptions of S403 and S404.

S1202: The terminal device 340 sends Q PUSCHs to the network device 320.

S1203: The terminal device 340 sends P PUSCHs to the network device 330.

Optionally, the terminal device 340 may send nominal PUSCHs to the network device 320 and the network device 330 by using a PUSCH repeated transmission type A and the precoding repeated mapping scheme.

Optionally, the terminal device 340 may send nominal PUSCHs to the network device 320 and the network device 330 by using a PUSCH repeated transmission type B and the precoding repeated mapping scheme.

In this embodiment of this application, it is assumed that the terminal device 340 sends N PUSCHs to the network device 320 and the network device 330. Q is an integer, P is an integer, and N=Q+P. Optionally, Q may be equal to P, or Q may not be equal to P. A precoding matrix corresponding to the Q PUSCHs is the first precoding matrix, and a precoding matrix corresponding to the P PUSCHs is the second precoding matrix. For specific explanations, refer to the descriptions of the example of transmitting the N PUSCHs. Details are not described again.

S1204: The network device 320 receives the Q PUSCHs from the terminal device 340.

S1205: The network device 330 receives the P PUSCHs from the terminal device 340.

The network device 320 receives the Q PUSCHs on a time domain resource to which the Q PUSCHs are mapped, and the network device 330 receives the P PUSCHs on a time domain resource to which the P PUSCHs are mapped. For specific explanations, refer to the descriptions of the example of transmitting the N PUSCHs. Details are not described again.

It should be noted that a sequence of the steps of the method for sending a physical uplink shared channel provided in this embodiment of this application may be appropriately adjusted. For example, a sequence of S1202 and S1203 may not be sequential. To be specific, the terminal device 340 may first send the P PUSCHs to the network device 330, and then send the Q PUSCHs to the network device 320. For another example, a sequence of S1204 and S1205 may be interchanged. To be specific, the network device 330 receives the P PUSCHs from the terminal device 340, and then receives the Q PUSCHs from the terminal device 340. Any variation method readily figured out by a person skilled in the art within the technical scope disclosed in this application shall fall within the protection scope of this application. Therefore, details are not described herein.

Therefore, the terminal device 340 may determine, based on the received first indication information, the first precoding information corresponding to the first nominal PUSCH repetition and the second precoding information corresponding to the second nominal PUSCH repetition, so that the terminal device 340 may transmit, to the network device 320 by using the first precoding matrix, the Q PUSCHs that carry uplink data, and transmit, to the network device 330 by using the second precoding matrix, the P PUSCHs that carry uplink data. This effectively improves uplink data reliability and uplink transmission efficiency.

When the quantity of repeated transmissions of the nominal PUSCH is 2, that is, two nominal PUSCHs correspond to a same transport block, the $1^{st}$ nominal PUSCH repetition corresponds to the first precoding information, and the $2^{nd}$ nominal PUSCH repetition corresponds to the second precoding information.

When the quantity of repeated transmissions of the nominal PUSCH is greater than 2, a precoding repeated mapping scheme is configured for the terminal device 340. The terminal device 340 may transmit the nominal PUSCH repetition based on the precoding repeated mapping scheme. For example, the precoding repeated mapping scheme may be cyclic mapping. For another example, the precoding repeated mapping scheme may be sequence mapping. For specific explanations, refer to the descriptions in the foregoing embodiments. Details are not described herein again.

It should be noted that the PUSCHs actually transmitted by the terminal device 340 to the network device 320 and the network device 330 are not necessarily nominal PUSCH repetitions. The terminal device 340 may transmit the nominal PUSCH repetition based on the PUSCH repeated transmission type A or the PUSCH repeated transmission type B. For a specific transmission mode, refer to the descriptions in the foregoing embodiments. Details are not described again.

Figure 13:
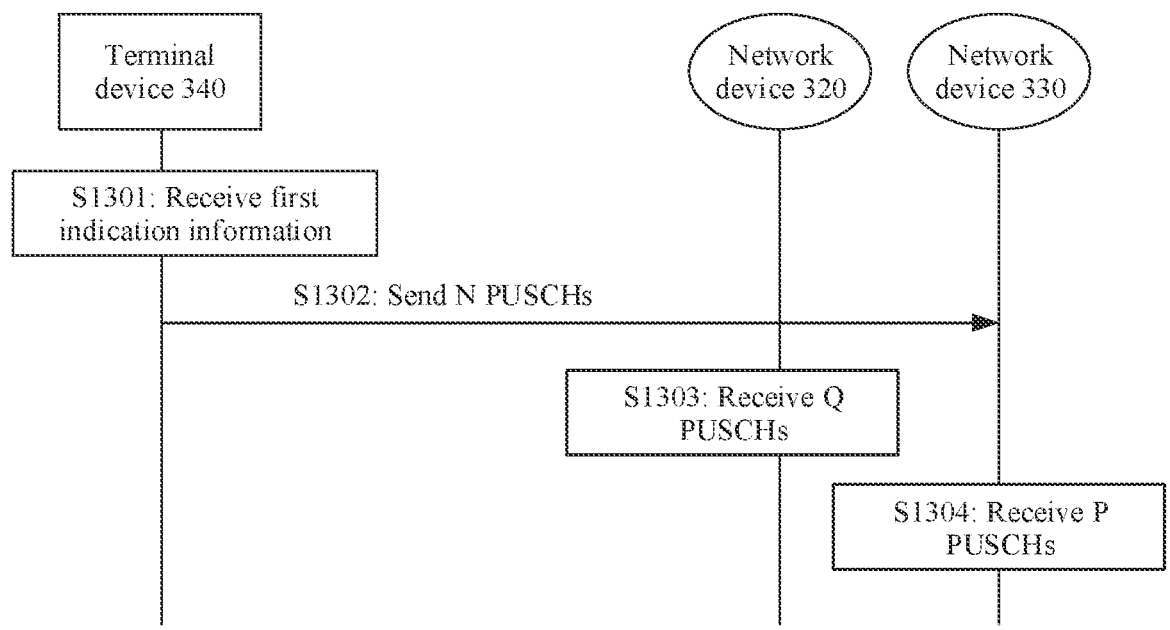
FIG. 13 is a flowchart of a method for sending a physical uplink shared channel according to an embodiment of this application.

FIG. 13 is a flowchart of a method for sending a physical uplink shared channel according to an embodiment of this application. Herein, a network device 320, a network device 330, and a terminal device 340 are used as an example for description. As shown in FIG. 13, the method may include the following steps.

S1301: The terminal device 340 receives first indication information from the network device 320.

The first indication information is used to indicate K pieces of information. Each of the K pieces of information corresponds to one piece of precoding information. Optionally, K pieces of precoding information corresponding to the K pieces of information are different. For specific explanations, refer to the descriptions of S401 and S402. Details are not described again. K is an integer greater than or equal to 2.

S1302: The terminal device 340 sends N PUSCHs.

When a quantity of repeated transmissions of a nominal PUSCH is greater than K, a precoding repeated mapping scheme is configured for the terminal device 340, and a nominal PUSCH is allocated to at least one network device based on the precoding repeated mapping scheme. For example, the terminal device 340 allocates the nominal PUSCH to the at least one network device through cyclic mapping or sequence mapping based on transmitted precoding information.

After obtaining the nominal PUSCH, a quantity of repetitions, and a precoding matrix, the terminal device 340 may apply corresponding precoding information to the nominal PUSCH, and send the nominal PUSCH.

It should be noted that the PUSCHs actually transmitted by the terminal device 340 to the network device 320 and the network device 330 are not necessarily nominal PUSCH repetitions. For example, the N PUSCHs may be obtained by dividing a nominal PUSCH based on a boundary of an invalid symbol and/or a time unit. Precoding information corresponding to the N PUSCHs may be at least one of the K pieces of precoding information. For specific explanations, refer to the descriptions of S403 and S404.

S1303: The network device 320 receives Q PUSCHs from the terminal device 340.

S1304: The network device 330 receives P PUSCHs from the terminal device 340.

In this embodiment of this application, it is assumed that the terminal device 340 sends the N PUSCHs to the network device 320 and the network device 330. Q is an integer, P is an integer, and N=Q+P. Optionally, Q may be equal to P, or Q may not be equal to P. A precoding matrix corresponding to the Q PUSCHs is a first precoding matrix, and a precoding matrix corresponding to the P PUSCHs is a second precoding matrix. The network device 320 receives the Q PUSCHs on a time domain resource to which the Q PUSCHs are mapped, and the network device 330 receives the P PUSCHs on a time domain resource to which the P PUSCHs are mapped. For specific explanations, refer to the descriptions of the example of transmitting the N PUSCHs. Details are not described again.

It should be noted that a sequence of the steps of the method for sending a physical uplink shared channel provided in this embodiment of this application may be appropriately adjusted. For example, a sequence of S1303 and S1304 may not be sequential. To be specific, the network device 330 receives the P PUSCHs from the terminal device 340, and then receives the Q PUSCHs from the terminal device 340. Any variation method readily figured out by a person skilled in the art within the technical scope disclosed in this application shall fall within the protection scope of this application. Therefore, details are not described herein.

In some other embodiments, the terminal device 340 sends the N PUSCHs based on the first indication information.

S1401: The terminal device 340 receives first indication information from the network device 320.

The first indication information is used to indicate first information and second information. The first information is used to indicate first precoding information, and the second information is used to indicate second precoding information. The first precoding information is applied to a first nominal PUSCH repetition, and the second precoding information is used for a second nominal PUSCH repetition. The first nominal PUSCH repetition and the second nominal PUSCH repetition correspond to a same transport block, and the two PUSCH repetitions represent two PUSCH transmission occasions.

S1402: The terminal device 340 sends N PUSCHs to the network device.

It should be noted that the PUSCHs actually transmitted by the terminal device 340 to the network device 320 and the network device 330 are not necessarily nominal PUSCH repetitions. For example, the N PUSCHs may be obtained by dividing a nominal PUSCH based on a boundary of an invalid symbol and/or a time unit. Precoding information corresponding to the N PUSCHs may be at least one of K pieces of precoding information. In this embodiment of this application, it is assumed that the terminal device 340 sends the N PUSCHs to the network devices. The network devices may include the network device 320 and the network device 330. It is assumed that the terminal device 340 sends Q PUSCHs to the network device 320 and sends P PUSCHs to the network device 330. Q is an integer, P is an integer, and N=Q+P. Optionally, Q may be equal to P, or Q may not be equal to P. A precoding matrix corresponding to the Q PUSCHs is a first precoding matrix, and a precoding matrix corresponding to the P PUSCHs is a second precoding matrix. For specific explanations, refer to the descriptions of S403 and S404.

S1403: The network device receives the N PUSCHs sent by the terminal device 340.

In this embodiment of this application, the network device 320 receives the Q PUSCHs on a time domain resource to which the Q PUSCHs are mapped, and the network device 330 receives the P PUSCHs on a time domain resource to which the P PUSCHs are mapped. For specific explanations, refer to the descriptions of the example of transmitting the N PUSCHs. Details are not described again.

It should be noted that the at least one consecutive time unit in the foregoing embodiments may be replaced with at least one time unit. Therefore, the terminal device 340 may transmit the nominal PUSCH repetition in the at least one time unit.

It may be understood that, to implement functions in the foregoing embodiments, the network device and the terminal device include corresponding hardware structures and/or software modules for performing the functions. A person of ordinary skill in the art should easily be aware that, in combination with the units and the method steps in the examples described in embodiments disclosed in this application, this application can be implemented by hardware or a combination of hardware and computer software. Whether a function is performed by hardware or hardware driven by computer software depends on particular application scenarios and design constraints of the technical solutions.

Figure 14:
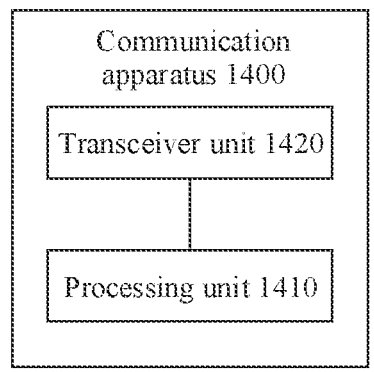
FIG. 14 is an example composition diagram of a communication apparatus according to an embodiment of this application.
Figure 15:
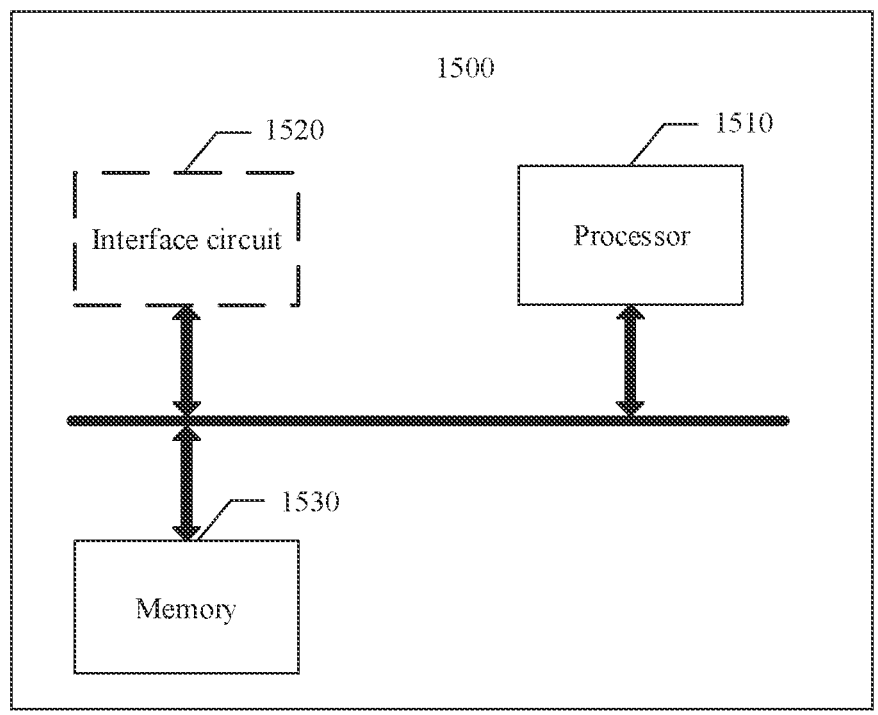
FIG. 15 is an example composition diagram of a communication apparatus according to an embodiment of this application.

FIG. 14 and FIG. 15 are schematic diagrams of structures of possible communication apparatuses according to embodiments of this application. These communication apparatuses can be configured to implement functions of the terminal device or the network device in the foregoing method embodiments, and therefore can also implement beneficial effects of the foregoing method embodiments. In embodiments of this application, the communication apparatus may be the terminal device 340 shown in FIG. 3, or may be the radio access network device 320 shown in FIG. 3, or may be a module (for example, a chip) used in the terminal device or the network device.

As shown in FIG. 14, the communication apparatus 1400 includes a processing unit 1410 and a transceiver unit 1420. The communication apparatus 1400 is configured to implement functions of the terminal device or the network device in the method embodiment shown in FIG. 4A, FIG. 4B, FIG. 5, FIG. 11, FIG. 12, or FIG. 13.

When the communication apparatus 1400 is configured to implement the functions of the terminal device in the method embodiment shown in FIG. 4A, the transceiver unit 1420 is configured to perform S402 and S403.

When the communication apparatus 1400 is configured to implement the functions of the network device in the method embodiment shown in FIG. 4A, the transceiver unit 1420 is configured to perform S401 and S404.

When the communication apparatus 1400 is configured to implement the functions of the terminal device in the method embodiment shown in FIG. 4B, the transceiver unit 1420 is configured to perform S402, and S403a and S403b.

When the communication apparatus 1400 is configured to implement the functions of the network device in the method embodiment shown in FIG. 4B, the transceiver unit 1420 is configured to perform S401, and S404a and S404b.

When the communication apparatus 1400 is configured to implement the functions of the terminal device in the method embodiment shown in FIG. 5, the transceiver unit 1420 is configured to perform S402, S403a and S403b, and S502.

When the communication apparatus 1400 is configured to implement the functions of the network device in the method embodiment shown in FIG. 5, the transceiver unit 1420 is configured to perform S401, S404a and S404b, and S501.

When the communication apparatus 1400 is configured to implement the functions of the terminal device in the method embodiment shown in FIG. 11, the transceiver unit 1420 is configured to perform S1102 and S1103.

When the communication apparatus 1400 is configured to implement the functions of the network device in the method embodiment shown in FIG. 11, the transceiver unit 1420 is configured to perform S1101.

When the communication apparatus 1400 is configured to implement the functions of the terminal device in the method embodiment shown in FIG. 12, the transceiver unit 1420 is configured to perform S1201 to S1203.

When the communication apparatus 1400 is configured to implement the functions of the network device in the method embodiment shown in FIG. 12, the transceiver unit 1420 is configured to perform S1204 and S1205.

When the communication apparatus 1400 is configured to implement the functions of the terminal device in the method embodiment shown in FIG. 13, the transceiver unit 1420 is configured to perform S1301 and S1302.

When the communication apparatus 1400 is configured to implement the functions of the network device in the method embodiment shown in FIG. 13, the transceiver unit 1420 is configured to perform S1303 and S1304.

For more detailed descriptions of the processing unit 1410 and the transceiver unit 1420, directly refer to related descriptions in the method embodiment shown in FIG. 4A, FIG. 4B, FIG. 5, FIG. 11, FIG. 12, or FIG. 13. Details are not described herein again.

As shown in FIG. 15, the communication apparatus 1500 includes a processor 1510 and an interface circuit 1520. The processor 1510 and the interface circuit 1520 are coupled to each other. It may be understood that the interface circuit 1520 may be a transceiver or an input/output interface. Optionally, the communication apparatus 1500 may further include a memory 1530, configured to store instructions executed by the processor 1510, or input data required by the processor 1510 to run the instructions, or data generated after the processor 1510 runs the instructions.

When the communication apparatus 1500 is configured to implement the method shown in FIG. 4A, FIG. 4B, FIG. 5, FIG. 11, FIG. 12, or FIG. 13, the processor 1510 is configured to perform the functions of the processing unit 1410, and the interface circuit 1520 is configured to perform the functions of the transceiver unit 1420.

When the communication apparatus is a chip used in a terminal device, the chip of the terminal device implements the functions of the terminal device in the foregoing method embodiments. The chip of the terminal device receives information from another module (for example, a radio frequency module or an antenna) in the terminal device, where the information is sent by a network device to the terminal device. Alternatively, the chip of the terminal device sends information to another module (for example, a radio frequency module or an antenna) in the terminal device, where the information is sent by the terminal device to a network device.

When the communication apparatus is a chip used in a network device, the chip of the network device implements the functions of the network device in the foregoing method embodiments. The chip of the network device receives information from another module (for example, a radio frequency module or an antenna) in the network device, where the information is sent by a terminal device to the network device. Alternatively, the chip of the network device sends information to another module (for example, a radio frequency module or an antenna) in the network device, where the information is sent by the network device to a terminal device.

It may be understood that, the processor in embodiments of this application may be a central processing unit (Central Processing Unit, CPU), or may be another general-purpose processor, a digital signal processor (Digital Signal Processor, DSP), an application-specific integrated circuit (Application-Specific Integrated Circuit, ASIC), a field programmable gate array (Field Programmable Gate Array, FPGA) or another programmable logic device, a transistor logic device, a hardware component, or any combination thereof. The general-purpose processor may be a microprocessor or any conventional processor.

The method steps in embodiments of this application may be implemented in a hardware manner, or may be implemented in a manner of executing software instructions by the processor. The software instructions may include a corresponding software module. The software module may be stored in a random access memory (Random Access Memory, RAM), a flash memory, a read-only memory (Read-Only Memory, ROM), a programmable read-only memory (Programmable ROM, PROM), an erasable programmable read-only memory (Erasable PROM, EPROM), an electrically erasable programmable read-only memory (Electrically EPROM, EEPROM), a register, a hard disk drive, a removable hard disk drive, a CD-ROM, or any other form of storage medium well-known in the art. For example, a storage medium is coupled to a processor, so that the processor can read information from the storage medium or write information into the storage medium. Certainly, the storage medium may be further a component of the processor. The processor and the storage medium may be located in an ASIC. In addition, the ASIC may be located in a network device or a terminal device. Certainly, the processor and the storage medium may exist in the network device or the terminal device as discrete components.

All or a part of the foregoing embodiments may be implemented by using software, hardware, firmware, or any combination thereof. When software is used to implement embodiments, all or a part of embodiments may be implemented in a form of a computer program product. The computer program product includes one or more computer programs or instructions. When the computer programs or the instructions are loaded and executed on a computer, the procedures or the functions according to embodiments of this application are all or partially implemented. The computer may be a general-purpose computer, a dedicated computer, a computer network, a network device, user equipment, or another programmable apparatus. The computer programs or the instructions may be stored in a computer-readable storage medium, or may be transmitted from a computer-readable storage medium to another computer-readable storage medium. For example, the computer programs or the instructions may be transmitted from a website, computer, server, or data center to another website, computer, server, or data center in a wired or wireless manner. The computer-readable storage medium may be any usable medium accessible by the computer, or a data storage device, such as a server or a data center, integrating one or more usable media. The usable medium may be a magnetic medium, for example, a floppy disk, a hard disk, or a magnetic tape, may be an optical medium, for example, a digital video disc (digital video disc, DVD), or may be a semiconductor medium, for example, a solid-state drive (solid-state drive, SSD).

In embodiments of this application, unless otherwise stated or there is a logic conflict, terms and/or descriptions between different embodiments are consistent and may be mutually referenced, and technical features in different embodiments may be combined based on an internal logical relationship thereof, to form a new embodiment.

In this application, "at least one" refers to one or more, and "a plurality of" refers to two or more. "And/or" describes an association relationship between associated objects, and indicates that three relationships may exist. For example, A and/or B may indicate the following three cases: A exists alone, both A and B exist, and B exists alone, where A and B may be singular or plural. In the text descriptions of this application, the character "/" generally indicates an "or" relationship between the associated objects. In a formula in this application, the character "/" indicates a "division" relationship between the associated objects.

It may be understood that various numbers in embodiments of this application are merely used for differentiation for ease of description, and are not used to limit the scope of embodiments of this application. The sequence numbers of the foregoing processes do not mean an execution sequence, and the execution sequence of the processes should be determined based on functions and internal logic of the processes.

What is claimed is:

1. A method for sending a physical uplink shared channel (PUSCH), comprising:
   receiving indication information, wherein the indication information is used to indicate first information and second information, the first information is used to indicate first precoding information corresponding to a first nominal PUSCH repetition, and the second information is used to indicate second precoding information corresponding to a second nominal PUSCH repetition; and
   sending N PUSCHs, wherein precoding information corresponding to the N PUSCHs comprises at least one of the first precoding information and the second precoding information, and wherein:
   time domain resources occupied by the N PUSCHs are all or a part of time domain resources occupied by the first nominal PUSCH repetition in at least one time unit, the N PUSCHs comprise a first PUSCH and a second PUSCH, the first PUSCH and the second PUSCH are actual PUSCH repetitions corresponding to the first nominal PUSCH repetition, precoding information corresponding to the first PUSCH is the first precoding information, and precoding information corresponding to the second PUSCH is the first precoding information; or
   time domain resources occupied by the N PUSCHs are all or a part of time domain resources occupied by the first nominal PUSCH repetition and the second nominal PUSCH repetition in at least one time unit, the N PUSCHs comprise a first PUSCH and a second PUSCH, the first PUSCH is an actual PUSCH repetition corresponding to the first nominal PUSCH repetition, the second PUSCH is an actual PUSCH repetition corresponding to the second nominal PUSCH repetition, precoding information corresponding to the first PUSCH is the first precoding information, and precoding information corresponding to the second PUSCH is the second precoding information; and
   N is an integer greater than or equal to 2.

2. The method according to claim 1, wherein the time domain resources occupied by the N PUSCHs are all or a part of time domain resources occupied by the first nominal PUSCH repetition and the second nominal PUSCH repetition in at least one time unit comprises:
   time domain resources occupied by the first PUSCH and the second PUSCH are all or a part of time domain resources occupied by the first nominal PUSCH repetition in a first time unit.

3. The method according to claim 1, wherein the time domain resources occupied by the N PUSCHs are all or a part of time domain resources occupied by the first nominal PUSCH repetition and the second nominal PUSCH repetition in at least one time unit comprises:
   a time domain resource occupied by the first PUSCH is all of time domain resources occupied by the first nominal PUSCH repetition in a first time unit, and a time domain resource occupied by the second PUSCH is all of time domain resources occupied by the second nominal PUSCH repetition in a second time unit.

4. The method according to claim 1, wherein the method further comprises:
   obtaining the first information and the second information by using downlink control information (DCI).

5. The method according to claim 4, wherein the indication information comprises precoding information and a quantity of layers, or the indication information comprises sounding reference signal resource indicator information (SRI).

6. A method for receiving a physical uplink shared channel (PUSCH), comprising:
   sending indication information, wherein the indication information is used to indicate first information and second information, the first information is used to indicate first precoding information corresponding to a first nominal PUSCH repetition, and the second information is used to indicate second precoding information corresponding to a second nominal PUSCH repetition; and
   receiving M PUSCHs, wherein precoding information corresponding to the M PUSCHs is the first precoding information, time domain resources occupied by the M PUSCHs are all or a part of time domain resources occupied by the first nominal PUSCH repetition in at least one time unit, M is an integer less than or equal to N, N PUSCHs are PUSCHs sent by a terminal device based on at least one of the first nominal PUSCH repetition and the second nominal PUSCH repetition, and wherein:
   time domain resources occupied by the N PUSCHs are all or a part of time domain resources occupied by the first nominal PUSCH repetition in at least one time unit, the N PUSCHs comprise a first PUSCH and a second PUSCH, the first PUSCH and the second PUSCH are actual PUSCH repetitions corresponding to the first nominal PUSCH repetition, precoding information corresponding to the first PUSCH is the first precoding information, and precoding information corresponding to the second PUSCH is the first precoding information; or
   time domain resources occupied by the N PUSCHs are all or a part of time domain resources occupied by the first nominal PUSCH repetition and the second nominal PUSCH repetition in at least one time unit, the N PUSCHs comprise a first PUSCH and a second PUSCH, the first PUSCH is an actual PUSCH repetition corresponding to the first nominal PUSCH repetition, the second PUSCH is an actual PUSCH repetition corresponding to the second nominal PUSCH repetition, precoding information corresponding to the first PUSCH is the first precoding information, and precoding information corresponding to the second PUSCH is the second precoding information.

7. The method according to claim 6, wherein the time domain resources occupied by the N PUSCHs are all or a part of time domain resources occupied by the first nominal PUSCH repetition and the second nominal PUSCH repetition in at least one time unit comprises:
   time domain resources occupied by the first PUSCH and the second PUSCH are all or a part of time domain resources occupied by the first nominal PUSCH repetition in a first time unit.

8. The method according to claim 7, wherein the time domain resources occupied by the N PUSCHs are all or a part of time domain resources occupied by the first nominal PUSCH repetition and the second nominal PUSCH repetition in at least one time unit comprises:
   a time domain resource occupied by the first PUSCH is all of time domain resources occupied by the first nominal PUSCH repetition in a first time unit, and a time domain resource occupied by the second PUSCH is all of time domain resources occupied by the second nominal PUSCH repetition in a second time unit.

9. The method according to claim 6, wherein the method further comprises:
sending the first information and the second information by using downlink control information DCI.

10. The method according to claim 9, wherein the indication information comprises precoding information and a quantity of layers, or the indication information comprises sounding reference signal resource indicator information (SRI).

11. An apparatus for sending a physical uplink shared channel (PUSCH), comprising
a transceiver, configured to:
receive indication information, wherein the indication information is used to indicate first information and second information, the first information is used to indicate first precoding information corresponding to a first nominal PUSCH repetition, and the second information is used to indicate second precoding information corresponding to a second nominal PUSCH repetition; and
send N PUSCHs, wherein precoding information corresponding to the N PUSCHs comprises at least one of the first precoding information and the second precoding information, and wherein:
time domain resources occupied by the N PUSCHs are all or a part of time domain resources occupied by the first nominal PUSCH repetition in at least one time unit, the N PUSCHs comprise a first PUSCH and a second PUSCH, the first PUSCH and the second PUSCH are actual PUSCH repetitions corresponding to the first nominal PUSCH repetition, precoding information corresponding to the first PUSCH is the first precoding information, and precoding information corresponding to the second PUSCH is the first precoding information; or
time domain resources occupied by the N PUSCHs are all or a part of time domain resources occupied by the first nominal PUSCH repetition and the second nominal PUSCH repetition in at least one time unit, the N PUSCHs comprise a first PUSCH and a second PUSCH, the first PUSCH is an actual PUSCH repetition corresponding to the first nominal PUSCH repetition, the second PUSCH is an actual PUSCH repetition corresponding to the second nominal PUSCH repetition, precoding information corresponding to the first PUSCH is the first precoding information, and precoding information corresponding to the second PUSCH is the second precoding information; and
N is an integer greater than or equal to 2.

12. The apparatus according to claim 11, wherein the time domain resources occupied by the N PUSCHs are all or a part of time domain resources occupied by the first nominal PUSCH repetition and the second nominal PUSCH repetition in at least one time unit comprises:
time domain resources occupied by the first PUSCH and the second PUSCH are all or a part of time domain resources occupied by the first nominal PUSCH repetition in a first time unit.

13. The apparatus according to claim 11, wherein the time domain resources occupied by the N PUSCHs are all or a part of time domain resources occupied by the first nominal PUSCH repetition and the second nominal PUSCH repetition in at least one time unit comprises:
a time domain resource occupied by the first PUSCH is all of time domain resources occupied by the first nominal PUSCH repetition in a first time unit, and a time domain resource occupied by the second PUSCH is all of time domain resources occupied by the second nominal PUSCH repetition in a second time unit.

14. The apparatus according to claim 11, wherein the apparatus further comprises:
at least one processor; and
one or more memories coupled to the at least one processor and storing programming instructions for execution by the at least one processor to obtain the first information and the second information by using downlink control information (DCI).

15. The apparatus according to claim 14, wherein the indication information comprises precoding information and a quantity of layers, or the indication information comprises sounding reference signal resource indicator information (SRI).

16. An apparatus for receiving a physical uplink shared channel (PUSCH), comprising
a transceiver, configured to:
send indication information, wherein the indication information is used to indicate first information and second information, the first information is used to indicate first precoding information corresponding to a first nominal PUSCH repetition, and the second information is used to indicate second precoding information corresponding to a second nominal PUSCH repetition; and
receive M PUSCHs, wherein precoding information corresponding to the M PUSCHs is the first precoding information, time domain resources occupied by the M PUSCHs are all or a part of time domain resources occupied by the first nominal PUSCH repetition in at least one time unit, M is an integer less than or equal to N, N PUSCHs are PUSCHs sent by a terminal device based on at least one of the first nominal PUSCH repetition and the second nominal PUSCH repetition, and wherein:
time domain resources occupied by the N PUSCHs are all or a part of time domain resources occupied by the first nominal PUSCH repetition in at least one time unit, the N PUSCHs comprise a first PUSCH and a second PUSCH, the first PUSCH and the second PUSCH are actual PUSCH repetitions corresponding to the first nominal PUSCH repetition, precoding information corresponding to the first PUSCH is the first precoding information, and precoding information corresponding to the second PUSCH is the first precoding information; or
time domain resources occupied by the N PUSCHs are all or a part of time domain resources occupied by the first nominal PUSCH repetition and the second nominal PUSCH repetition in at least one time unit, the N PUSCHs comprise a first PUSCH and a second PUSCH, the first PUSCH is an actual PUSCH repetition corresponding to the first nominal PUSCH repetition, the second PUSCH is an actual PUSCH repetition corresponding to the second nominal PUSCH repetition, precoding information corresponding to the first PUSCH is the first precoding information, and precoding information corresponding to the second PUSCH is the second precoding information.

17. The apparatus according to claim 16, wherein the time domain resources occupied by the N PUSCHs are all or a part of time domain resources occupied by the first nominal PUSCH repetition and the second nominal PUSCH repetition in at least one time unit comprises:

time domain resources occupied by the first PUSCH and the second PUSCH are all or a part of time domain resources occupied by the first nominal PUSCH repetition in a first time unit.

18. The apparatus according to claim 17, wherein the time domain resources occupied by the N PUSCHs are all or a part of time domain resources occupied by the first nominal PUSCH repetition and the second nominal PUSCH repetition in at least one time unit comprises:
a time domain resource occupied by the first PUSCH is all of time domain resources occupied by the first nominal PUSCH repetition in a first time unit; and a time domain resource occupied by the second PUSCH is all of time domain resources occupied by the second nominal PUSCH repetition in a second time unit.

19. The apparatus according to claim 16, wherein the transceiver is further configured to:
send the first information and the second information by using downlink control information (DCI).

20. The apparatus according to claim 19, wherein the indication information comprises precoding information and a quantity of layers, or the indication information comprises sounding reference signal resource indicator information (SRI).

* * * * *